United States Patent
Gindele et al.

(10) Patent No.: US 6,594,388 B1
(45) Date of Patent: Jul. 15, 2003

(54) COLOR IMAGE REPRODUCTION OF SCENES WITH PREFERENTIAL COLOR MAPPING AND SCENE-DEPENDENT TONE SCALING

(75) Inventors: Edward B. Gindele, Rochester, NY (US); Karin Topfer, Rochester, NY (US); John D. Buhr, Fairport, NY (US); Geoffrey J. Woolfe, Penfield, NY (US); Andrew C. Gallagher, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/578,463

(22) Filed: May 25, 2000

(51) Int. Cl.[7] .................................................. G06K 9/00
(52) U.S. Cl. ....................................... 382/167; 358/520
(58) Field of Search .............................. 382/162–167; 358/504–540; 345/597–609; 348/599–603

(56) References Cited

U.S. PATENT DOCUMENTS

| | | | |
|---|---|---|---|
| 4,731,671 A | | 3/1988 | Alkofer |
| 4,945,406 A | | 7/1990 | Cok |
| 5,012,333 A | | 4/1991 | Lee et al. |
| 5,081,692 A | | 1/1992 | Kwon et al. |
| 5,172,224 A | * | 12/1992 | Collette et al. ............. 358/515 |
| 5,267,030 A | | 11/1993 | Giorgianni et al. |
| 5,300,381 A | | 4/1994 | Buhr et al. |
| 5,528,339 A | | 6/1996 | Buhr et al. |
| 5,579,132 A | | 11/1996 | Takahashi et al. |
| 5,582,961 A | | 12/1996 | Giorgianni et al. |
| 5,805,213 A | * | 9/1998 | Spaulding et al. ........ 348/222.1 |
| 5,822,453 A | | 10/1998 | Lee et al. |
| 5,943,045 A | * | 8/1999 | Ikeshoji et al. ............. 348/672 |
| 6,178,007 B1 | * | 1/2001 | Harrington .................. 358/518 |
| 6,268,939 B1 | * | 7/2001 | Klassen et al. ............. 358/518 |

OTHER PUBLICATIONS

K. E. Spaulding et al., Reference Input/Output Medium Metric RGB Color Encodings (RIMM/ROMM RGB), *IS&T's 2000 PICS Conference.*
R. W. G. Hunt, How to Make Pictures and Please People, *The Seventh Color Imaging Conference: Color Science, Systems, and Applications*, 1999, pp. 9–13.
E. Goll et al., Modern Exposure Determination for Customizing Photofinishing Printer Response, *Journal of Applied Photographic Engineering*, vol. 5, No. 2, Spring 1979, pp. 93–104.

* cited by examiner

*Primary Examiner*—Jingge Wu
(74) *Attorney, Agent, or Firm*—Thomas H. Close

(57) ABSTRACT

A method for enhancing the hue and lightness characteristics of a digital color image, the digital color image having pixel values from which digital luminance and color difference values can be deduced, includes the steps of: deducing digital luminance and digital color difference values for pixels of the digital color image; using the pixels of the digital color image to calculate an image dependent transform; using the image dependent transform to modify the digital luminance values for pixels of the digital color image to form modified luminance values; calculating a color transform that modifies the original digital color difference values in a manner that consistently and smoothly moves the values toward or away from predetermined digital color difference values; and using the color transform to modify the original color difference values for pixels of the digital color image to produce modified color difference values.

54 Claims, 20 Drawing Sheets

COLOR IMAGE REPRODUCTION OF SCENES WITH PREFERENTIAL COLOR MAPPING AND SCENE-DEPENDENT TONE SCALING

FIELD OF THE INVENTION

This invention relates to digital image processing and in particular to automatically processing a digital image to produce a visual color reproduction of a scene. More specifically, the invention relates to a visual color reproduction of a scene having preferred color reproduction and scene-dependent tone scaling.

BACKGROUND OF THE INVENTION

Color image reproduction methods and systems known in the art capture images on image-receptive media, which can be stored in analog or digital form, and then output as a visual reproduction. For example, color images may be captured on photographic negative film and then reproduced optically on photographic paper. Images can also be captured on positive photographic media, and then viewed directly, or copied onto other transparent and reflective media. In addition, color negative films, transparency films or reflective prints can be scanned for input to digital imaging systems. Subsequently, digital color and tone manipulations can be applied to the digital picture element (pixel) values in order to produce the best possible reproduction for the intended output device and medium, and the resulting images can be viewed on monitors, printed on silver halide photographic paper or on other reflective media using inkjet, dye sublimation or electrophotographic printers. Digital images can also be encoded in a defined color space and stored on various media, e.g. Kodak Photo CD, Kodak Picture Disk or CD, at any point in this sequence for future processing. In other cases, color images can be captured by electronic devices, such as video or still CCD cameras, and viewed on monitors or printed using inkjet or dye sublimation thermal printers.

In each case previously cited, these systems are subjected to customer satisfaction criteria and may or may not embody digital tone sale reproduction manipulation or some form of color enhancement. The systems mentioned above are just some examples of color image reproduction systems.

It is well known in the art, that the best reproductions of original scenes do not constitute a 1:1 mapping of scene colorimetry. For example, the correct scaling of lightness and chroma values depends on the viewing conditions of the original scene and the reproduction. For the purpose of this discussion, viewing conditions are defined as the overall luminance level of the scene or reproduction, the relative brightness of the surround, the state of chromatic adaptation of the observer and the amount of stray light (flare) present. Equivalent color has been defined, as a reproduction, in which the chromaticities, relative luminances and absolute luminances are such that, when seen in the picture-viewing conditions, they have the same appearance as the original scene. This type of match is addressed by color appearance models. It has been argued that equivalent color reproduction produces high quality images.

There is another type of color reproduction that can enhance images beyond equivalent reproduction. Preferred color reproduction is defined as a reproduction in which the colors depart from equality of appearance to those of the original, either absolutely or relative to white, in order to give a more pleasing result to the viewer. Some preferred color enhancements are based on the concept of memory colors. Research has shown, that our memory of certain colors, for example skin colors, foliage and blue sky, deviates from the actual color. Memory colors often have different hues and enhanced colorfulness compared with the actual colors. There is evidence that viewers prefer reproductions that are closer to the memory color than to the actual color. Several researchers have tried to obtain optimum positions for these colors in controlled psychophysical experiments. However, the results often contradict each other, and it has been shown that color preferences may change over time as systems with larger color gamuts become available. The concept of memory colors has never been systematically incorporated into the design of color reproduction systems.

While the principles of preferred color reproduction, including the importance of hue reproduction and memory colors, were recently summarized by Hunt in a general fashion (R. W. G. Hunt, "How To Make Pictures and Please People", *The Seventh Color Imaging Conference*, IS&T, Springfield, Va., 1999), it is not obvious how to make images according to these principles. Our experience has shown that it is impossible to produce images that embody all the principles of preferred color reproduction using conventional silver halide film/paper systems.

Current optical and digital photofinishing systems produce hues of reproduced colors that change as a function of lightness and chroma, thus giving the reproductions a somewhat unnatural appearance. FIG. 1 shows an example of the hue reproduction capabilities of a current consumer color negative/positive system in terms of a CIELAB a*/b* plot. For demonstration purposes the CIE 1976 a,b chroma, $C^*_{ab}$, was maintained at the original color position. The tails of the arrows denote the original color while the heads of the arrows (symbols) show the reproduced color. In this diagram, colors of constant CIE 1976 a,b hue angle, $h_{ab}$, fall along lines that emanate from the origin (a*=0, b*=0). The abscissa approximately corresponds to the green-red axis, while the ordinate represents the blue-yellow axis. Colors of constant CIE 1976 a,b chroma are represented by concentric circles around the origin. FIG. 1 shows that hues of colors of similar original hue angles may change in opposite directions. Furthermore, hue angle errors of saturated (high chroma) colors are often so large, that a reproduced color may cross a color name boundary. FIG. 1 for example suggests that saturated greens might be reproduced yellow.

One of the important criteria for viewer satisfaction in photographic reproductions is the correspondence between the color stimuli in the original scene compared to those of the reproduction. We find that viewers generally prefer to have high quality images with pleasing tone reproduction, pleasing hues, and high colorfulness while maintaining good skin tone. Technological advances have been made over the years in photographic films by improving spectral sensitivities, incorporating more chemical enhancement in photographic papers by increasing the paper contrast, and in the whole system by co-optimizing film and paper spectral sensitivities and dyes. Some current methods for making color reproductions produce fairly bright colors and offer reasonable skin tone reproduction; however, there have been limitations on the extent to which color enhancement can be employed. Conventional silver halide photographic systems are subject to limitations imposed by optically printing one chemically developed material onto another chemically developable material. As a result, we find that they generally do not reproduce the scenes in a way that is most preferred by the viewer.

Aside from color enhancement, the quality of image reproductions is also affected by the tone scale function or tone mapping employed to reproduce the density variations that make up an image. It has previously been discovered that the use of a preferential tone scale function or mapping as described generally in U.S. Pat. No. 5,300,381, issued Apr. 5, 1994 to Buhr et al., entitled Color Image Reproduction of Scenes with Preferential Tone Mapping, can be utilized to provide a reproduced image that is perceived by the viewer to be a reproduction of the original scene preferred to that previously obtainable. Buhr et al. also provided a solution to the problem of producing pleasing skin tones in combination with high color saturation, as described in U.S. Pat. No. 5,528,339, issued Jun. 18, 1996, entitled Color Image Reproduction of Scenes with Color Enhancement and Preferential Tone Mapping.

Many natural scenes photographed under ambient lighting conditions result in photographic images which have a luminance dynamic range that far exceeds the dynamic range of conventional display systems. For example, photographic images taken in sunny outdoor conditions can have 10 or more photographic stops of recorded information while photographic paper can reproduce approximately seven photographic stops of information. In digital imaging systems, scene dependent tone scale function algorithms may be employed to reduce the dynamic range of the source digital image thus providing a better match of the processed digital image to the dynamic range capabilities of the output medium.

One such scene dependent tone scale algorithm is described by Alkofer in U.S. Pat. No. 4,731,671, issued Mar. 15, 1988, entitled Contrast Adjustment in Digital Image Processing Method Employing Histogram Normalization. Alkofer discloses a method that calculates a tone scale function based on the pixels of the source digital image. The method involves calculating the standard deviation of a sub-sample of pixels selectively sampled from spatially active regions within the source digital image, calculating a histogram of these sampled pixel values, and calculating a tone scale function which when applied to the source digital image will result in a processed digital image which has a statistically normalized histogram. The resulting processed digital images using Alkofer's method have dynamic ranges that are mapped to the intended output medium. As a consequence of the scene dependent tone scaling processing, the color reproduction of the processed images can be affected. Furthermore, depending on how the tone scale function is applied to the source digital image, the color reproduction of the processed images will be different.

The prior improvement in scene dependent tone scaling, tone mapping and color enhancement, has provided a degree of preferred reproduction of color images, but the use of tone mapping alone has not enabled the full extent of improvement desired by the viewer, in particular as far as hue reproduction is concerned. Recently, digital printing (e.g. the Digital Minilab Frontier 350 available from the Fuji Photofilm Company USA) and digitally-modified optical-printing (e.g. Agfa MSP DIMAX® printer available from Agfa A.G.) photofinishing systems have been introduced. These systems have introduced improvements in tone reproduction but have done little to improve color reproduction. Moreover, it has not been fully appreciated that the preferred visual reproduction does not usually correspond to the most colorimetrically accurate rendition. There is a need, therefore, for an improved image processing method that produces improved color reproduction in conjunction with scene dependent tone scaling algorithms.

SUMMARY OF THE INVENTION

The need is met according to the present invention by providing a method for enhancing the hue and lightness characteristics of a digital color image, the digital color image having pixel values from which digital luminance and color difference values can be deduced, that includes the steps of: deducing digital luminance and digital color difference values for pixels of the digital color image; using the pixels of the digital color image to calculate an image dependent transform; using the image dependent transform to modify the digital luminance values for pixels of the digital color image to form modified luminance values; calculating a color transform that modifies the original digital color difference values in a manner that consistently and smoothly moves the values toward or away from predetermined digital color difference values; and using the color transform to modify the original color difference values for pixels of the digital color image to produce modified color difference values.

This invention combines preferred color reproduction with scene-dependent tone scaling. As a result, higher color quality can be obtained compared with using any of the two algorithms in isolation. Preferred color mappings encompass generally accurate hue reproduction apart from a few selected regions of color space, where hues are modified in designed fashion, in order to produce reproductions that are highly preferred by customers. In addition, the colorfulness and the tone scale of the reproduction can be modified to produce images according to viewer preference. In preferred color manipulations, tone scale functions are usually implemented as a global transformation that do not take into account the dynamic range of the scenes. As a result, not all scene tones in high-dynamic range scenes can be reproduced on limited dynamic range output devices and media as viewers see them. This shortcoming of preferred color manipulations can be addressed by scene-dependent tone scaling algorithms that map scene tones into a range that can be reproduced by the intended output medium or device. In order to retain the advantages of hue control that are part of the preferred color manipulations, the tone scale manipulations must be implemented in a way that leaves hue unaltered. This can be achieved by applying the tone scale function to the luminance channel of a luminance/color difference space.

The primary concept of the present invention involves the coordination of a sub-system for scene dependent tone scale adjustment and a sub-system for adjusting the color hue and color chroma adjustment on the basis of color space coordinates. Specifically, the present invention involves the steps of: a) transforming a color digital image into a luminance-color difference scene space representation; b) applying a scene dependent tone scale function (in the form of a LUT) to the luminance channel data creating a tone scale adjusted digital image; c) transforming the tone scale adjusted digital image into an approximately perceptually uniform representation (such as CIE Lab); d) adjusting the hues of the tone scale adjusted digital image based on the CIELAB L*,a*,b* pixel values; e) adjusting the chroma of the tone scale adjusted digital image based on the CIELAB L*,a*,b* pixel values; and f) optionally applying an additional scene-independent tone scale function that may modify lightness alone, or lightness and chroma.

DETAILED DESCRIPTION OF THE INVENTION

Figure 1:
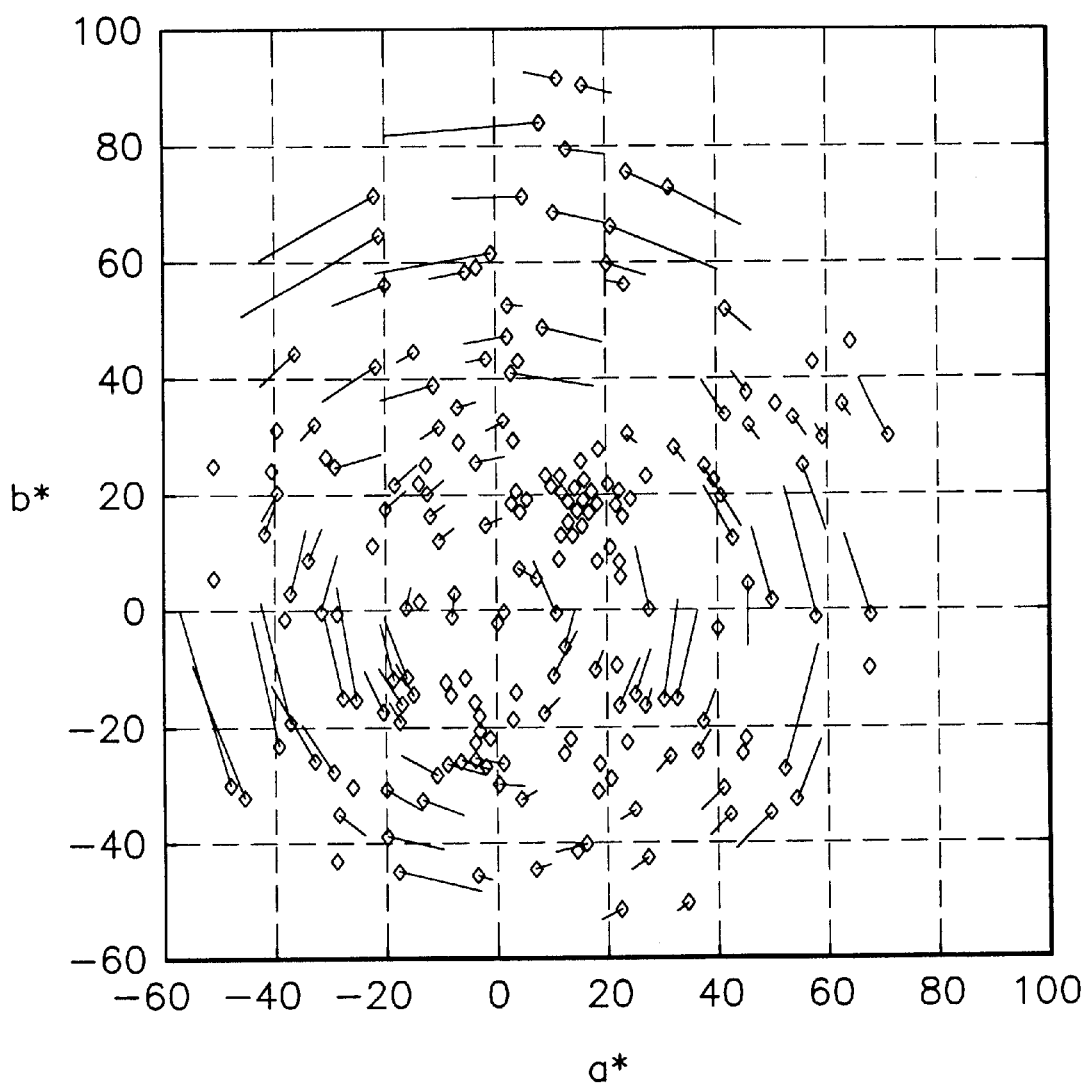
FIG. 1 is a plot showing the hue reproduction capabilities of a current consumer color negative/positive system.

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

This invention combines scene-dependent tone scaling algorithms with preferred color transformations. A tone scale in most general terms is a nonlinear transform between densities that viewers see when they capture the original scene and the visual densities that are reproduced on a given output medium or device. Within the framework of the invention, we will often refer to luminance and color difference values of the images. In this context, the term luminance describes the achromatic channel of an image, while the color difference channels contain color information, for example, a red-green color difference signal and a yellow-blue color difference signal. Color difference signals can be expressed in polar coordinates, i.e. with a component relating to hue information (hue channel) and a component relating to colorfulness information (chroma channel). A linear relationship between the light intensity in a scene and the digital pixel values in the luminance and chrominance channels is not required. Logarithmic and other nonlinear encoding schemes for scene light intensities have been successfully employed.

The color transformations described in the invention illustrate a relationship between scene colorimetry and colorimetry of the reproduced image that produces images that viewers prefer over color reproductions that are currently available. Scene colorimetry is defined as the CIE tristimulus values, XYZ, of colored objects in a scene under a given illuminant, calculated according to the color-matching functions of the CIE 1931 Standard Colorimetric Observer. Colorimetry of the reproduced image refers to the CIE tristimulus values, XYZ, of the reproduced objects, in hardcopy or softcopy, under a given illuminant calculated according to the color-matching functions of the CIE 1931 Standard Colorimetric Observer. For the purpose of the description of this invention, the scene and reproduction illuminants are chosen as the CIE Standard Illuminant D50. The encoding of scene and reproduction colorimetry, i.e. the numerical specification of color information, is not limited to CIE XYZ values. Any reversible transformation between CIE XYZ values of real surface colors and other color encoding metrics can be used, e.g. CIELAB, CIELUV, tristimulus values of any linear combination of the color-matching functions of the CIE 1931 Standard Colorimetric Observer, nonlinear encoding metrics of tristimulus values, such as the encoding described by K. E. Spaulding et al. (K. E. Spaulding, E. J. Giorgianni, G. Woolfe, "Reference Input/Output Medium Metric RGB Color Encodings (RIMM/ROMM RGB)", Proceedings of IS&T PICS 2000 Conference). For the purpose of the description of the invention, scene and reproduced colorimetry will be represented in terms of CIE 1976 CIELAB values. Within the framework of this invention, this selection also defines the measurement methods of color and the signal-processing transformations that determine the meaning of encoded color values.

For the purposes of the present invention, the color components that are produced with visual transforms, e.g. the a*,b* channels of a CIE LAB representation or the u*,v* of a CIE LUV representation are considered examples of color difference signals. Also considered color difference signals are color components derived from the a*,b* channels such as, but not limited to, the chroma, and hue polar coordinate components representation. The L* component of these visual transformations is considered a luminance signal. Those skilled in the art will recognize that the present invention is not limited to the transformations described herein and can be practiced with other color transformations, e.g. color appearance transforms such as CIECAM97s.

Figure 2:
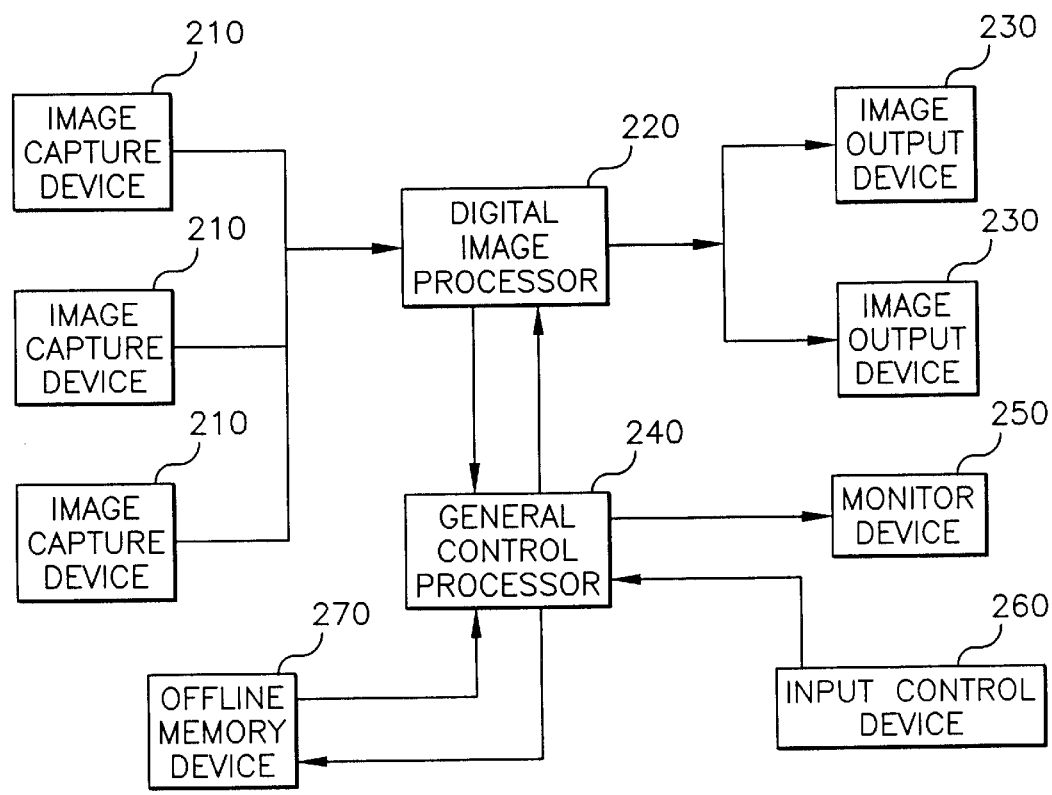
FIG. 2 is a functional block diagram showing the component parts of an apparatus implementation of the present invention.

The present invention may be implemented in computer hardware. Referring to FIG. 2, the following description relates to a digital imaging system which includes one or more image capture devices 210, a digital image processor 220, one or more image output devices 230, and a general control processor 240. The system may include a monitor device 250 such as a computer console or paper printer. The system may also include an input device control for an operator such as a keyboard and or mouse pointer 260. Multiple capture devices 210 are shown illustrating that the present invention may be used for digital images derived from a variety of imaging devices. For example, FIG. 2 may represent a digital photofinishing system where the image capture device 210 is a conventional photographic film camera for capturing a scene on color negative or reversal film, and a film scanner device for scanning the developed image on the film and producing a source digital image 201 (see FIG. 3). Another example of an image capture device 210 is a digital camera which has the ability to produce a source digital image 201 directly. The digital image processor 220 provides the means for processing the digital images to produce pleasing looking images on the intended output device or media. The digital image processor 220 produces a rendered digital image 206 (see FIG. 3) which is received by one or more image output devices 230. Multiple image output devices 230 are shown illustrating that the present invention may be used in conjunction with a variety of output devices which may include a digital photographic printer and soft copy display. The digital image processor processes the source digital image 201 to adjust the overall lightness, tone scale, image structure etc. of the digital image in a manner such that a pleasing looking image is produced by an image output device 230. Those skilled in the art will recognize that the present invention is not limited to just these mentioned image processing modules.

The general control processor 240 shown in FIG. 2 may store the present invention as a computer program stored in a computer readable storage medium, which may comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 270. Before describing the present invention, it facilitates understanding to note that the present invention is preferably utilized on any well-known computer system, such as a personal computer.

It should also be noted that the present invention implemented in a combination of software and/or hardware is not limited to devices which are physically connected and/or located within the same physical location. One or more of the devices illustrated in FIG. 2 may be located remotely and may be connected via a wireless connection.

A digital image is comprised of one or more digital image channels. Each digital image channel is comprised of a two-dimensional array of pixels. Each pixel value relates to the amount of light received by the image capture device 210 corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications.

Figure 3:
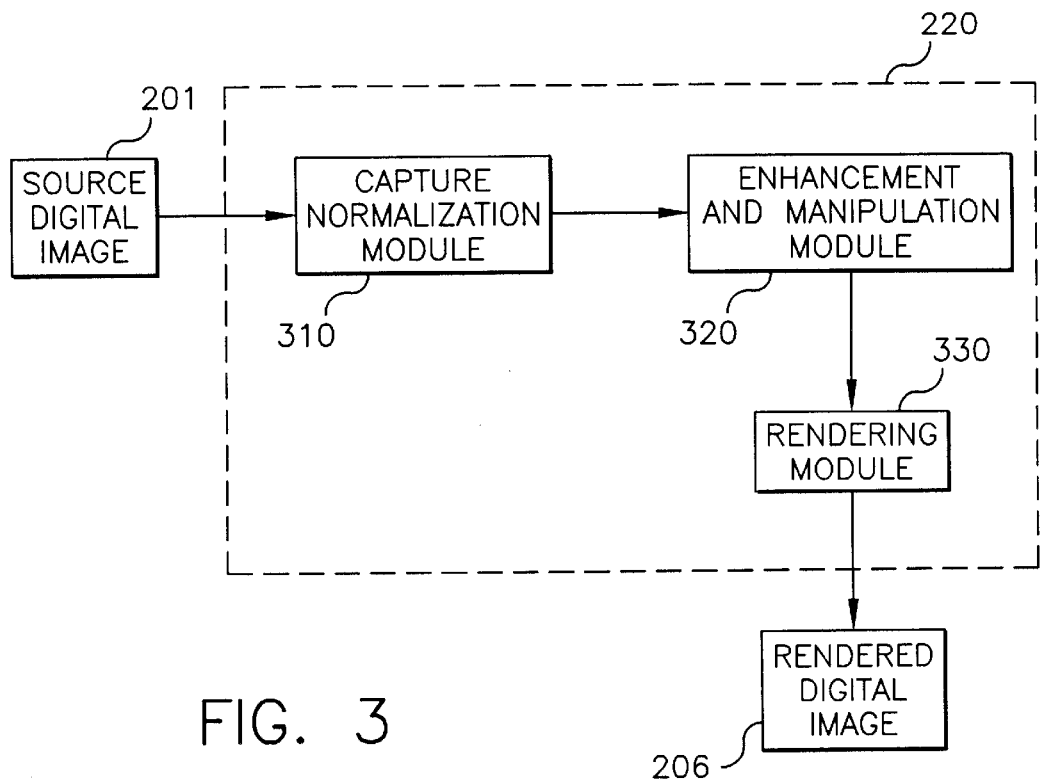
FIG. 3 is a functional block diagram of a method and software implementation of the image processor module employed by the preferred embodiment of the present invention.

The digital image processor 220 shown in FIG. 2 is illustrated in more detail in FIG. 3. The general form of the digital image processor 220 employed by the present invention is a cascaded chain of image processing modules. The source digital image 201 is received by the digital image processor 220 which produces a rendered digital image 206. The image processing modules contained within the digital image processor 220 receive a digital image, modify the digital image to produce a processed digital image and pass the processed digital image to the next image processing module.

Three image processing modules are shown within the digital image processor 220: a capture normalization module 310, an enhancement and manipulation module 320, and a rendering module 330. The capture normalization module 310 receives the source digital image 201 from the image capture device 210. The main function of the capture normalization module 310 is the modification of the source digital image 201 such that the pixel values of the modified digital image have a defined relationship to CIE XYZ values of the scene. The output digital image from the capture normalization module 310 is a balanced digital image 203 (see FIG. 4) which is received by the an enhancement and manipulation module 320 which further modifies the digital image values to affect one or more aesthetic qualities of the digital image. The present invention employs a tone scale module 322 (see FIG. 6) as one of its image processing modules. A tone scaled digital image 204 (see FIG. 6) is produced by the enhancement and manipulation module 320 and received by the rendering module 330. The main function of the rendering module 330 is the modification of the digital image in a manner such that the digital image when displayed or printed on an image output device 230 (see FIG. 2) will have the appropriate contrast and color. The rendering module 330 produces a rendered digital image 206 which is received by the image output device 230.

Figure 4:
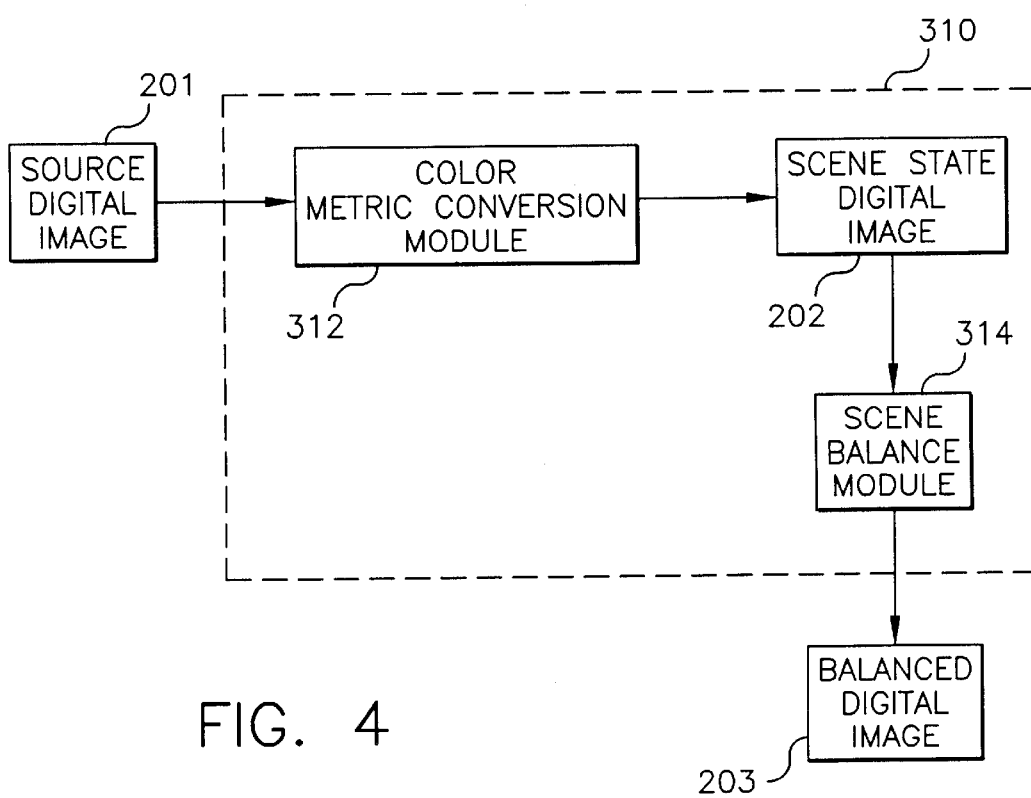
FIG. 4 is a functional block diagram of the capture normalization module shown in FIG. 3.

The capture normalization module 310 shown in FIG. 3 is illustrated in more detail in FIG. 4. The source digital image 201 is received by a color metric conversion module 312 which transforms the digital image into a scene color representation. As such, the balanced digital image 203 produced has pixel values which can be related to CIE XYZ values. This does not mean that the pixel values of a scene space digital image are CIE XYZ values, but that the differences between the pixel values of a scene color digital image and CIE XYZ may be explained by a simple mathematical relationship. One example of a suitable space was given by K. E. Spaulding et al. (K. E. Spaulding, E. J. Giorgianni, G. Woolfe, "Reference Input/Output Medium Metric RGB Color Encodings (RIMM/ROMM RGB)", Proceedings of IS&T PICS 2000 Conference). The mathematical transformation embodied by the color metric conversion module 312 must be tailored to the type of capture media and image capture device 210 used to produce the source digital image 201.

In the general case, image recording media and devices and scanning devices will not directly record the scene parameters in the way human observers perceive them. However, all of these media and devices can be characterized by a spectral response function, by a function that maps scene intensity ratios to device code values and by a multi-dimensional function or matrix that characterizes the cross talk between the at least three color channels. Therefore, obtaining the original scene parameters involves applying the transformations that are the inverses of these functions. The goal of this operation is to make the captured scene parameters independent of the particular input device and/or medium. The resulting pixel values represent estimates of the scene colorimetry as defined in the beginning of this section. A preferred method of accomplishing this is described in U.S. Pat. No. 5,267,030, issued Nov. 30, 1993 to Giorgianni et al. entitled Method and Associated Apparatus for Forming Image Data Metrics Which Achieve Media Compatibility for Subsequent Imaging Application. According to Giorgianni et al., a digital image that was created by scanning a film is transformed into a device independent color and tone space by a mathematical transformation. A data set from which the mathematical transformation can be derived is produced by exposing a sample of the film with a pattern of approximately 400 test color stimuli, chosen to adequately sample and cover the useful exposure range of the film. Red, Green and Blue (R,G,B) trichromatic exposures for a reference calorimetric image-capturing device or medium are then computed for the test stimuli, using standard calorimetric computational methods. The exposed film is processed chemically and the color patches are read by a transmission scanner which produces red, green and blue image-bearing signals (R, G, B) corresponding to each color patch. A transformation is then created relating the red, green and blue image-bearing signal values (R, G, B) for the film's test colors to the known red, green and blue trichromatic exposures of the corresponding test colors. This transformation is then used to convert digital image values that were produced by scanning a film of the type that was used to generate the transform using the following procedures.

1) Converting the R, G, B image-bearing signals, which correspond to the measured transmittances of the input film, to RGB densities by using appropriate 1-dimensional look-up-tables (LUTs).

2) Adjusting the RGB densities of step 1 by using a 3 by 3 matrix, to correct for differences among scanners in systems where multiple input scanners are used.

3) Adjusting the RGB densities of step 2 by using another matrix operation or 3-dimensional LUT, to remove the chromatic interdependence of the image-bearing signals produced by any unwanted absorptions of the imaging dyes and inter-layer chemical interactions in the input film.

4) Individually transforming the RGB densities of step 3 through appropriate 1-dimensional LUTs, derived such that the neutral scale densities of the input film are transformed to the neutral scale exposures of the input film.

5) Further transforming the RGB exposures of step 4 by another matrix operation to arrive at the R, G, B exposures corresponding to those which a reference image-capturing device or medium would have received if it had captured the same original scene.

Test patch sets having fewer than 400 colors can be employed to enable more efficient generation of the transformation matrices and LUTs and to make more efficient use of computational resources. In some embodiments, the mathematical operations represented by sequential application of individual matrices and LUTs can be numerically concatenated to afford improved computational speed and reduced need for computational power.

Analogous procedures can be employed to generate transformation matrices and LUTs appropriate for use with the other photographic or electronic image acquisition, image capture and image digitization paths described herein.

It is well known in the art that the scene colorimetry cannot be fully reconstructed by the computational methods listed above if the spectral sensitivities of the capture medium and/or device do not represent linear combinations of the CIE 1931 Standard Colorimetric Observer color-matching functions. Therefore, the color enhancements described in this invention will produce the most preferred images if the spectral sensitivities are close approximations of this requirement. An example of a suitable photographic element is described in U.S. Pat. No. 5,582,961, issued Dec. 10, 1996 to Giorgianni et al. entitled Photographic Elements Which Achieve Colorimetrically Accurate Recording.

Most currently available image recording media and devices do not completely meet these stringent requirements. However, capture media and devices that deviate from the desired spectral sensitivity but record key colors with sufficient colorimetric accuracy will also produce color reproductions that are preferred over current systems. Capture media and devices will be capable of producing superior color reproduction as prescribed by the present invention if the CIE 1976 color difference, $\Delta E^*_{ab}$, of the two skin tone patches of the Macbeth Color Checker chart is below 4, and the average $\Delta E^*_{ab}$ value for the colors on the Macbeth Color Checker does not exceed 4, with maximum values below 12. Recording media and devices that fulfill these criteria are currently available. Embodiments are Kodak Generation 6 Gold™ films, Kodak Advantix™ films, Kodak Royal Gold™ films, Kodak digital cameras, and FUJI Reala™ film.

The color accuracy of the capture medium or device can be assessed according to the following procedure.

1. The spectral reflectances, R, of all patches the Macbeth Color Checker are measured using a spectrophotometer or telespectroradiometer.

2. The spectral sensitivities, SS, of the capture medium or device are measured and computed using techniques known to those skilled in the art.

3. The normalized exposures, $E_n$, of the capture medium or device are computed according to the equation $$E_n = \frac{\int_{350}^{780} R(\lambda)I(\lambda)SS(\lambda)\,d\lambda}{\int_{350}^{780} I(\lambda)SS(\lambda)\,d\lambda} \tag{1}$$

where I is the spectral intensity distribution of the illuminant and $\lambda$ is the wavelength in nanometers.

4. CIE XYZ values, for each color patch for a given illuminant, are computed. A matrix, M, is computed that predicts the XYZ values in 4 so that the error is minimized:

$$\begin{bmatrix} X \\ Y \\ Z \end{bmatrix} = M \begin{bmatrix} E_{n,R} \\ E_{n,G} \\ E_{n,B} \end{bmatrix} \tag{2}$$

where the subscripts R, G, B denote the normalized exposures of the red, green and blue sensitive layers.

Figure 5:
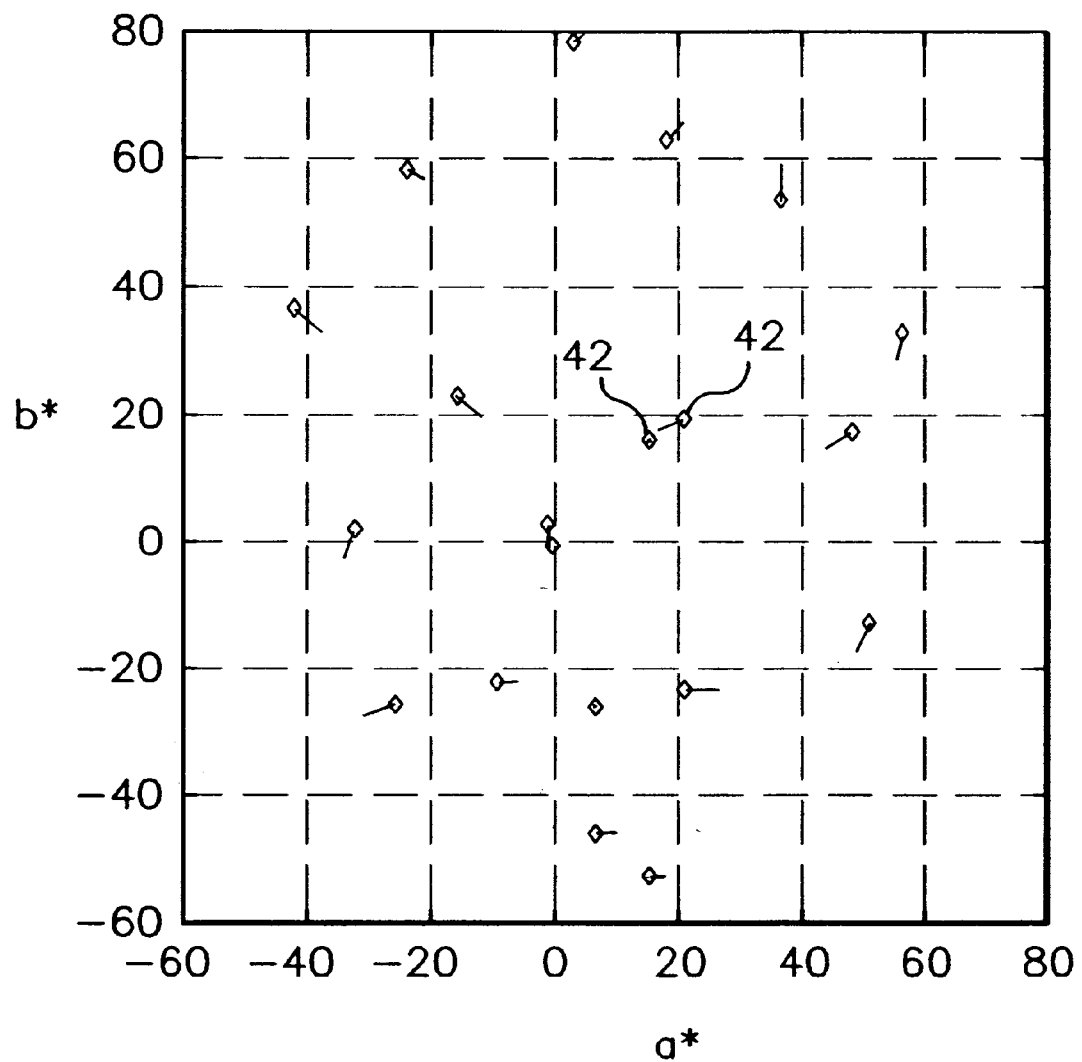
FIG. 5 is a plot showing the color capture accuracy of a consumer color negative film.

FIG. 5 shows the color accuracy of a consumer color negative film, which was assessed by the procedure described above. The tails of the arrows indicate the original color and the heads of the arrows show the captured color. This film meets the requirements for color accuracy listed above with a maximum $\Delta E^*_{ab}$ of 3.9 for the two skin tone patches 42, an average $\Delta E^*_{ab}$ of 2.6 with a maximum value of 8. It will be noted that if the procedure described above were performed perfectly, these variations would still exist in the digital representation of the scene parameters due to the nature of the spectral sensitivities of the particular film.

The particular combination of one-dimensional and multidimensional LUTs, matrices, polynomials and scalars, that accomplish the transformation of the captured scene parameters to produce a digital estimate of the scene colorimetry depend upon the particular kind of illumination (spectral distribution of the illuminant and exposure of the light-sensitive element) in combination with the image capture device and medium, and in some cases the scanner, that was used to produce them. While scanner variability can be minimized by standard calibration procedures, the illuminant and the luminance levels are generally not known in photography. Additional variability is introduced by chemically processing the film. Therefore, additional analog or digital processing has to be applied in order to obtain the correct color balance and overall lightness for each image. The algorithms are commonly known as "white-balance," "color-constancy" or "scene-balance" algorithms. These algorithms can work on a single image, several images, or an entire set of images. An example of a suitable scene balance algorithms is described by E. Goll et al., "Modern Exposure Determination for Customizing Photofinishing Printer Response," Journal of Applied Photographic Engineering, 2, 93 (1979). Further improvements in scene-balance algorithms might include mixed illuminant detection and subject detection.

Information accompanying the captured original scene parameters that describes the camera parameters responsible for capturing the scene can provide useful input for the signal processing algorithms. Useful information includes any single or any combination of scene illumination type, flash parameters such as flash output and/or whether the flash was directed at the subject or bounced onto the subject and/or whether sufficient flash power was available to properly illuminate the subject, camera lens f-stop, camera exposure time, and scene orientation. Additional information on the film can help to characterize the variability of the chemical process that was used to develop the film. For example, at least one or more gray reference patches with known exposure can be exposed on the film during manufacturing.

Instead of direct capture of the original scene parameters, it is also possible to access a representation of the original scene parameters, captured and stored at some prior time. These representations may be two-dimensional or three-dimensional and may be of still or moving scenes. The only requirement for this means of generating a preferred viewed reproduction of the original scene is that the relationship between the original scene parameters and those in the accessed original scene representation be known or that it be possible to make an accurate assumption about this relationship. The accessed scene representation was at some point captured using the methods described above for direct original scene parameter capture.

As part of the image processing performed by the capture normalization module 310, an adjustment for the overall exposure during capture and for the color of the illumination source is performed by the scene balance module 314 show in FIG. 4. The scene state digital image 202 produced by the color metric conversion module 312 is received by the scene balance module 314 which produces a balanced digital image 203. The present invention may be practiced with any scene balance module such as the one described by David R. Cok in U.S. Pat. No. 4,945,406 issued Jul. 31, 1990, entitled Apparatus and Accompanying Methods for Achieving Automatic Color Balancing in a Film to Video Transfer System. The scene balance module calculates the pixel values of a theoretical 20% gray card corresponding to the exposure of the scene state digital image 202. A look-up-table is calculated and applied to the scene state digital image 202 which results in a balanced digital image 203. Although no scene balance module performs the task of compensating the digital image for variations in exposure and illumination color effects perfectly, the scene balance module 314 does improve the accuracy of the color representation of the scene space digital image. This scene balance transform is an example of an exposure compensation transform which in general is designed to adjust both the luminance and chrominance values of the balanced digital image 203.

Figure 6:
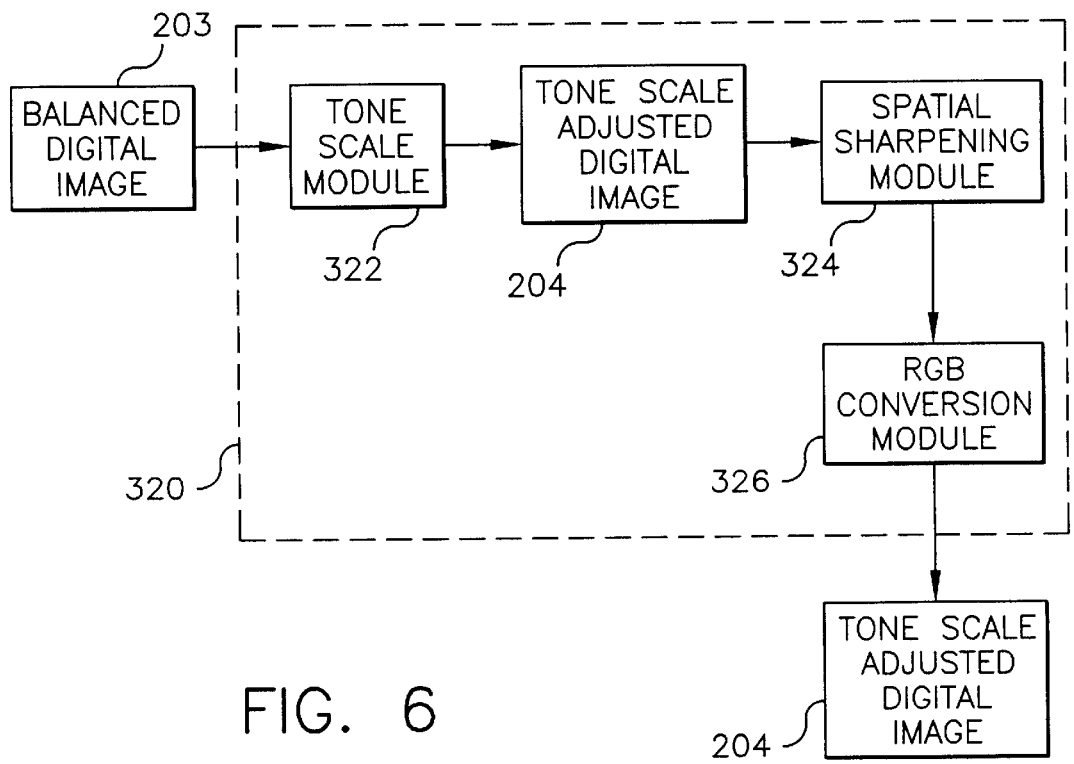
FIG. 6 is a functional block diagram of the enhancement and manipulation module shown in FIG. 3.

As shown in FIG. 4, the scene balance module 314 is applied after the color metric conversion module 312 and before the tone scale module 322 and the spatial sharpening module 324 shown in FIG. 6. As practiced by the present invention, the scene balance module 314 is also applied before the rendering module 330 shown in FIG. 3. Although the best results are achieved by applying the scene balance module 314 before the other image enhancement modules, the present invention may be practiced with the scene balance module 314 located in other positions within the image processing chain. An alternative embodiment of the present invention applies the scene balance module 314 after the rendering module 330.

The present invention may also be practiced with a scene balance module which involves operator intervention. As an alternative embodiment of the present invention, the general control processor 240 shown in FIG. 2 is used to interface to a monitor device 250 and an input control device 260. One or more renditions of the balanced digital image 203 are displayed on the monitor device 250 with a human operator indicating a choice of rendition with the input control device 260. The choice of display rendition is used to adjust the lightness and color balance. In similar manner to the preferred embodiment, a look-up-table is calculated and applied to the balanced digital image 203.

The enhancement and manipulation module 320 shown in FIG. 3 is illustrated in more detail in FIG. 6. The balanced digital image 203 is received by a tone scale module 322 which uses the pixels of the balanced digital image 203 to calculate a tone scale function. The tone scale function, implemented as a look-up-table is used to adjust the contrast and brightness of the balanced digital image 203 which results in a tone scale adjusted digital image 204. The spatial sharpening module 324 receives the tone scale adjusted digital image 204 and performs a spatial filtering operation which improves the image sharpness attributes of the processed digital image. Other image processing modules may be used in conjunction with the present invention such as but not limited to, modules that repair spatial defects in images such as due to dust particles or red-eye produced resulting from camera flash units.

Figure 7:
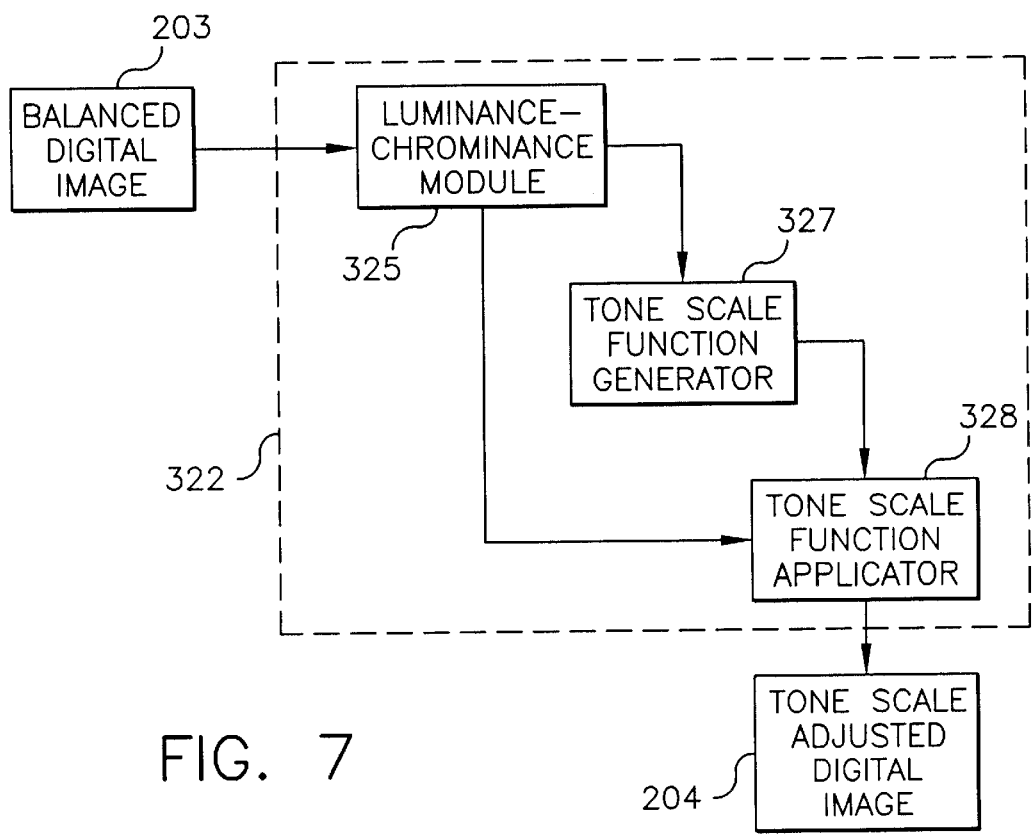
FIG. 7 is a functional block diagram of the tone scale module shown in FIG. 6.

The tone scale module 322 shown in FIG. 6 is illustrated in more detail in FIG. 7. The balanced digital image 203 is received by the luminance-chrominance module 325 which transforms the digital image into a representation which includes a luminance digital image channel with the application of a linear 3 by 3 matrix transform. The resulting digital image channels of the balanced digital image are linear combinations of the starting digital image channels. The transformation generates new pixel values as linear combinations of the input color pixel values. The balanced digital image includes red, green, and blue digital image channels. Each digital image channel contains the same number of pixels. Let $R_{ij}$, $G_{ij}$, and $B_{ij}$ refer to the pixel values corresponding to the red, green, and blue digital image channels located at the $i_{th}$ row and $j_{th}$ column. Let $L_{ij}$, $C1_{ij}$, and $C2_{ij}$ refer to the transformed pixel values of the modified digital image. The 3 by 3 matrix transformation relating the input and output pixel values is as follows:

$$L_{ij} = \tau_{11}R_{ij} + \tau_{12}G_{ij} + \tau_{13}B_{ij}$$
$$C1_{ij} = \tau_{21}R_{ij} + \tau_{22}G_{ij} + \tau_{23}B_{ij}$$
$$C2_{ij} = \tau_{31}R_{ij} + \tau_{32}G_{ij} + \tau_{33}B_{ij} \quad (3)$$

where the $\tau_{mn}$ terms are the coefficients of the 3 by 3 LCC matrix denoted by $[\tau]$. The constants employed by the present invention for $\tau_{11}$, $\tau_{12}$ and $\tau_{13}$ are 0.333, 0.333 and 0.333 respectively. It is important to note that the, present invention may be practiced with other luminance chrominance transformation and still yield good results. For example, a matrix with $\tau_{11}$, $\tau_{12}$ and $\tau_{13}$ values set to 0.30, 0.59, and 0.11 respectively also works well. The calculated values C1 and C2 are examples of digital color difference values.

An alternative method involves transforming the red green blue values of the balanced digital image back to CIE XYZ values where the Y channel of the new description would serve as the luminance digital image channel. The key aspect of the present invention is the combination of the tone scale processing on a luminance signal without substantially affecting the color content of the digital image combined with a method of modifying the color content with a color manipulation method.

The tone scale function generator 327 receives the balanced digital image 203 which has been transformed into a luminance-chrominance representation. The tone scale function generator 327 uses the pixels in the balanced digital image 203 to calculate a tone scale function i.e. a single valued mathematical equation or transformation that has a single output value corresponding to each input value. The present invention implements the tone scale function as a look-up-table for computation efficiency. The result of the application of the tone scale processing produces a tone scale adjusted digital image 204 such that the tone scale, or brightness and contrast, of the digital image is enhanced without modification of the color content.

The present invention may be practiced with a variety of methods which generate tone scale functions. The preferred embodiment of the present invention uses the methods disclosed in U.S. Pat. Nos. 4,731,671 and 5,822,453. These methods are employed by the present invention to produce two individual tone scale functions. These two tone scale functions are then cascaded into single tone scale function which is used to adjust the brightness and contrast of the balanced digital image 203.

In U.S. Pat. No. 5,822,453, issued Oct. 13, 1998 to Lee et al, entitled Method for Estimating and Adjusting Digital Image Contrast, discloses a method of calculating a tone scale function using the pixel values of a digital image involving estimating the scene contrast from the digital image. The method taught by Lee and Kwon involves calculating a Laplacian filtered version of the digital image, forming a histogram of the Laplacian signal, determining from the Laplacian histogram two threshold values which when applied to the Laplacian signal substantially eliminate uniform areas; sampling pixels from the digital image which are based on the thresholds; forming a histogram from the sampled pixels; computing a standard deviation of the sampled histogram; and estimating contrast of the digital image by comparing the computed standard deviation with a predetermined contrast for determining contrast of the input image in relationship with the predetermined contrast. The method described by Lee et al. is used to calculate a first tone scale function.

In U.S. Pat. No. 4,731,671 Alkofer discloses a method of calculating a tone scale function using the pixel values of a digital image based on normalizing the histogram of the digital image. This method involves determining the contrast of the digital image by calculating the standard deviation of a sample of pixel values. The second tone scale function is calculated by normalizing a histogram of the sample of pixels values. The sample of pixel values is selected from one of a plurality of samples of pixel values corresponding to a plurality of contrast intervals based upon the shape of the histogram of the selected sample of pixel values. To facilitate the adjustment of contrast, the tone scale function is constructed to produce values in units of a standard normal variate Z. These Z values are then multiplied by a constant which is a function of the standard deviation of the sample of pixel values to determine the contrast of the processed digital image.

The first and second tone scale functions are combined into a final tone scale function using the mathematical formula:

$$LUT_f = LUT_1[LUT_2[j]] \quad (4)$$

where $LUT_2$ represents the second tone scale function, $LUT_1$ represents the first tone scale function, and $LUT_f$ represents the final tone scale function. The j variable represents the index of pixel values of the digital image to be processed. The final tone scale function $LUT_f$ is calculated by evaluating the expression of equation (4) for the range of possible pixel values.

The final tone scale function $LUT_f$ and the balanced digital image 203 is received by the tone scale function applicator 328. The final tone scale function is applied to the luminance digital image channel of the balanced digital image 203 to adjust the brightness and contrast attributes of the digital image. The present invention may be practiced with more than one method of applying the tone scale function to the pixels of a digital image as a key aspect of the present invention relies on the combination of the method of manipulation of the color and tone attributes of a digital image.

The preferred embodiment of the present invention applies the final tone scale function, in the form of a look-up-table, directly to the pixels of the luminance digital image channel of the balanced digital image 203. This method is preferred primarily for its computational efficiency properties. An alternative embodiment of the present invention employs a method of applying a tone scale function disclosed by Lee et al. in U.S. Pat. No. 5,012,333 issued Apr. 30, 1991, entitled Interactive Dynamic Range Adjustment System for Printing Digital Images, for improved image quality results. Although Lee et al. describe a method for interactively modifying image attributes, the present invention employs the method of applying tone scale functions to digital images based on spatial filtering techniques. This method involves spatially filtering the luminance digital image channel resulting in two spatial frequency components, (high and low components), applying the tone scale function to the low spatial frequency component, and combining the tone scale modified low spatial frequency component with the high spatial frequency component. The resulting processed digital image has enhanced brightness and contrast attributes with improved spatial detail content.

Referring to FIG. 6, the spatial sharpening module 324 receives the tone scale adjusted digital image 204 from the tone scale module 322 and applies a spatial filter to the tone scale adjusted digital image 204 to adjust spatial modulation content. The present invention may be practiced with a variety of different spatial filters, however, a key aspect of the present invention relies on the combination of the method of manipulation of the color, tone and spatial detail attributes of a digital image. An example of a spatial filter that may be used is described by Kwon et al. in U.S. Pat. No. 5,081,692 issued Jan. 14, 1992, entitled Unsharp Masking Using Center Weighted Local Variance for Image Sharpening and Noise Suppression. Kwon et al teach a method of spatially processing a digital image involving transforming a red-green-blue image into a luminance chrominance domain and applying an adaptive filter to the luminance channel. The adaptive filter employs a method of calculating a statistical measure of local spatial activity and varying the sharpness of the image detail structure based the statistical measure. The result of the application of the spatial filter produces a tone scale adjusted digital image with modified values such that the spatial detail of the digital image is enhanced without modification of the color content.

Referring to FIG. 6, an optional RGB conversion module 326 receives the tone scale adjusted digital image 204 and transforms the digital image from a luminance-chrominance representation back to a red-green-blue channel representation with the application of a linear 3 by 3 matrix transform to produce an RGB tonescale adjusted digital image 204'. The resulting digital image channels of the tone scale adjusted RGB digital image 204' have the same color metric representation as the balanced digital image 203. The transformation generates new pixel values as linear combinations of the input color pixel values. The balanced digital image includes red, green, and blue digital image channels as does the tone scale adjusted digital image 204 after having been processed by the RGB conversion module 326.

Each digital image channel contains the same number of pixels. Let $L_{ij}$, $C1_{ij}$, and $C2_{ij}$ refer to the pixel values corresponding to the luminance and two chrominance digital image channels located at the $i_{th}$ row and $j_{th}$ column. Let $R'_{ij}$, $G'_{ij}$, and $B'_{ij}$ refer to the transformed pixel values of the modified digital image. The 3 by 3 matrix transformation relating the input and output pixel values is as follows:

$$R'_{ij} = \eta_{11} L_{ij} + \eta_{12} C1_{ij} + \eta_{13} C2_{ij}$$

$$G'_{ij} = \eta_{21} L_{ij} + \eta_{22} C1_{ij} + \eta_{23} C2_{ij}$$

$$B'_{ij} = \eta_{31} L_{ij} + \eta_{32} C1_{ij} + \eta_{33} C2_{ij} \quad (5)$$

where the $\eta_{mn}$ terms are the coefficients of the 3 by 3 matrix transformation.

The preferred embodiment of the present invention constructs the rgb conversion matrix denoted by $[\eta]$ above as the inverse of the lcc matrix denoted by $[\tau]$ corresponding to the luminance-chrominance conversion module 325 shown in FIG. 7. This is mathematically represented in matrix notation as $$[\eta] = [\tau]^{-1} \quad (6)$$

Figure 8:
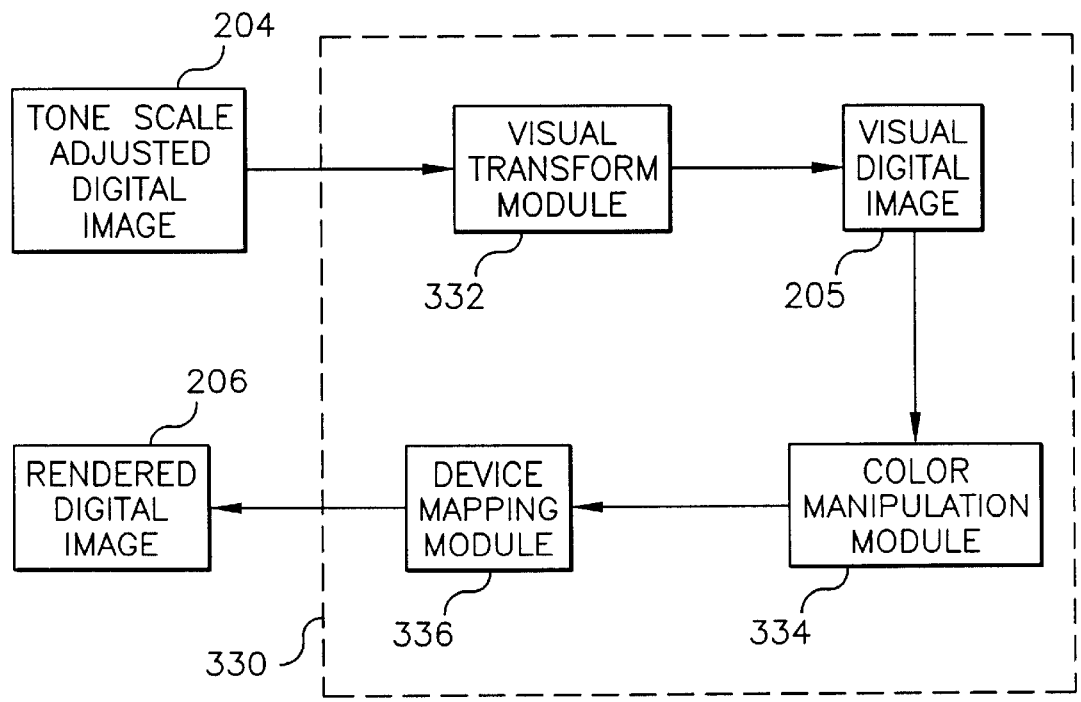
FIG. 8 is a functional block diagram of the rendering module shown in FIG. 3.

The rendering module 330 shown in FIG. 3 is illustrated in more detail in FIG. 8. The tone scale adjusted digital image 204 (or RGB tone scale adjusted digital image 204') is received by the visual transform module 332 which modifies the pixel data of the tone scale adjusted digital image 204 such that the pixel data is in a visual or more nearly visual color space representation and constitutes a visual digital image 205. The visual digital image 205 produced by the visual transform module 332 is received by the color manipulation module 334 which adjusts its color content by applying a preferred color transform. The output digital image produced by the color manipulation module 334 is received by the device mapping module 336 which transforms the pixel data in such a manner that as a result, the pixels values now represent a rendered digital image 206.

Color manipulations are best defined in an approximately perceptually uniform space such as CIELAB. Those skilled in the art will recognize that the optimum reproduction of a scene depends on the intended output medium and the viewing conditions anticipated for this medium. CIELAB coordinates for CIE Standard Illuminant D50 illuminant will be used to illustrate the principles of this invention. This illuminant is assumed as the observer's adaptive white during capture and viewing. Furthermore, the illustrated examples assume that the scene was captured at an average luminance level>1600 cd/m², and the reproduction is viewed at luminance levels between 60 and 160 cd/m² in an average surround with known viewing flare. These are typical conditions for outdoor and flash photography and the resulting reflection prints. However, the invention is not limited to these capture and viewing conditions as it applies to any color reproduction system. Furthermore, the color transformations can be affected between any two color spaces with at least three color channels, although approximately perceptually uniform color spaces are more suitable for designing and implementing the transformations. What is addressed in the present invention is the relationship between the calorimetric properties of the original scene and the viewed reproduction.

Conceptually, preferred color manipulations can be divided into hue, chroma and tone scale operations. In a practical digital system these manipulations could be implemented as any sequence of n-dimensional lookup tables (n—integer>0), matrices, polynomials, shifts and scale factors. These manipulations can be implemented in software or hardware (electronic circuits).

Referring to FIG. 8, the color manipulation module 334 receives the visual digital image 205 from the visual transform module 332. The color manipulation module 334 modifies the color content of the visual digital image by migrating the hue and chroma coordinates of pixels toward or away from predetermined hue and chroma coordinates.

The prerequisite for all hue manipulations is sufficient knowledge of the hues the observer sees in the original scene. As explained in the section dedicated to the capture of the original scene parameters, the spectral sensitivities of most capture media and devices will only produce an estimate of the original scene colors. Colorimetric accuracy requirements for this estimate were given. The requirements are met by a variety of image recording media currently available. Some of these media and devices, sometimes in connection with subsequent digitization and image processing, have been described as having accurate color reproduction (see for example U.S. Pat. No. 5,579,132, issued Nov. 26, 1996 to Takahashi et al., entitled Image Processing System and Method for Faithfully Reproducing Colors of Object from Negative Film. However, obtaining a pleasing reproduction from these media involves a tone scaling operation that is applied to at least three color channels. In optical printing, for example, color negative films are printed onto reflective paper with at least three color sensitive layers. Those skilled in the art will realize that this kind of tone scaling will introduce hue shifts so that the color reproduction can not be completely accurate. In addition, none of the current color reproduction systems incorporate the findings about memory colors in a systematic fashion or use small hue shifts of some colors in order to compensate for undesired hue shifts caused by the variability of the system (processing variability in films, color balance errors, etc.). This invention addresses these problems.

Figure 9:
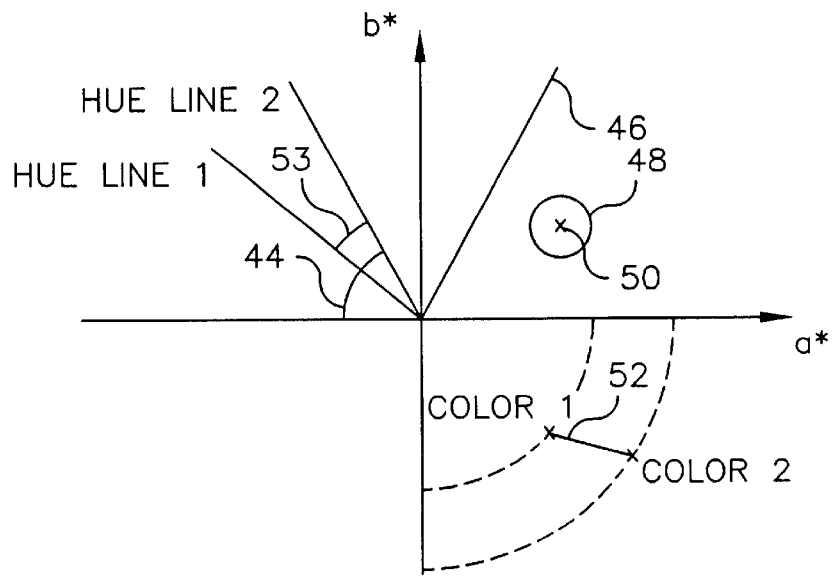
FIG. 9 is a diagram useful for explaining definitions relating to hue and chroma manipulations.

Some definitions are needed in order to explain the hue manipulations that are part of this invention. Referring to FIG. 9, hue and hue angle 44 denote the CIE 1976 a,b hue angle, $h_{ab}$, of a scene color, expressed as a digital estimate of this color. A hue line 46 comprises all colors of a given hue angle. Color on the abscissa with positive a* values correspond to a hue angle, $h_{ab}$, of zero. A region 48 of color space is defined by a centroid color 50, given in CIELAB coordinates, and all colors that fall within a certain CIELAB color difference, $\Delta E^*_{ab}$, from the centroid, in FIG. 9 shown as a projection on the CIELAB a*/b* plane. This distance can be specified as $\Delta E^*_{ab}$ itself, as a lightness (L*) difference, as an a*/b* difference, as a chroma ($C^*_{ab}$) difference 52, and as a range of hue angles ($h_{ab}$) 53.

Figure 10:
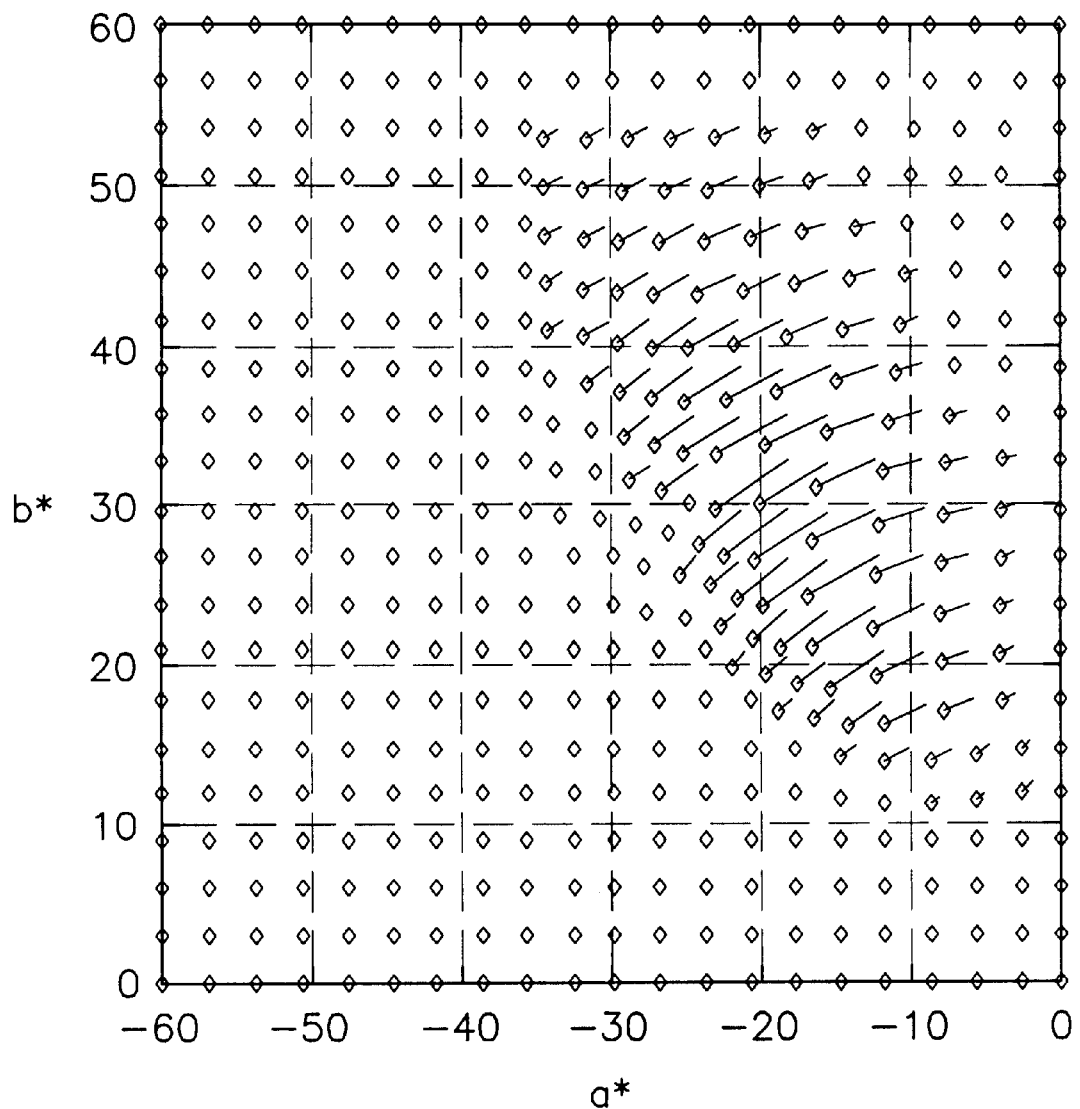
FIG. 10 is a plot illustrating the operation of consistently and smoothly shifting color within a region of color space.
Figure 11:
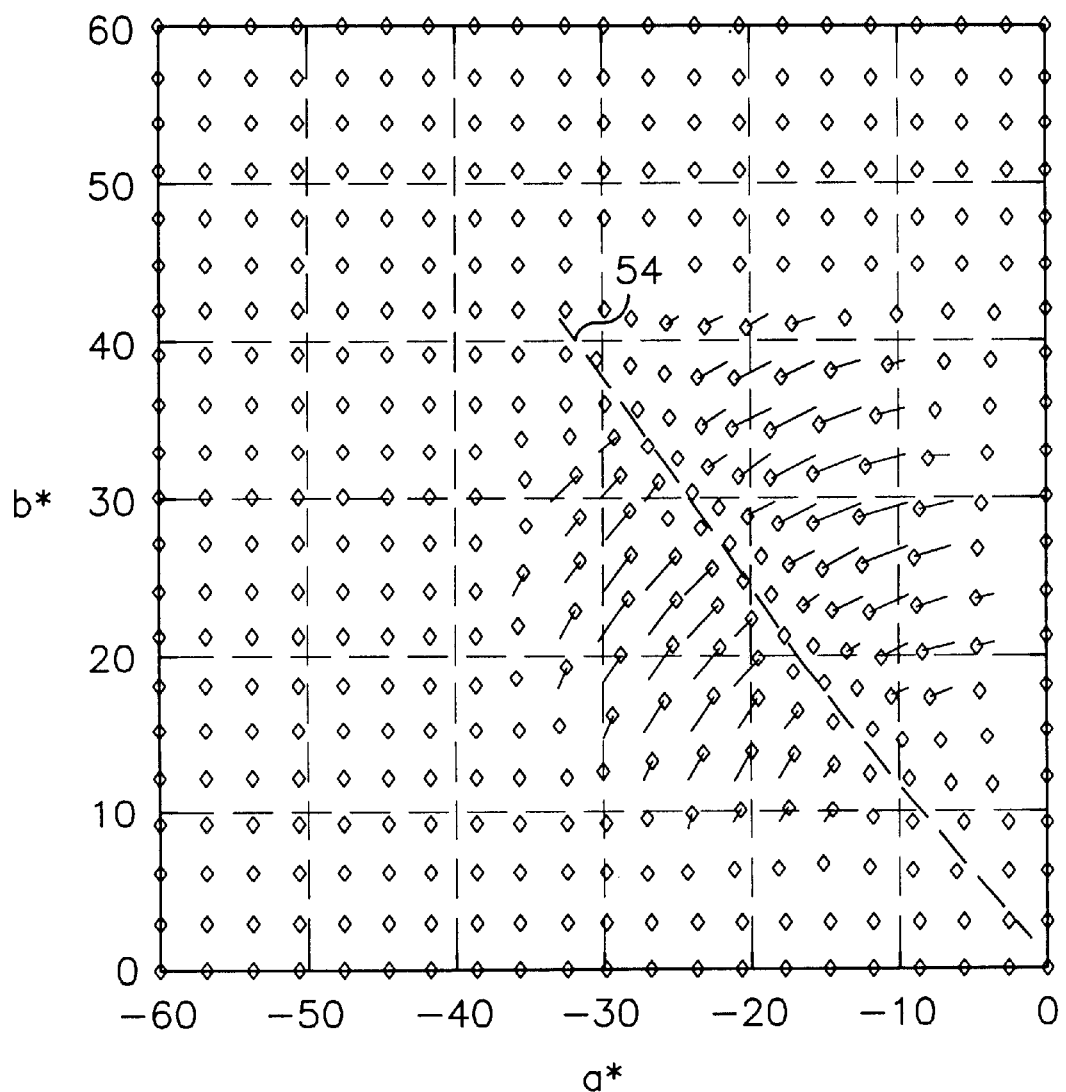
FIG. 11 is a plot illustrating the operation of consistently and smoothly moving colors toward a hue line.

The method of the present invention includes local hue manipulations. These manipulations can take the form of consistently and smoothly shifting colors within a region of color space (as shown for example in FIG. 10) and consistently and smoothly moving colors towards a hue line 54 (as shown for example in FIG. 11). Moving colors within a region of color space towards a hue line means that the hue angle of all specified colors below this hue line is increased while the hue angle of the specified colors above the hue line decreases. Shifting hues of colors within a region of color space means that the hue angle of all selected colors is either increased or decreased. Consistently shifting and moving colors means that more than 80% of the colors within the specified region of color space show the expected behavior. Smoothly shifting or moving colors in a region of color space means that the hue angle shift that colors experience as a function of hue angle is a continuous function with CIE 1976 a,b hue angle shifts below 0.5 at the outer boundary of the region. Hue angle shifts may vary as a function of lightness and chroma of the color. These smooth and consistent moves and shifts can be implemented by defining a continuous functional form between input color and a desired output hue and implementing the functional form in a LUT of any desired dimension. Alternatively, the functional form may be directly calculated and implemented in a digital computer.

We find that reproductions are preferred by the viewer over those from currently available color reproduction systems if the hue values in pre-selected regions of color space are transformed by consistently and smoothly moving hue values within a predetermined region of color space toward or away from hues of predetermined preferred colors, and/or consistently and smoothly shifting a predetermined region of color space to avoid predetermined objectionable colors. The reproductions will be preferred if at least one of the following regions of color space are selected and modified in terms of hue:

1. Shifting colors within a region of color space including the foliage patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the CIE 1976 a,b hue angle of the foliage patch and includes colors that differ by at least 10 CIE 1976 a,b chroma and lightness units from the foliage patch.

2. Moving colors within the region given in step 1) above, consistently and smoothly towards a hue center between CIE 1976 a,b hue angles of 115 and 135 degrees.

3. Shifting colors within a region of color space including the blue sky patch of the Macbeth Color Checker consistently and smoothly towards higher hue angles, limited to a maximum hue angle rotation of 15 degrees, whereby, expressed in terms of CIELAB for CIE Standard Illuminant D50, the region is bounded by hue lines of 10–40 degrees below and above the CIE 1976 a,b hue angle of the blue sky patch and includes colors that differ by at least 10 CIE 1976 a,b chroma and lightness units from the blue sky patch.

4. Moving colors within the region given in step 3 above consistently and smoothly towards a hue center between CIE 1976 a,b hue angles of 250 and 267 degrees.

5. Shifting colors within a region of color space including the yellow patch of the Macbeth Color Checker consistently and smoothly towards lower hue angles, limited to a maximum hue angle rotation of 10 degrees, whereby, expressed in terms of CIELAB for CIE Standard Illuminant D50, the region is bounded by hue lines of 10–20 degrees below and above the CIE 1976 a,b hue angle of the yellow patch and includes colors that differ by at least 10 CIE 1976 a,b chroma and lightness units from the yellow patch.

6. Moving colors within a region of color space including the two skin tone patches of the Macbeth Color Checker consistently and smoothly towards a hue angle between 40 and 50 degrees, whereby, expressed in terms of CIELAB for CIE Standard Illuminant D50, the region is bounded by hue lines of 10–30 degrees below and above the CIE 1976 a,b hue angles of the two skin tone patches and includes colors that differ by 10–30 CIE 1976 a,b chroma units and at least 10 lightness units from the two skin tone patches.

7. Any local hue manipulations where hues are consistently and smoothly moved towards a hue line or a whole section of color space is consistently and smoothly shifted in one direction, whereby, expressed in terms of CIELAB for CIE Standard Illuminant D50, the region affected covers a CIE 1976 a,b hue angle range of 10–60 degrees and includes colors that differ by at least 15 CIE 1976 a,b chroma and lightness values.

In addition the following two requirements have to be met:

8. The image is captured on an image capture medium and/or device capable of capturing the scene parameters such that the CIE 1976 color differences, $\Delta E^*_{ab}$, between the original scene color and the digital representation of the scene color is on average below 5 with a maximum of 12 for the colors on the Macbeth Color Checker, and a maximum of 5 for the two skin tone patches.

9. Application of chroma scaling and lightness transformation steps that maintain the hues resulting from the hue transforming step.

These specifications show, how the regions of color space to be modified in terms of hue can be selected and how the preferred reproduced hue values can be specified.

For the purpose of this invention the reproduction can be produced as a multi-step process, where the scene hue or the viewed hue of the reproduction is recreated before the manipulations prescribed in the invention are applied, or as a single step process, where a suitable color target with known spectral properties is captured and the spectral properties of the reproduction are analyzed, so that some mathematical transform that maps the scene hues to the preferred viewed hues of the reproduction can be constructed.

Figure 12:
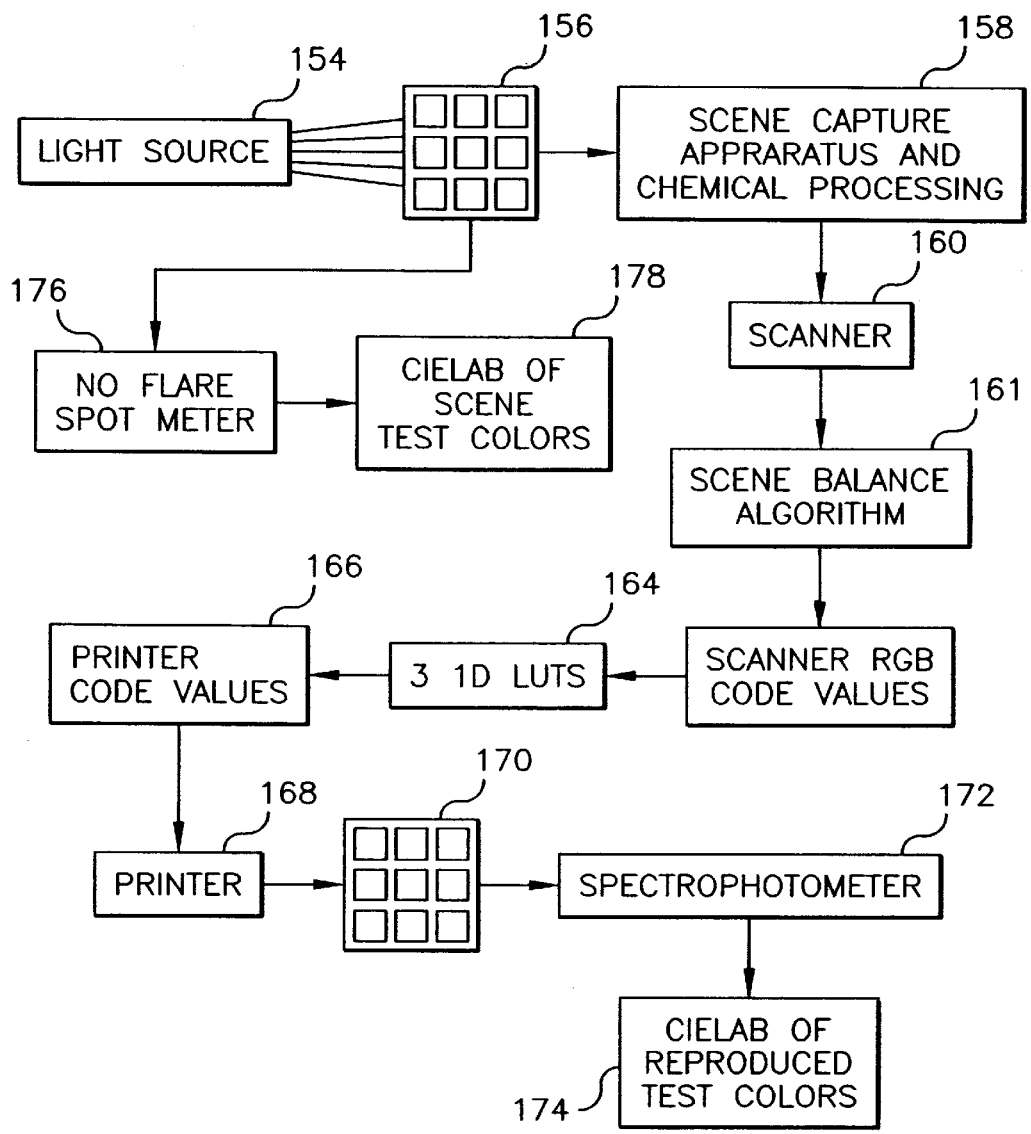
FIG. 12 is a block diagram describing the characterization of a color reproduction system.
Figure 13:
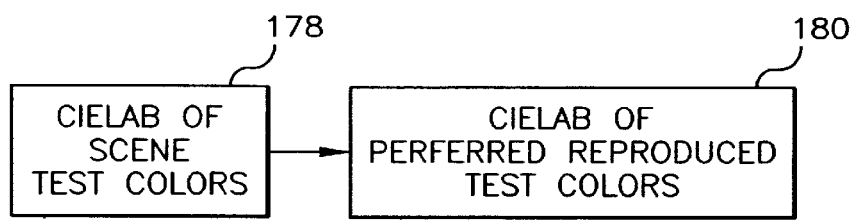
FIG. 13 is a block diagram illustrating the definition of preferred reproduced test colors.

The hue manipulations described above can be implemented at various points of the image processing sequence as transformation between any suitable data encoding metrics. The examples below show how hue information can be deduced at various steps of the processing sequence. Examples include, but are not limited to the following:

1. FIG. 12 illustrates how lightness, hue and chroma information can be deduced without the additional step of transforming captured digital representation of scene colors into a true scene color representation. A color negative photographic film can be scanned on a trichromatic scanner 160 whose spectral responsivities match those of a particular optical photographic printer and photographic output medium. A scene balance algorithm 161 can be applied to the scanned images followed by applying one-dimensional look-up tables 164 to each of the three color channels. The resulting printer code values 166 can be sent to a calibrated digital printer 168 to produce a print 170 in order to emulate the results of optical printing. As discussed before, without any additional manipulations, the reproduced images are less preferred by the viewers than those created as prescribed in the invention. However, a suitable test target 156 can be captured, processed and reproduced 158 as described above. CIE colorimetry, referring to CIE Standard Illuminant D50, of the target and the reproduction can be obtained, and CIE 1976 lightness and a/b chroma and hue angle of the illuminated target 178 and the reproduction 174 can be calculated according to standard procedures. A low flare telespectroradiometer 176 can be used to measure the target spectra including the illuminant (light source) 154, and a spectrophotometer 172 can be employed to measure the spectra of the reproduced target. Referring to FIG. 13, this data is compared with the preferred CIELAB values of the reproduced test colors 180, in particular hue, which can be calculated according to the procedures outlined in cases 1–7 and 9 above.

Figure 14:
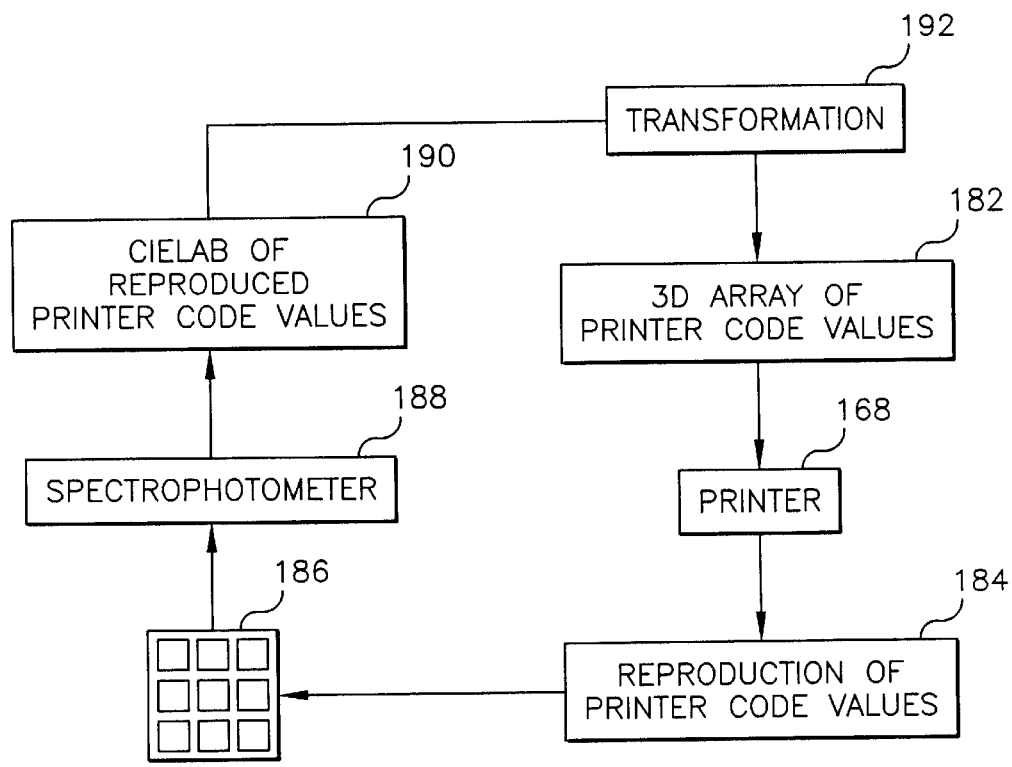
FIG. 14 is a block diagram illustrating the characterization of a printer.

Referring to FIG. 14, as a next step, a printer characterization is required, i.e. an array of suitably chosen printer code values 182 is printed 184 to make a reproduction 186, and the CIELAB values of the reproduction 190 are measured using a spectrophotometer 188. A transformation 192 can be constructed to map the CIELAB values of the reproduction to printer code values.

Figure 15:
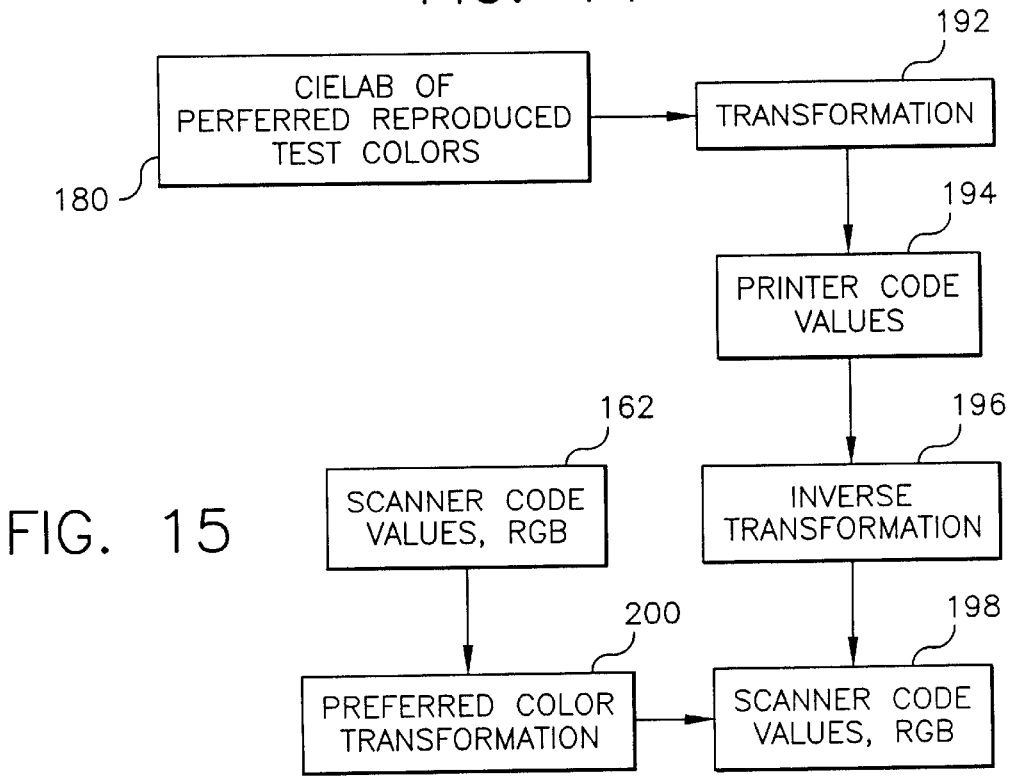
FIG. 15 is a block diagram illustrating the construction of a transformation of scanner code values so that preferred colors are reproduced.

Referring to FIG. 15, this transformation can be used to convert the preferred CIELAB values of the reproduced test colors 180 to printer code values 194. If the inverse of transformation 196 performed by the one dimensional look up table 164 is used to produce the scanner code values 198 corresponding to the printer code values 194 can be calculated. From the data sets of scanner code values 162 and 198, a preferred color transformation 200 can be constructed that alters the scanned pixel values such, that the hues are reproduced as prescribed in cases 1–7 and 9 listed above. In the image processing sequence, the images would be received by the scene balance module 314 (see FIG. 4), passed to the tone scale module 322 and the spatial sharpening module 324 (see FIG. 6), and this preferred color transformation 200 is applied just before the transformation represented by LUT 164 shown in FIG. 12, combining the functions of the color manipulation module 334 and the device mapping module 336 (see FIG. 8).

2. Scene colors can be estimated as described in the color metric conversion module 312 of FIG. 4, and encoded in any suitable data metric that represents a 1:1 mapping of CIE colorimetry, e.g. CIE XYZ, CIELAB, CIELUV, CIECAM97s, and any RGB space whose primaries are linear combinations of the color matching functions, e.g. the encoding proposed by Spaulding et al. (K. E. Spaulding, E. J. Giorgianni, G. Woolfe, "Reference Input/Output Medium Metric RGB Color Encodings (RIMM/ROMM RGB)", Proceedings of IS&T PICS 2000 Conference). Suitable regions of color space for hue manipulations are selected and the preferred hues are specified according to the rules listed in cases 1–7 and 9 above. The hue transformation can be constructed between any of the color spaces listed above to modify the scene colors according to the specifications and applied to the digital image.

3. The image, scanned as detailed in example 1, or the digital estimates of the scene colors, as described in example 2, can be rendered for a particular output medium and the intended viewing conditions using any suitable nonlinear transformation. In the simplest case three one-dimensional look-up tables can be applied to the three color channels. If the relation between the pixel values of the rendered image and the CIE colorimetry of the output image is known, for example from reproducing and measuring a suitable test target, or from the color encoding specification of the resulting digital image, a transform can be constructed that alters the rendered image pixel values according to the specifications for the preferred reproduced hues. Referring to FIGS. 12 and 15, this transformation is now constructed between printer code values 166 in FIG. 12 and printer code values 194 in FIG. 15. This transform is applied to the digital image. In the image processing sequence, the images would be received by the scene balance module 314 (see FIG. 4), passed to the tone scale module 322 and the spatial sharpening module 324 (see FIG. 6), followed by the application of three one-dimensional LUTs 164 (see FIG. 12) and the just constructed transform.

4. Polar coordinate versions of suitable luminance/chrominance color encoding schemes correlate with CIE 1976 a/b hue and chroma. After some initial calibration, as described in the 3 examples above, the resulting digital pixel values can be utilized to deduce hue and chroma values of the scene or the reproduction. One suitable RGB encoding scheme for this type of operation was proposed by Spaulding et al. (K. E. Spaulding, E. J. Giorgianni, G. Woolfe, "Reference Input/Output Medium Metric RGB Color Encodings (RIMM/ROMM RGB)", Proceedings of IS&T PICS 2000 Conference). In this case equal red, green and blue pixel values represent a neutral color in the scene or the image. The RGB pixel values, which represent a logarithmic encoding of light intensity over a wide range of code values, could be transformed into a luminance/chrominance representation $LC_1C_2$ according to Eqn. 3. with the matrix $$M = \begin{bmatrix} 1/3 & 1/3 & 1/3 \\ -1/4 & 1/2 & 1/4 \\ -1/2 & 0 & 1/2 \end{bmatrix} \quad (7)$$

The hue angle $h_{c1c2}$ could be calculated according to the equation $$h_{c1c2} = a\tan\left(\frac{C_2}{C_1}\right) \quad (7a)$$

while chroma $C_{c1c2}$ in this representation would be defined as:

$$C_{c1c2} = \sqrt{C_1^2 + C_2^2} \quad (7b)$$

The calculated values $h_{c1c2}$ and $C_{c1c2}$ are examples of digital color difference values.

The scanner RGB code values defined in method 1 above can be transformed to a luminance/chrominance representation in a similar fashion, and hue and chroma estimates could be obtained accordingly. In each of the above cases a simple linear or nonlinear transformation maps the $h_{c1c2}$ and $C_{c1c2}$ values to the corresponding CIELAB 1976 a/b hue and chroma values with sufficient accuracy for the purpose of this invention.

Methods similar to 1–4 given above can be used to alter chroma and lightness according to the specifications given in this invention.

Figure 16:
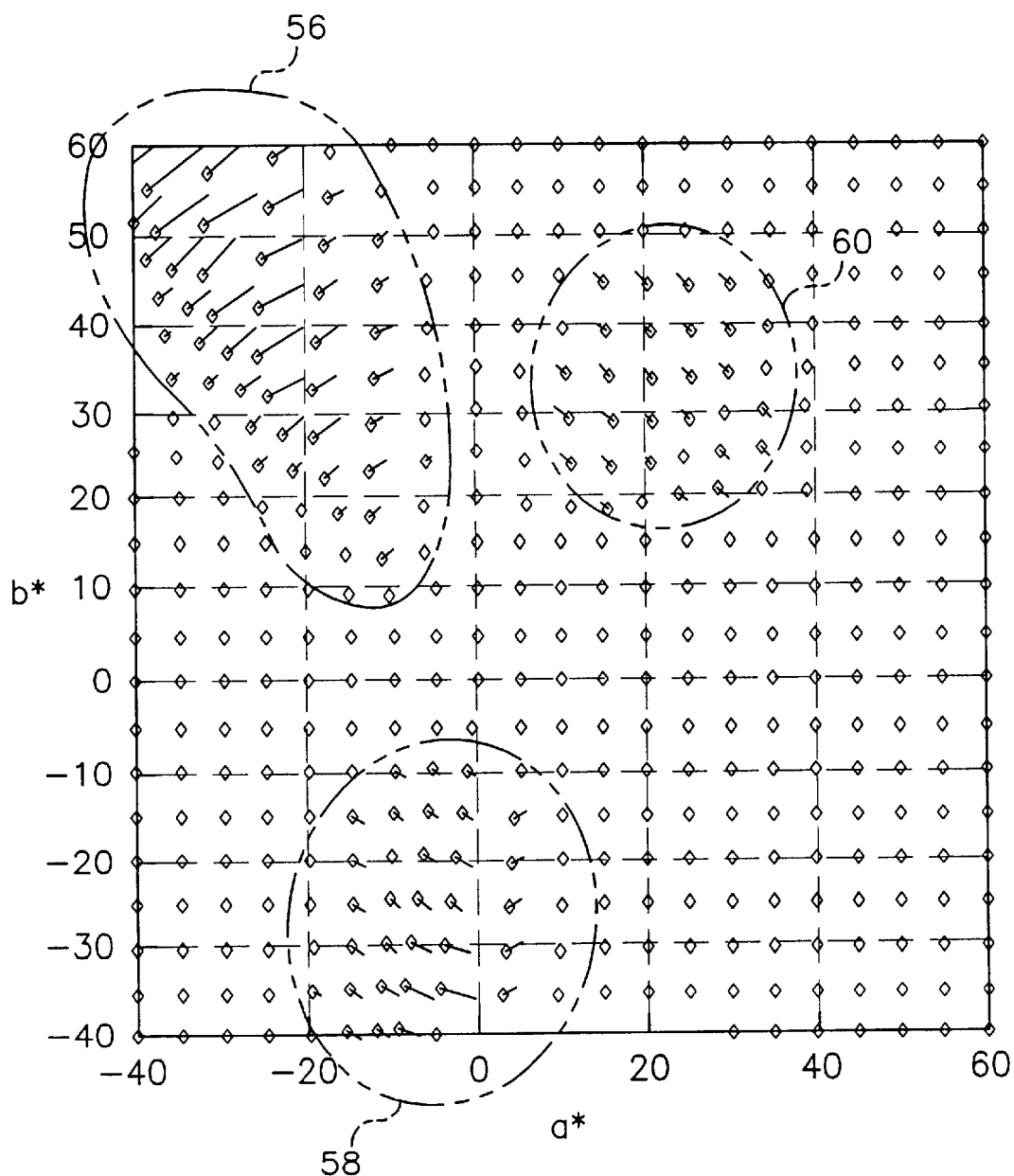
FIG. 16 is a plot showing desired hue shifts for a regular grid of CIELAB a*/b* values in a system without processing variability.
Figure 17:
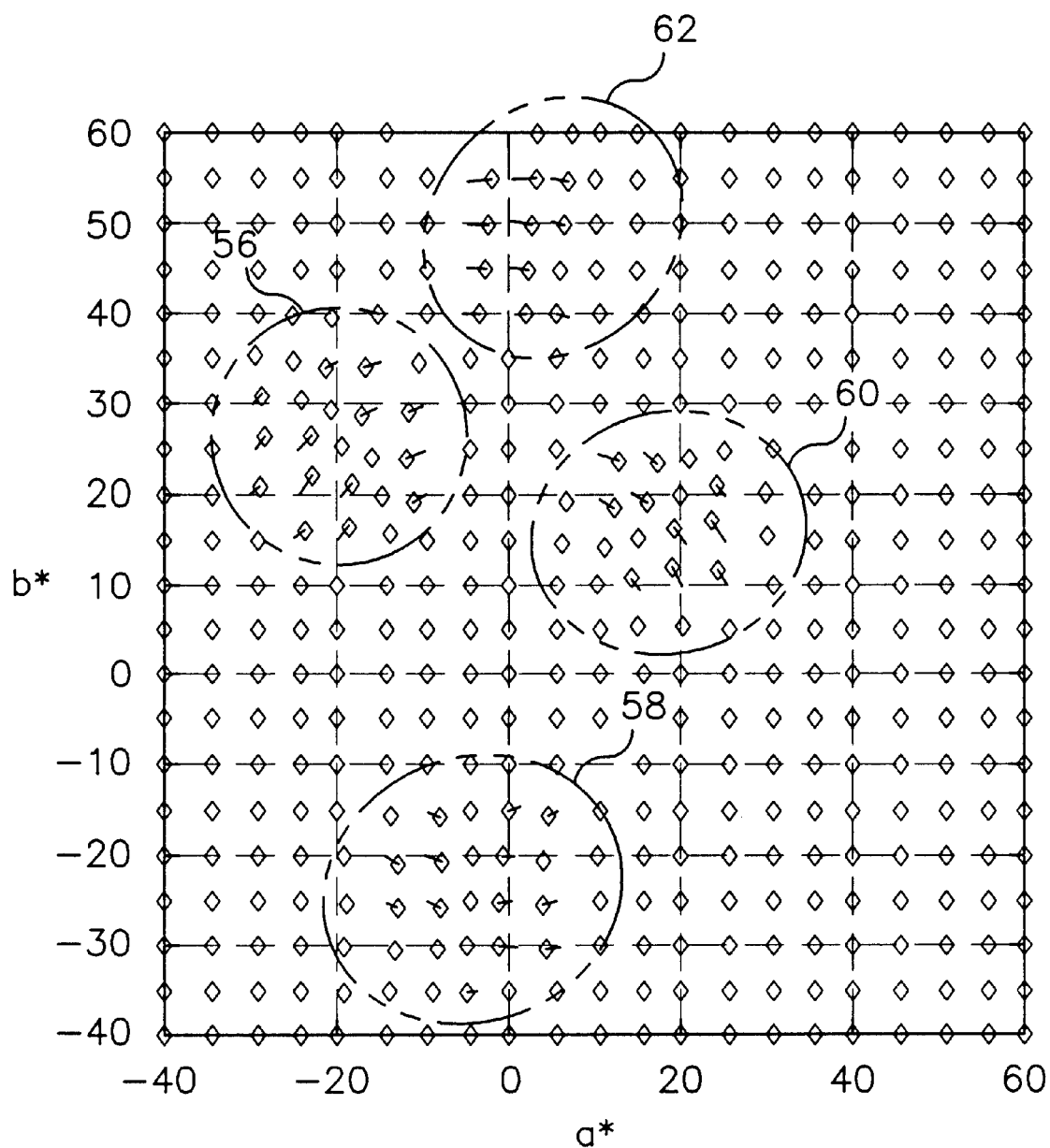
FIG. 17 is a plot showing desired hue shifts for a regular grid of CIELAB a*/b* values in a system having processing variability.

FIGS. 16 and 17 illustrate the desired hue shifts for a regular grid of CIELAB a*,b* values calculated for CIE Standard Illuminant D50. FIG. 16 shows an example for the preferred hue reproduction in a system without processing variability. In this case the foliage 56 and blue sky 58 sectors of color space have been rotated, and skin tones 60 have been drawn towards the CIE 1976 a,b 45 degree hue line. FIG. 17 shows how the hue reproduction could be modified for a system including variability, so that the optimum system color reproduction is obtained including all the sources of processing variability. In this case, the memory colors skin 60, sky 58 and foliage 56 are consistently and smoothly moved towards a hue line, while yellow hues 62 are shifted towards orange.

Both types of hue manipulations can be implemented in practical systems. In order to avoid image processing artifacts, smooth transitions between the manipulated regions of color space and the surrounding colors must be achieved.

The present invention yields the most preferred results if the system variability is reduced compared with current systems based on a two stage chemical film/paper process. Processing variability can be reduced, for example by providing a magnetic layer or other additional information recording on film to record additional scene capture information, e.g. average luminance level, information about flash usage, color temperature or even geographical information. Electronic cameras can also record this type of information on any suitable memory card. Additionally, patches of a known exposure can be pre-exposed on the film and analyzed after the film is developed to determined the response of the film. This information can also be used in advanced scene balance algorithms such as illustrated in the scene balance module 314 shown in FIG. 4.

Images are most preferred by viewers if neutral colors in the scene are reproduced as visually neutral colors and the images are colorful with a natural reproduction of skin tones. Their most natural reproductions are obtained if the colorfulness of objects in the image changes in proportion to their colorfulness in the scene. This behavior reflects the changes that occur when illumination levels change on the surface of an object (transition from highlights to shadows).

The requirement of a proportional relationship of the colorfulness of objects in the scene and the image is best expressed by the ratio of CIE 1976 a*,b* chroma values of the reproduction relative to the scene. This ratio will be called chroma ratio and alternatively is referred to as scaling chroma values.

In U.S. Pat. No. 5,528,339, Buhr et al. pointed out that constant chroma ratios throughout color space (apart from gamut limitations of the output medium and/or device) may not always produce the most preferred images. Viewers prefer the high colorfulness that is produced by some current silver halide color reproduction systems. However, due to the limitations of optically printing one chemically processed material onto another chemically processable material, high colorfulness is achieved at the expense of unnatural skin tone reproduction. Buhr et al. also established that the most preferred reproductions can be obtained by applying different chroma scaling in the skin tone region and in the remaining regions of color space and they quantified suitable boundaries for these factors. This approach will produce reproductions that are even more preferred by viewers if it is combined with the hue manipulations described in the previous section.

The range of preferred chroma ratios for skin tones and other colors acknowledges that colorfulness is subject to individual preferences and that the preferred settings also depend on the discrepancy between scene and image viewing conditions. For example, the preferred average ratio between reproduced chromas and scene chromas would differ, if the same scene was captured on color negative film for reflection print viewing or viewing on a monitor in an average surround, or if it was captured or reproduced on slide film for viewing in a darkened room. Therefore the properties of chroma ratios that produce a reproduction that is preferred by the viewers, will be formulated in a more general way for the purpose of this invention. We found that preferred reproductions are obtained by:

1. Scaling the chroma values of the digital representation of the scene such that the CIE 1976 a,b chroma ratios of the reproduced image and the original scene for the two skin tones patches of the Macbeth Color Checker is less than or equal to that for the foliage and sky patches.

2. Selecting the scaling factor for the chroma of the patches of the Macbeth Color Checker excluding the neutral, skin, sky and foliage patches, such that the ratio of the CIE 1976 a,b chroma of the reproduced patch and the original of at least one of these patches is at least as high as the higher of the chroma ratios of the foliage and sky patches, and that the chroma ratio of at least two of these patches is at least as high as the maximum of the chroma ratios of the two skin tone patches.

3. Keeping the standard deviation of the CIE 1976 a,b chroma ratios of the reproduction and original of all color patches of the Macbeth Color Checker patches below 0.4, excluding the neutral patches.

4. Performing chroma scaling such that the reproduced chroma varies smoothly in the sense of being a continuous function of CIE 1976 lightness, chroma and hue angle.

Figure 18:
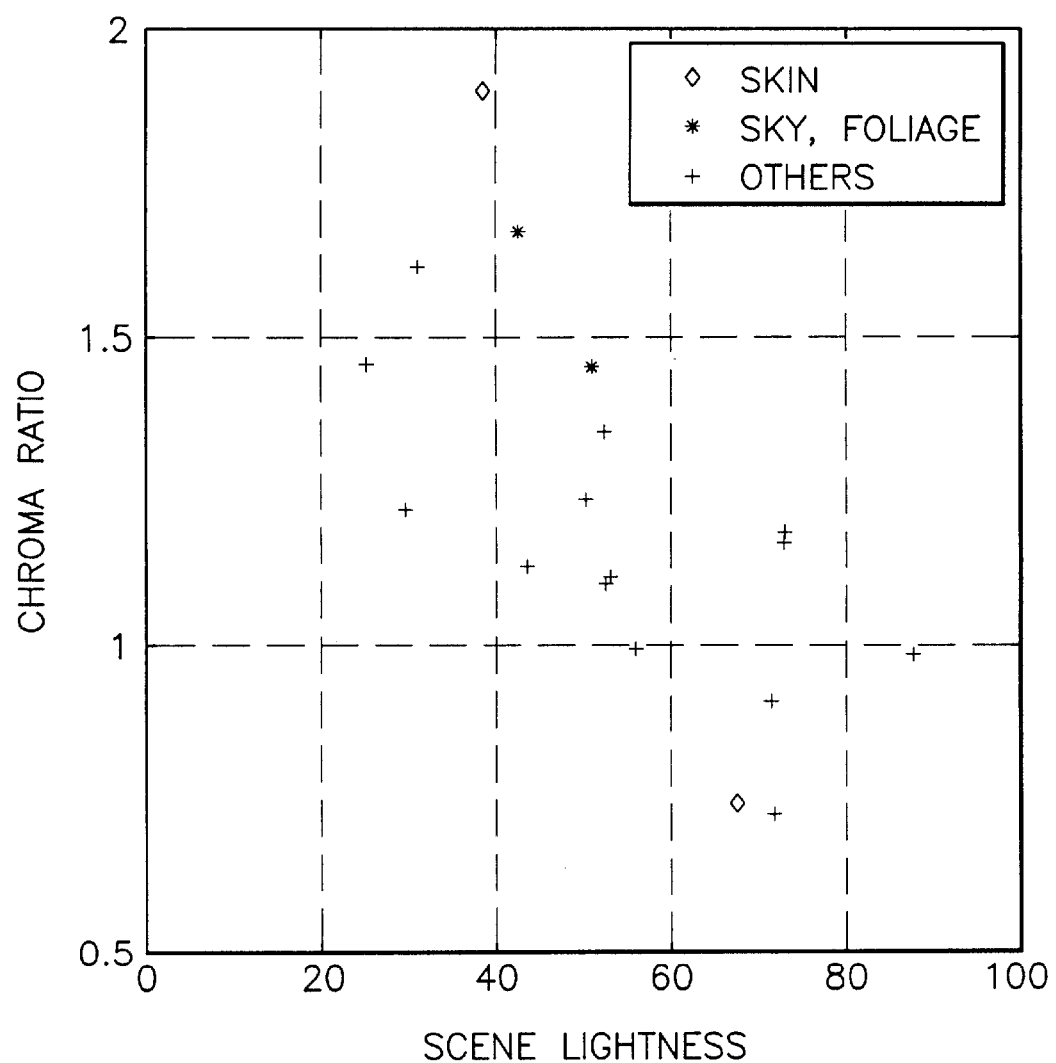
FIG. 18 is a plot showing the CIELAB chroma ratio of reproduced colors relative to the scene colors of a Macbeth Color Checker for a system that does not follow preferred rules of chroma manipulation.
Figure 19:
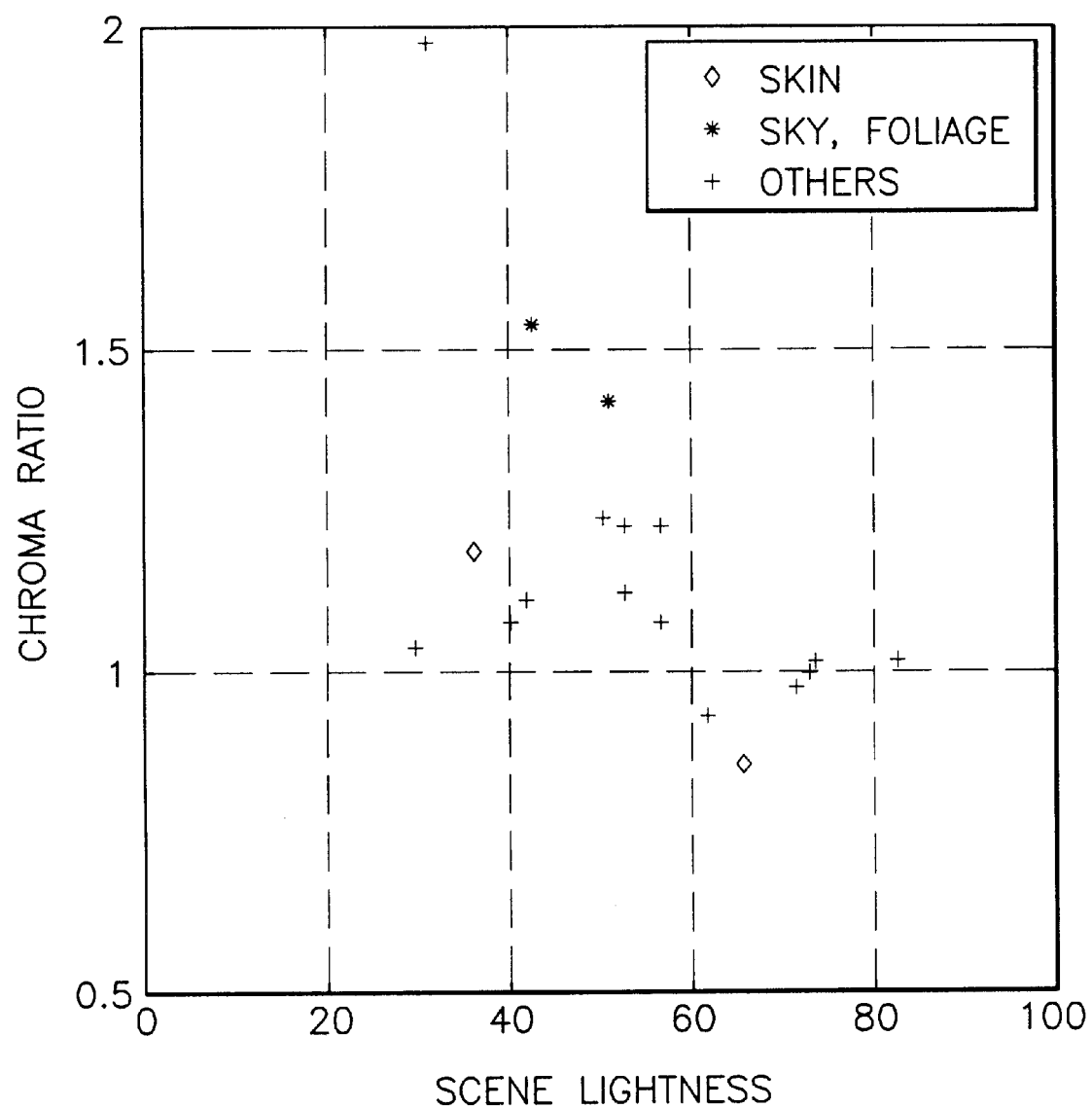
FIG. 19 is a plot showing the CIELAB chroma ratio of reproduced colors relative to the scene colors of a Macbeth Color Checker for a system where chroma manipulations were carried out according to the present invention.

FIG. 18 and FIG. 19 show the CIE 1976 a,b chroma ratio of the reproduced colors relative to the scene colors of Macbeth Color Checker as a function of the original lightness of the patch. FIG. 18 illustrates the data for a conventional system that does not follow the rules of chroma manipulation specified above. FIG. 19 depicts an improved system where chroma manipulation was carried out according to the limits given in this invention. Both systems are intended for reflection print viewing.

In addition to the hue and chroma manipulations listed above, a tone scale transformation must be applied to map the relative luminance values of scene colors to relative luminance values of the reproduced colors. It is well known in the art that this is rarely a 1:1 mapping. The selection of a global tone scale function that produces the most preferred images depends on a variety of factors, including the discrepancy between viewing conditions of the scene and the reproduction, anticipated subject matter (e.g. portrait photography, outdoor photography), the dynamic range of the scene in relation to the dynamic range that can be reproduced on the intended image output device 230 (see FIG. 2), and viewer preferences.

Figure 20:
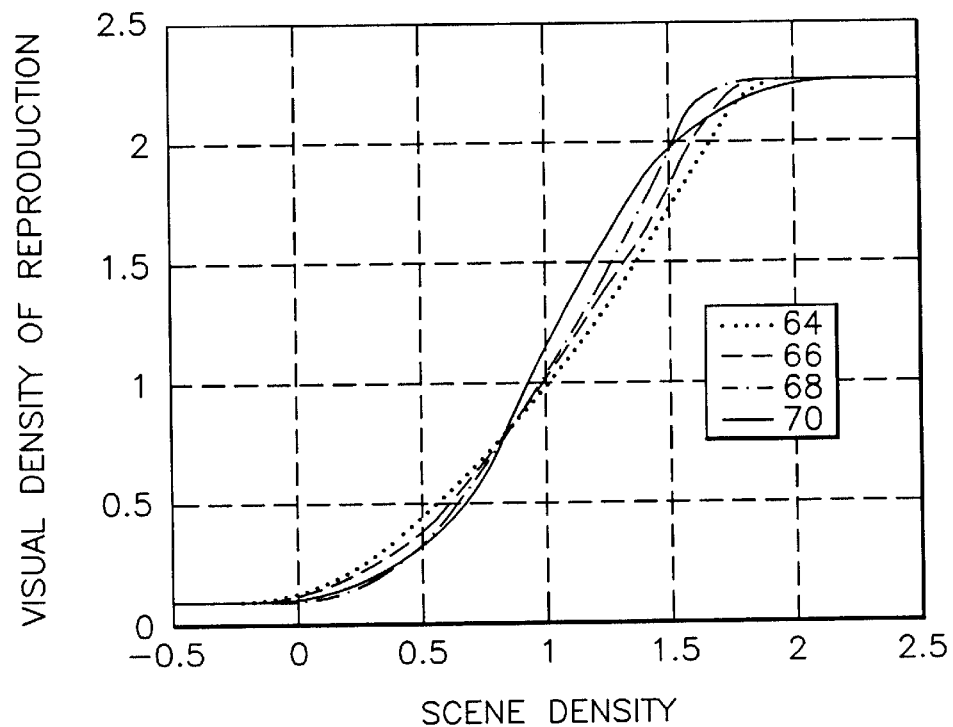
FIG. 20 is a plot showing a range of suitable tone scale functions for a consumer photography system that produces reflection prints
Figure 21:
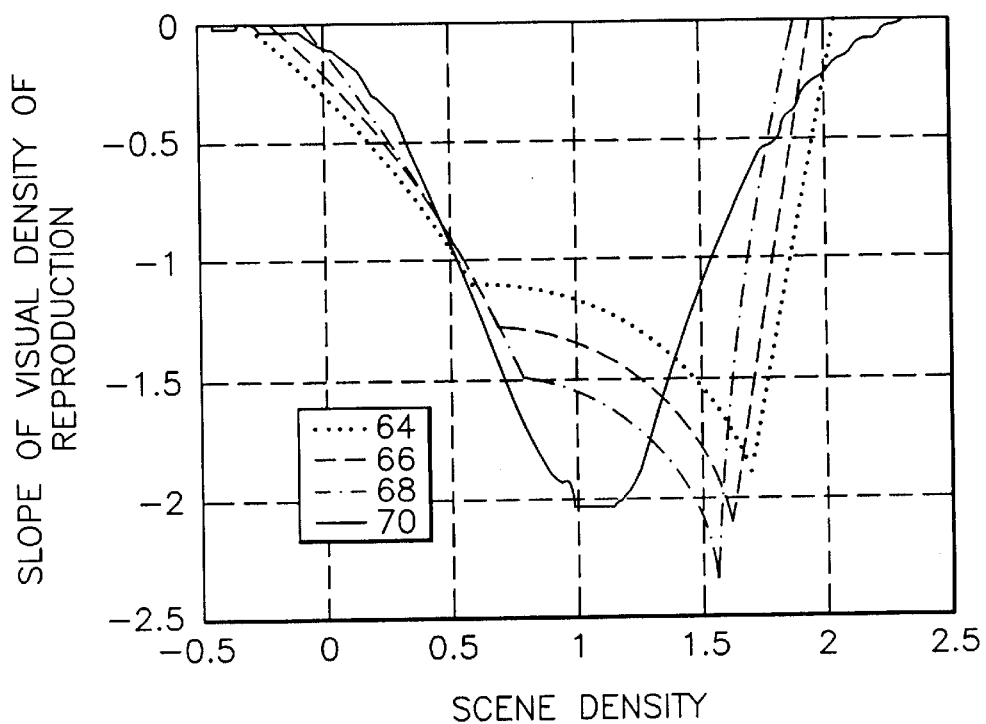
FIG. 21 is a plot showing the slopes of the tone scale functions shown in FIG. 17.

A family of tone scale functions that produce preferred reproductions in combination with the hue and chroma manipulations described above, was defined by Buhr et al. in U.S. Pat. No. 5,300,381. However, the invention is not limited to these tone scale functions that are characterized by a linear relationship between scene lightness and lightness as perceived by the viewer. We found that the traditional S-shaped tone scale functions, which are mostly used in conventional silver halide photography, also produce more preferred images within the framework of this invention compared with current color reproduction systems, because of the large improvements in hue reproduction. FIG. 20 shows four examples 64, 66, 68 and 70 of suitable tone scale functions for a consumer photography system that produces reflection prints. Visual optical density of the reproduction is shown as a function of scene density. In the discussion below, contrast refers to the slope of these curves at a scene density of 1 as shown in FIG. 21. All of these global lightness transformations described above increase the contrast of the image.

The present invention relies on the tone scale modification of the image data performed in the tone scale module 322 to adjust the scene content of the digital image to account for factors related to the particular digital image being processed. The tone scale function generator 327 shown in FIG. 7 uses the pixels of the balanced digital image 203 to construct a tone scale function. As such, the tone scale function used to modify the balanced digital image 203 within the tone scale module 322 is a scene-dependent tone scale function meaning that the tone scale function depends on the pixel data.

The global tone scale function applied to the visual digital image 205 within the color manipulation module 334 shown in FIG. 8 is designed to produce the appropriate image contrast for the intended viewing conditions, i.e. light levels, surround and flare. In addition, the tone scale might take into account the dynamic range of the output medium, i.e. the minimum and maximum visual densities that can be reproduced. This system maintained tone scale function is independent of the digital images being processed and thus is termed a scene-independent tone scale function. The preferred implementation of the present invention uses a global tone scale function bounded by tone scale functions 64 and 66 in FIG. 20.

Figure 22:
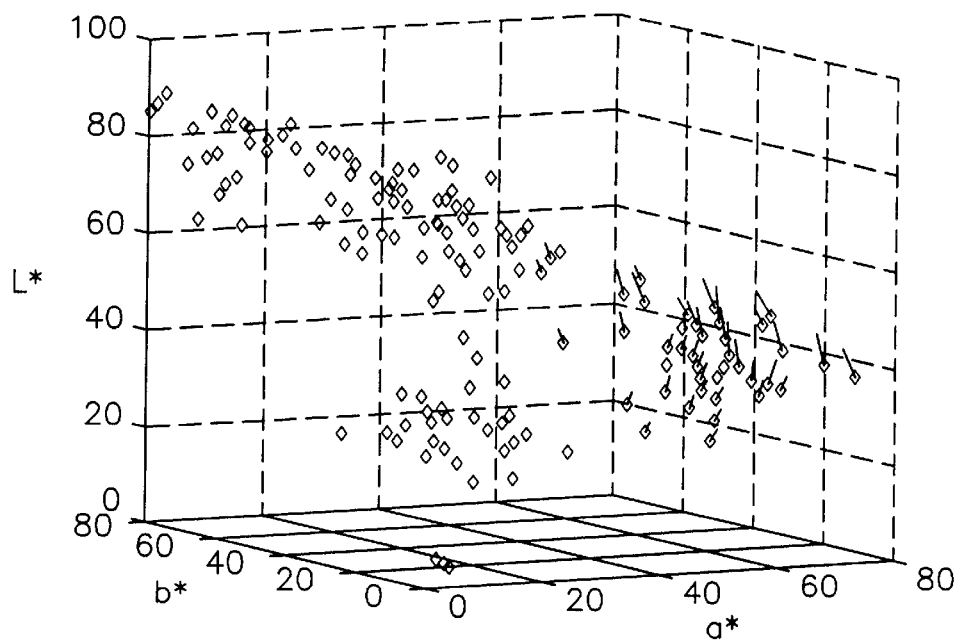
FIG. 22 is a plot showing a preferred color transformation for red colors reproduced on a silver halide reflection medium.

In addition to the scene-independent tone scale function lightness modifications, we have found that local lightness manipulation in certain regions of color space may provide images that are even more preferred by the viewer. For example, the colorfulness of red colors reproduced on a silver halide reflective medium can be increased if the lightness of the scene colors within a distance of 20 CIE 1976 a*,b* chroma units and at last 15 CIE 1976 lightness units from the Macbeth Color Checker red patch is lowered compared with the global tone scale function. Again, this transformation is required to be smooth in the sense that the reproduced lightness must be a continuous function of CIE 1976 lightness, hue angle and chroma. An example of such a transformation is shown in FIG. 22.

Referring to FIG. 8, the device mapping module 336 receives the modified visual digital image 205 from the color manipulation module 334. The digital image processing steps conducted within the device mapping module 336 involve transforming the pixel values of the visual digital image 205 into a corresponding set of device code values to account for the color manipulation characteristics of the output device and media. The transformation between device code values and the colorimetry of the colors reproduced by a particular device/media combination can be obtained by a device characterization. An example of a device characterization is a procedure that involves generating and printing or displaying a suitable array of device code values in the form of color patches of a size large enough for subsequent measurement. These patches can be measured using a colorimeter, a spectrophotometer or a telespectroradiometer, depending on the nature of the display. If spectra are measured, CIE XYZ values and other related quantities such as CIELAB or CIELUV values can be calculated for the display illuminant using standard calorimetric procedures. This data set can be used to construct the appropriate sequence of one-dimensional look-up tables, multidimensional look-up tables, matrices, polynomials and scalars that accomplishes that transformation of the digital representation of the scene resulting from the combined processing operations performed in the device mapping module 336 (shown in FIG. 8) into a set of device code values that produces this desired visual representation of the scene. Another example of the implementation of this transformation is an ICC profile that maps the specifications of the desired visual reproduction, encoded in profile connection space (PCS) to device code values.

This operation may also include gamut mapping. The color gamut characteristics of the visual digital image 205 produced by the color manipulation module 334 is determined by the set of primaries that was used for encoding the data. Examples include the primaries corresponding to the color-matching functions of the CIE 1931 Standard Colorimetric Observer or any linear combinations thereof. Gamut mapping is performed between the gamut defined by this encoding and the gamut of the output device/media combination. The preferred gamut mapping algorithms used in combination with this invention are those that maintain hue.

From an imaging processing point of view, the data transformation performed by the device mapping module 336 can be combined with any of the transformations embodied within the visual transform module 332 and color manipulation module 334 to form a single set of one-dimensional look-up tables, multidimensional look-up tables, matrices, polynomials and scalars in any sequence. Reproductions according to the specifications of this invention can be produced by a variety of technologies. Reproductions can be obtained on silver halide or other light-sensitive materials.

The light-sensitive material, as used by an image output device 230, may be transparent film, reflective paper, or semi-transparent film. These materials are exposed by visible or infrared light derived from many different sources. The materials may be designed for typical photofinishing applications or they may be specially designed for digital printing applications. The photo-sensitive materials respond primarily to three different spectral regions of incident light. Typically, these are red (600–720 nm), green (500–600 nm), and blue (400–500 nm) light. However, any combination of three different spectral sensitivities can be used. These could include green, red, and infrared light or red, infrared 1, and infrared 2 light, or 3 infrared lights of different wavelengths. Or a material sensitive the three primary wavelengths of visible light may be false sensitized so that the color of the exposing light does not produce image dye of the complementary hue, such as red, green, and blue sensitivity producing magenta, yellow, and cyan dye, respectively. Printing can be effected by exposing all pixels sequentially, by exposing a small array of pixels at the same time, or by exposing all the pixels in the image at the same time.

Devices which can be used to print on light-sensitive materials include CRT, LED (Light Emitting Diode), LVT (Light Valve Technology), LCD, Laser, as well as any other controlled optical light generating device. All these devices have the ability to expose 3 or more light-sensitive layers in a light-sensitive material to produce a colored image. They differ mainly in the technology on which the devices are based. A suitable embodiment of a CRT printer is the Kodak Digital Science LF CRT Color Printer which can be used in combination with Kodak Professional Digital III Color Paper.

Non-light-sensitive imaging materials are conveniently used by electronic printing processes to produce high-quality reproductions. The printing process can be based on many technologies. The method of image formation can be half-tone, continuous tone, or complete material transfer. The imaging material can be transparent film, reflective paper, or semi-transparent film. The materials can be written on to produce pictorial images by thermal dye transfer, ink jet, wax, electrophotographic, or other pixelwise writing techniques. These processes use three or more colorants to create colored pictorial representations of pictorial scenes. The colorants may be dyes, toner, inks, or any other permanent or semi-permanent colored material. A suitable embodiment of a thermal printer is the Kodak XLS 8650 thermal dye transfer printer.

In addition to hardcopy viewed images, it is also possible to create projected images which have the same preference over previously generated pictorial images. Many technologies are appropriate for this kind of image generation. All these techniques rely on producing color images with 2 or more colored lights. These are typically red, green, and blue in nature although they can be any set of primaries. Devices which can be used to create the preferred viewed reproduction include CRT, LCD, EL (Electro-Luminescence), LED, OLED (organic LEDs), light bulbs, lasers, plasma display panels, or any other three or more colored lighting apparatus capable of pixelwise illumination. The images can be created by display within the device, projection, or backlighting. Many devices create an image on a screen or display area which is physically a part of the mechanical unit. However, images can also be created by optically projecting the image in the form of light rays from behind or in front of the viewer toward a screen which is in front of a viewer or by projecting a reversed image toward the viewer onto a screen between the viewer and the projecting device. A suitable embodiment of a CRT display is a Sony Trinitron CRT.

Figure 23:
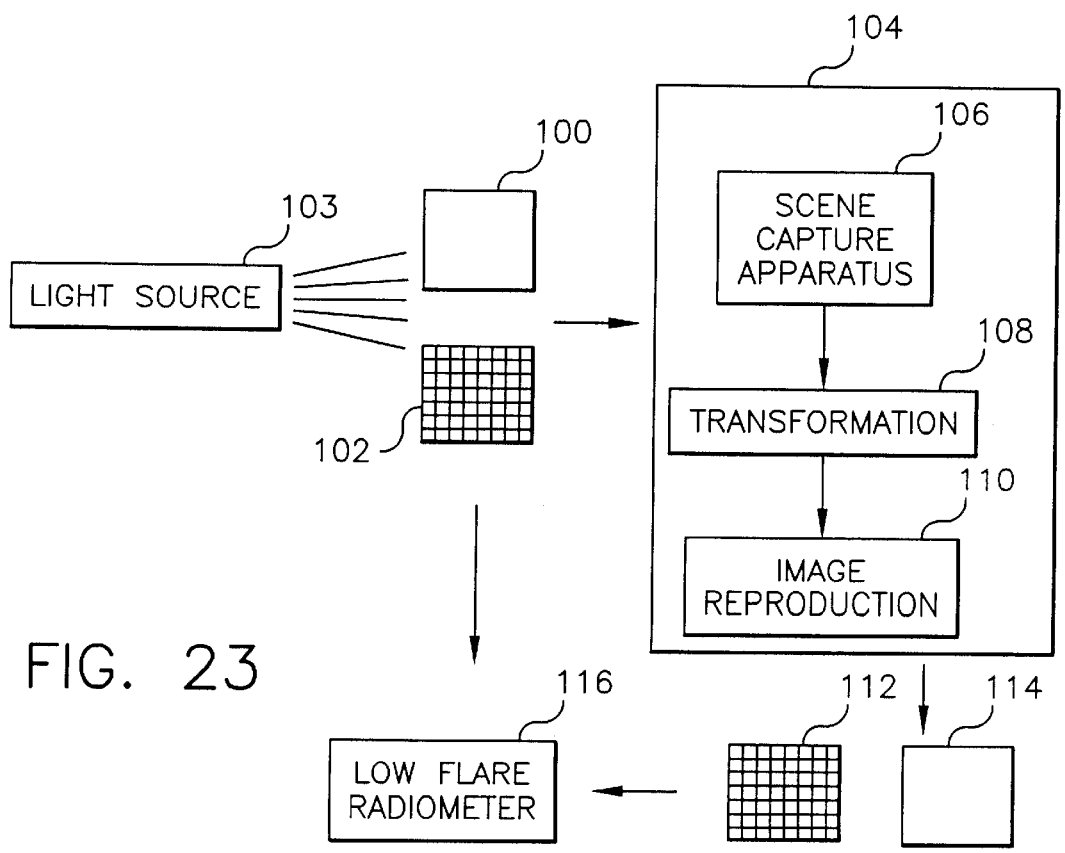
FIG. 23 is a block diagram illustrating a testing procedure for determining the color and tone reproduction of an image reproduction system.

A test procedure for determining the color and tone reproduction of an image reproduction system in the case of hardcopy reflection prints will be described in reference to FIG. 23. This procedure tests the color reproduction capabilities of the system in the absence of scene-dependent tone scaling. In the actual image processing sequence, scene-dependent tone scaling should be implemented as described in this invention, in order to enhance the color and tone reproduction even further.

In this test procedure, two test targets 100, 102 of uniform size are provided. Target 100 is a spectrally uniform gray, i.e. it exhibits constant percent reflectance (20%) in a wavelength spectrum of from 380 nm to 780 nm. Target 102 is the Macbeth Color Checker. Both targets are large enough so that when photographed as described below, each target substantially fills the image capture area of the capture device.

A lighting system 103 is provided to uniformly illuminate the targets, mounted on a uniform gray (20% reflectance) background, at approximately a 45° angle of incidence. The lighting should provide reasonably specular illumination typical of high quality, low flare viewing conditions. The spectral quality of the lighting should be similar to that for which the imaging system under test is designed. Under constant illumination conditions from lighting system 103 and with a scene capture apparatus 106 e.g. a photographic camera oriented perpendicularly to the targets, each of the target images is captured according to ISO standards for the image capture device. Additionally, the reflection spectra of each color patch in target 102 and the corresponding area of target 100 are measured using a very low flare telespectroradiometer 116. A suitable embodiment is the Photo Research telespectroradiometer 705. Each measurement is made with a spot size one-fourth as large as the density step area being measured. Using identical lighting, image device and radiometer conditions, target 100 is captured and measured as described above.

Using the imaging system 104 under analysis including scene capture apparatus 106 and image reproduction stage 110 and having an overall transformation characteristic represented by transformation step 108, a hardcopy reproduction of the target images is produced by a suitable output device. The reproduction is made in such a manner that the N/3.5 Grey patch in the reproduction match those of the original N/3.5 Grey Patch. A 1.0 scene density relative to a 100% diffuse reflector is reproduced at a density of 1.0±0.05.

The reproduced prints are uniformly illuminated with lighting system 103 at a 45° angle of incidence and the visual step densities are measured with the very low flare radiometer 116. It will be understood that the targets and reproductions preferably are illuminated and measured under identical conditions. These measurements include the target and reproduction illuminant. If this is not the desired capture and viewing illuminant, the illuminant spectrum can be divided out, if the spectral reflectance of one of the neutral target patches in target 102 is known. CIE XYZ values for all patches are calculated from the target and reproduction reflectance spectra, the spectrum of the illuminant, and the CIE color-matching functions of the observer, using standard methods. Before proceeding, the measured XYZ values on the target 102 have to be corrected for any target illumination non-uniformity using the target 100 measurements in the same location as the target 102 steps. Likewise, the measured step XYZ values on target 112, the reproduction of target 102, must be corrected for any target illumination non-uniformity, any field exposure non-uniformity by the scene capture apparatus 106 onto the film or sensor and any field exposure non-uniformities present in the image reproduction apparatus 110 using target 114. CIELAB values for the target and the reproduction, referring to the CIE Standard Illuminant D50, are calculated using standard procedures. The relative spectral power distribution of the illuminant and the reflection spectra of the of the patches of the Macbeth Color Checker Chart used in our test procedure, are summarized in Table 1 below. Table 2 lists the corresponding CIE 1976 CIELAB values for CIE Standard Illuminant D50.

TABLE 1

| wl [nm] | dark skin | light skin | blue sky | foliage | blue flower | blueish green | orange | purplish blue | moderate red | purple | yellow green | Orange yellow |
|---|---|---|---|---|---|---|---|---|---|---|---|---|
| 380 | 0.0444 | 0.0957 | 0.1042 | 0.0447 | 0.1124 | 0.1033 | 0.0481 | 0.0891 | 0.0908 | 0.08 | 0.0543 | 0.0535 |
| 385 | 0.0465 | 0.1124 | 0.1267 | 0.0452 | 0.1386 | 0.1245 | 0.0488 | 0.1086 | 0.1041 | 0.0958 | 0.0564 | 0.0548 |
| 390 | 0.0502 | 0.134 | 0.1612 | 0.0459 | 0.1816 | 0.1573 | 0.0494 | 0.138 | 0.12 | 0.1182 | 0.059 | 0.0568 |
| 395 | 0.0556 | 0.1598 | 0.2058 | 0.0471 | 0.2421 | 0.2002 | 0.0502 | 0.1783 | 0.1354 | 0.1449 | 0.0612 | 0.0581 |
| 400 | 0.0614 | 0.183 | 0.2527 | 0.0478 | 0.3097 | 0.2445 | 0.0505 | 0.2206 | 0.1459 | 0.1706 | 0.0627 | 0.059 |
| 405 | 0.0659 | 0.1984 | 0.2917 | 0.0483 | 0.374 | 0.2817 | 0.0503 | 0.2608 | 0.1508 | 0.1921 | 0.064 | 0.0596 |
| 410 | 0.0681 | 0.2069 | 0.319 | 0.0489 | 0.4205 | 0.3065 | 0.0504 | 0.292 | 0.151 | 0.2056 | 0.065 | 0.0603 |
| 415 | 0.0678 | 0.2099 | 0.3334 | 0.0494 | 0.4459 | 0.3207 | 0.0503 | 0.314 | 0.1493 | 0.2115 | 0.0657 | 0.0608 |
| 420 | 0.0661 | 0.2115 | 0.3407 | 0.0502 | 0.4592 | 0.3299 | 0.0505 | 0.3304 | 0.1457 | 0.2113 | 0.0664 | 0.0607 |
| 425 | 0.0634 | 0.2118 | 0.3425 | 0.051 | 0.462 | 0.3379 | 0.0498 | 0.3414 | 0.1421 | 0.2063 | 0.0676 | 0.061 |
| 430 | 0.0608 | 0.2149 | 0.3418 | 0.052 | 0.4637 | 0.3436 | 0.0495 | 0.3533 | 0.1393 | 0.1992 | 0.0689 | 0.0614 |
| 435 | 0.0586 | 0.2156 | 0.3412 | 0.0529 | 0.4607 | 0.3521 | 0.0495 | 0.3652 | 0.1379 | 0.1869 | 0.0707 | 0.0617 |
| 440 | 0.0564 | 0.2187 | 0.3404 | 0.0546 | 0.4567 | 0.3597 | 0.0495 | 0.3772 | 0.1372 | 0.1731 | 0.0719 | 0.0624 |
| 445 | 0.0544 | 0.2218 | 0.3383 | 0.0563 | 0.4496 | 0.3694 | 0.0498 | 0.3871 | 0.1362 | 0.1599 | 0.0753 | 0.063 |
| 450 | 0.0533 | 0.2273 | 0.3354 | 0.0585 | 0.4461 | 0.3807 | 0.0497 | 0.3916 | 0.1344 | 0.1464 | 0.0787 | 0.0634 |
| 455 | 0.0527 | 0.2338 | 0.3307 | 0.0601 | 0.436 | 0.394 | 0.0498 | 0.3869 | 0.133 | 0.1339 | 0.083 | 0.0647 |
| 460 | 0.0525 | 0.2405 | 0.3257 | 0.0619 | 0.4284 | 0.4102 | 0.0504 | 0.3797 | 0.1316 | 0.1208 | 0.0887 | 0.0668 |
| 465 | 0.0525 | 0.2512 | 0.3214 | 0.0637 | 0.42 | 0.4347 | 0.0511 | 0.3664 | 0.1309 | 0.1097 | 0.0972 | 0.07 |
| 470 | 0.0526 | 0.2604 | 0.3145 | 0.0652 | 0.4148 | 0.459 | 0.0515 | 0.3512 | 0.1303 | 0.101 | 0.1061 | 0.0738 |
| 475 | 0.0529 | 0.2709 | 0.3077 | 0.0661 | 0.4023 | 0.4842 | 0.0521 | 0.3325 | 0.1287 | 0.0927 | 0.1178 | 0.0793 |
| 480 | 0.0536 | 0.2811 | 0.2979 | 0.0675 | 0.388 | 0.515 | 0.053 | 0.307 | 0.1253 | 0.0853 | 0.1345 | 0.0869 |
| 485 | 0.0552 | 0.2887 | 0.29 | 0.0688 | 0.3757 | 0.5437 | 0.0541 | 0.2815 | 0.1201 | 0.079 | 0.1557 | 0.0959 |
| 490 | 0.0566 | 0.2947 | 0.2812 | 0.0705 | 0.3669 | 0.5657 | 0.0552 | 0.2553 | 0.1148 | 0.0735 | 0.1821 | 0.1037 |
| 495 | 0.0586 | 0.2979 | 0.2722 | 0.0724 | 0.3566 | 0.5862 | 0.0567 | 0.2284 | 0.1108 | 0.0688 | 0.2158 | 0.112 |
| 500 | 0.0604 | 0.3038 | 0.2647 | 0.0769 | 0.3458 | 0.5935 | 0.0582 | 0.2057 | 0.1072 | 0.0647 | 0.2573 | 0.1202 |
| 505 | 0.0624 | 0.3123 | 0.2542 | 0.0855 | 0.3324 | 0.5966 | 0.0611 | 0.1853 | 0.1056 | 0.0614 | 0.3112 | 0.1287 |
| 510 | 0.0646 | 0.3203 | 0.2466 | 0.1003 | 0.3174 | 0.5959 | 0.0655 | 0.1699 | 0.104 | 0.059 | 0.3683 | 0.1414 |
| 515 | 0.0669 | 0.3241 | 0.2377 | 0.1216 | 0.2989 | 0.5908 | 0.0721 | 0.1535 | 0.1019 | 0.0572 | 0.4266 | 0.1584 |
| 520 | 0.0692 | 0.3237 | 0.2292 | 0.1442 | 0.2787 | 0.5861 | 0.0817 | 0.1384 | 0.0984 | 0.0557 | 0.478 | 0.1816 |
| 525 | 0.072 | 0.3148 | 0.2194 | 0.1645 | 0.2552 | 0.5759 | 0.095 | 0.1253 | 0.0949 | 0.0545 | 0.5158 | 0.2133 |
| 530 | 0.0743 | 0.3031 | 0.2113 | 0.1764 | 0.2378 | 0.5639 | 0.1123 | 0.1147 | 0.0927 | 0.0524 | 0.5395 | 0.2548 |
| 535 | 0.0758 | 0.2936 | 0.2046 | 0.1815 | 0.2242 | 0.55 | 0.1351 | 0.1084 | 0.0923 | 0.0514 | 0.5553 | 0.3028 |
| 540 | 0.0771 | 0.2917 | 0.2 | 0.1796 | 0.2153 | 0.5348 | 0.1611 | 0.1036 | 0.0938 | 0.0505 | 0.5623 | 0.3561 |
| 545 | 0.0783 | 0.2953 | 0.1954 | 0.1715 | 0.2108 | 0.513 | 0.1899 | 0.0997 | 0.0973 | 0.0501 | 0.5579 | 0.4048 |
| 550 | 0.0796 | 0.2999 | 0.1927 | 0.1618 | 0.2088 | 0.4934 | 0.2205 | 0.0953 | 0.102 | 0.0504 | 0.5518 | 0.4479 |
| 555 | 0.0813 | 0.2997 | 0.188 | 0.1523 | 0.2074 | 0.4691 | 0.2531 | 0.0913 | 0.1072 | 0.0509 | 0.5443 | 0.483 |
| 560 | 0.0843 | 0.2973 | 0.1827 | 0.1418 | 0.2038 | 0.4448 | 0.2868 | 0.0869 | 0.1109 | 0.0516 | 0.5292 | 0.5103 |
| 565 | 0.089 | 0.2975 | 0.1776 | 0.1329 | 0.1994 | 0.4218 | 0.3252 | 0.0832 | 0.1129 | 0.0522 | 0.516 | 0.5364 |
| 570 | 0.0946 | 0.303 | 0.1727 | 0.1281 | 0.1957 | 0.4001 | 0.3661 | 0.0809 | 0.1163 | 0.0518 | 0.5014 | 0.5572 |
| 575 | 0.1015 | 0.3174 | 0.168 | 0.1262 | 0.1965 | 0.3761 | 0.4066 | 0.0793 | 0.1273 | 0.0512 | 0.4841 | 0.5716 |
| 580 | 0.1083 | 0.3455 | 0.1633 | 0.1254 | 0.2025 | 0.3538 | 0.4432 | 0.0798 | 0.1521 | 0.0505 | 0.4664 | 0.5829 |
| 585 | 0.1159 | 0.3816 | 0.1591 | 0.1221 | 0.2094 | 0.332 | 0.4713 | 0.0813 | 0.1945 | 0.05 | 0.4504 | 0.5946 |
| 590 | 0.1226 | 0.4184 | 0.1558 | 0.1184 | 0.2176 | 0.3116 | 0.4957 | 0.0828 | 0.2534 | 0.0505 | 0.4289 | 0.6048 |
| 595 | 0.1277 | 0.4528 | 0.1522 | 0.1132 | 0.2249 | 0.2888 | 0.5156 | 0.0839 | 0.3219 | 0.0519 | 0.4108 | 0.6139 |
| 600 | 0.1326 | 0.4828 | 0.1494 | 0.1079 | 0.2322 | 0.2684 | 0.5311 | 0.0843 | 0.3899 | 0.0547 | 0.3912 | 0.6226 |
| 605 | 0.1359 | 0.5043 | 0.1469 | 0.1037 | 0.2395 | 0.2504 | 0.5435 | 0.0844 | 0.454 | 0.0603 | 0.3717 | 0.632 |
| 610 | 0.1403 | 0.525 | 0.1434 | 0.1008 | 0.2443 | 0.2363 | 0.5549 | 0.0841 | 0.5044 | 0.0679 | 0.356 | 0.6394 |
| 615 | 0.1446 | 0.5356 | 0.1402 | 0.0999 | 0.2463 | 0.2272 | 0.5641 | 0.0827 | 0.5357 | 0.0782 | 0.3462 | 0.6445 |
| 620 | 0.1479 | 0.5438 | 0.1365 | 0.1005 | 0.2456 | 0.2209 | 0.5725 | 0.0822 | 0.5595 | 0.0908 | 0.3403 | 0.6525 |
| 625 | 0.1522 | 0.5517 | 0.1337 | 0.1014 | 0.2443 | 0.2163 | 0.5806 | 0.0822 | 0.5741 | 0.1045 | 0.3343 | 0.6592 |
| 630 | 0.1557 | 0.5574 | 0.1289 | 0.1022 | 0.2446 | 0.2117 | 0.5853 | 0.0838 | 0.5856 | 0.1187 | 0.3293 | 0.6634 |
| 635 | 0.1605 | 0.5612 | 0.1254 | 0.1013 | 0.2489 | 0.2098 | 0.592 | 0.0863 | 0.5886 | 0.132 | 0.327 | 0.6655 |
| 640 | 0.1647 | 0.5616 | 0.122 | 0.1002 | 0.2592 | 0.2075 | 0.5968 | 0.0908 | 0.5886 | 0.1451 | 0.3261 | 0.6717 |
| 645 | 0.1702 | 0.5696 | 0.1191 | 0.0989 | 0.2774 | 0.2064 | 0.6004 | 0.0967 | 0.5942 | 0.1582 | 0.3231 | 0.678 |
| 650 | 0.1769 | 0.5808 | 0.1161 | 0.0982 | 0.3006 | 0.2057 | 0.6042 | 0.1025 | 0.5979 | 0.1706 | 0.3205 | 0.6852 |
| 655 | 0.1843 | 0.5843 | 0.1141 | 0.0979 | 0.3276 | 0.2052 | 0.6121 | 0.1089 | 0.5957 | 0.1831 | 0.3239 | 0.688 |
| 660 | 0.1941 | 0.594 | 0.112 | 0.0973 | 0.3604 | 0.2078 | 0.6166 | 0.1156 | 0.5987 | 0.1971 | 0.3279 | 0.6925 |
| 665 | 0.2018 | 0.6008 | 0.1102 | 0.0988 | 0.3915 | 0.2128 | 0.6231 | 0.12 | 0.5986 | 0.2117 | 0.3328 | 0.6963 |
| 670 | 0.2118 | 0.6143 | 0.1079 | 0.1019 | 0.4182 | 0.2177 | 0.6269 | 0.1227 | 0.5968 | 0.2259 | 0.3384 | 0.7015 |
| 675 | 0.2196 | 0.6252 | 0.1067 | 0.1077 | 0.4424 | 0.2228 | 0.6277 | 0.1212 | 0.5951 | 0.2416 | 0.3457 | 0.7027 |
| 680 | 0.2287 | 0.6371 | 0.1051 | 0.1183 | 0.4632 | 0.2307 | 0.6315 | 0.1185 | 0.5943 | 0.2617 | 0.3538 | 0.704 |
| 685 | 0.2367 | 0.6504 | 0.1038 | 0.1342 | 0.4749 | 0.2361 | 0.6366 | 0.1152 | 0.592 | 0.2804 | 0.3628 | 0.706 |
| 690 | 0.2439 | 0.668 | 0.1035 | 0.1533 | 0.4817 | 0.2403 | 0.6371 | 0.1135 | 0.5918 | 0.2976 | 0.369 | 0.7145 |
| 695 | 0.2521 | 0.6858 | 0.1021 | 0.1788 | 0.4886 | 0.244 | 0.6421 | 0.1114 | 0.5906 | 0.3202 | 0.3748 | 0.7135 |
| 700 | 0.2623 | 0.7005 | 0.1022 | 0.2111 | 0.4941 | 0.2488 | 0.6445 | 0.111 | 0.5927 | 0.3421 | 0.3804 | 0.7145 |
| 705 | 0.2712 | 0.7215 | 0.1013 | 0.2429 | 0.4971 | 0.2518 | 0.6487 | 0.1116 | 0.5933 | 0.367 | 0.3852 | 0.7179 |
| 710 | 0.2822 | 0.7386 | 0.1009 | 0.2705 | 0.495 | 0.252 | 0.6519 | 0.1137 | 0.5894 | 0.3903 | 0.3858 | 0.7234 |
| 715 | 0.2905 | 0.757 | 0.1005 | 0.2905 | 0.4938 | 0.2483 | 0.6559 | 0.1166 | 0.5894 | 0.4122 | 0.3838 | 0.7256 |
| 720 | 0.3028 | 0.7723 | 0.1006 | 0.3058 | 0.4987 | 0.2463 | 0.6589 | 0.1196 | 0.5924 | 0.4373 | 0.3819 | 0.7278 |

TABLE 1-continued

| | | | | | | | | | | | | |
|---|---|---|---|---|---|---|---|---|---|---|---|---|
| 725 | 0.3197 | 0.7885 | 0.0999 | 0.3187 | 0.4976 | 0.2433 | 0.6632 | 0.1244 | 0.5912 | 0.4678 | 0.3812 | 0.7299 |
| 730 | 0.3325 | 0.8017 | 0.1002 | 0.3249 | 0.4957 | 0.246 | 0.6628 | 0.13 | 0.5918 | 0.4943 | 0.3835 | 0.7308 |
| 735 | 0.344 | 0.8113 | 0.1003 | 0.3257 | 0.4936 | 0.2472 | 0.666 | 0.1359 | 0.5855 | 0.5194 | 0.3875 | 0.7345 |
| 740 | 0.3626 | 0.8226 | 0.1002 | 0.3276 | 0.4948 | 0.2548 | 0.6683 | 0.1445 | 0.5869 | 0.5539 | 0.3954 | 0.7349 |
| 745 | 0.3806 | 0.8292 | 0.1014 | 0.3325 | 0.4955 | 0.2668 | 0.6751 | 0.1586 | 0.5898 | 0.5808 | 0.4086 | 0.7395 |
| 750 | 0.3916 | 0.8437 | 0.1009 | 0.334 | 0.4968 | 0.2754 | 0.6767 | 0.1775 | 0.5902 | 0.6098 | 0.4227 | 0.7413 |

| wl [nm] | Blue | Green | Red | Yellow | Magenta | Cyan | white | neutral 8 | neutral 6.5 | neutral 5 | neutral 3.5 | black | D50 |
|---|---|---|---|---|---|---|---|---|---|---|---|---|---|
| 380 | 0.0586 | 0.0506 | 0.0473 | 0.0481 | 0.1036 | 0.0813 | 0.119 | 0.1122 | 0.1075 | 0.0885 | 0.0637 | 0.0263 | 0.2373 |
| 385 | 0.0668 | 0.0521 | 0.0477 | 0.0491 | 0.1267 | 0.0978 | 0.1483 | 0.1413 | 0.1308 | 0.1029 | 0.0676 | 0.0267 | 0.2634 |
| 390 | 0.0785 | 0.0538 | 0.0486 | 0.0499 | 0.1631 | 0.1206 | 0.1982 | 0.1885 | 0.167 | 0.1222 | 0.0723 | 0.027 | 0.2895 |
| 395 | 0.0948 | 0.0555 | 0.049 | 0.0512 | 0.2139 | 0.1508 | 0.2773 | 0.2595 | 0.2136 | 0.1448 | 0.0766 | 0.0275 | 0.3838 |
| 400 | 0.1138 | 0.057 | 0.0492 | 0.0519 | 0.2704 | 0.1817 | 0.3834 | 0.3458 | 0.2627 | 0.1635 | 0.0807 | 0.0275 | 0.478 |
| 405 | 0.134 | 0.0579 | 0.0492 | 0.0524 | 0.3203 | 0.2101 | 0.5122 | 0.4372 | 0.305 | 0.1782 | 0.0825 | 0.0279 | 0.5129 |
| 410 | 0.155 | 0.0581 | 0.0491 | 0.0531 | 0.3535 | 0.2321 | 0.6436 | 0.5105 | 0.332 | 0.186 | 0.0841 | 0.0282 | 0.5479 |
| 415 | 0.1727 | 0.059 | 0.0489 | 0.0539 | 0.368 | 0.2465 | 0.7433 | 0.5561 | 0.3462 | 0.191 | 0.0849 | 0.0286 | 0.565 |
| 420 | 0.188 | 0.0601 | 0.0489 | 0.0546 | 0.3738 | 0.2562 | 0.8065 | 0.5786 | 0.3516 | 0.1929 | 0.0855 | 0.0287 | 0.5821 |
| 425 | 0.203 | 0.0607 | 0.0489 | 0.055 | 0.3712 | 0.2661 | 0.8369 | 0.5814 | 0.3547 | 0.1939 | 0.0865 | 0.0286 | 0.5713 |
| 430 | 0.2224 | 0.0618 | 0.0489 | 0.0555 | 0.3632 | 0.2784 | 0.8488 | 0.5859 | 0.3558 | 0.1945 | 0.0871 | 0.0288 | 0.5606 |
| 435 | 0.2444 | 0.063 | 0.0489 | 0.0561 | 0.3526 | 0.2922 | 0.8555 | 0.5877 | 0.3571 | 0.196 | 0.0874 | 0.0287 | 0.6431 |
| 440 | 0.2705 | 0.0646 | 0.0491 | 0.057 | 0.3396 | 0.3078 | 0.8602 | 0.5869 | 0.3576 | 0.1975 | 0.0881 | 0.0287 | 0.7256 |
| 445 | 0.3001 | 0.0665 | 0.049 | 0.0578 | 0.325 | 0.3257 | 0.8638 | 0.5883 | 0.3597 | 0.1979 | 0.0887 | 0.0286 | 0.7859 |
| 450 | 0.3233 | 0.0692 | 0.0491 | 0.0589 | 0.309 | 0.3415 | 0.867 | 0.5853 | 0.3621 | 0.1979 | 0.0891 | 0.0286 | 0.8461 |
| 455 | 0.3376 | 0.0721 | 0.0489 | 0.0598 | 0.2943 | 0.3593 | 0.8682 | 0.5857 | 0.3616 | 0.1981 | 0.0889 | 0.0289 | 0.8625 |
| 460 | 0.3396 | 0.0766 | 0.0484 | 0.0628 | 0.279 | 0.3791 | 0.8698 | 0.5843 | 0.3614 | 0.1982 | 0.0887 | 0.0289 | 0.8788 |
| 465 | 0.328 | 0.0826 | 0.0478 | 0.0676 | 0.2652 | 0.3981 | 0.8712 | 0.5864 | 0.3598 | 0.1982 | 0.0888 | 0.0289 | 0.8825 |
| 470 | 0.31 | 0.0885 | 0.0473 | 0.0738 | 0.2517 | 0.4127 | 0.871 | 0.5826 | 0.3594 | 0.1978 | 0.0883 | 0.0288 | 0.8862 |
| 475 | 0.2843 | 0.0966 | 0.0465 | 0.0837 | 0.2375 | 0.4251 | 0.8768 | 0.5817 | 0.3592 | 0.1962 | 0.0878 | 0.0287 | 0.9044 |
| 480 | 0.2508 | 0.1081 | 0.0458 | 0.1021 | 0.222 | 0.4365 | 0.8766 | 0.5797 | 0.3591 | 0.1955 | 0.0873 | 0.0286 | 0.9226 |
| 485 | 0.2148 | 0.121 | 0.0455 | 0.1282 | 0.207 | 0.4388 | 0.8751 | 0.583 | 0.3576 | 0.1957 | 0.0876 | 0.0286 | 0.9073 |
| 490 | 0.1806 | 0.1355 | 0.0447 | 0.1645 | 0.1936 | 0.4363 | 0.8782 | 0.5821 | 0.3579 | 0.197 | 0.0879 | 0.0286 | 0.8921 |
| 495 | 0.149 | 0.1522 | 0.0443 | 0.2086 | 0.1814 | 0.4282 | 0.8807 | 0.5835 | 0.3586 | 0.1958 | 0.0878 | 0.0287 | 0.9104 |
| 500 | 0.1233 | 0.1724 | 0.0441 | 0.2627 | 0.1723 | 0.419 | 0.8867 | 0.5834 | 0.3579 | 0.1963 | 0.0885 | 0.0285 | 0.9286 |
| 505 | 0.1014 | 0.1998 | 0.0438 | 0.319 | 0.1625 | 0.4022 | 0.8861 | 0.5812 | 0.3578 | 0.1962 | 0.0882 | 0.0287 | 0.933 |
| 510 | 0.0855 | 0.2327 | 0.0434 | 0.3727 | 0.154 | 0.3832 | 0.8863 | 0.5813 | 0.3588 | 0.1963 | 0.0887 | 0.0286 | 0.9373 |
| 515 | 0.0731 | 0.2699 | 0.043 | 0.4208 | 0.1439 | 0.3599 | 0.8863 | 0.582 | 0.3596 | 0.1963 | 0.0889 | 0.0285 | 0.9398 |
| 520 | 0.064 | 0.3061 | 0.0429 | 0.4669 | 0.1316 | 0.3357 | 0.8872 | 0.5786 | 0.3574 | 0.196 | 0.0885 | 0.0286 | 0.9424 |
| 525 | 0.0575 | 0.3348 | 0.0431 | 0.507 | 0.1202 | 0.3112 | 0.8863 | 0.5802 | 0.3568 | 0.197 | 0.0891 | 0.0287 | 0.9665 |
| 530 | 0.0526 | 0.3535 | 0.0433 | 0.541 | 0.1123 | 0.2834 | 0.8888 | 0.58 | 0.3588 | 0.1969 | 0.0891 | 0.0287 | 0.9906 |
| 535 | 0.0496 | 0.3579 | 0.0437 | 0.5687 | 0.1069 | 0.2575 | 0.8907 | 0.5795 | 0.3581 | 0.1967 | 0.0893 | 0.0287 | 0.9841 |
| 540 | 0.0471 | 0.354 | 0.0439 | 0.5943 | 0.1058 | 0.2315 | 0.8921 | 0.5805 | 0.3579 | 0.1963 | 0.0889 | 0.0288 | 0.9776 |
| 545 | 0.0453 | 0.3439 | 0.0441 | 0.6108 | 0.1062 | 0.2074 | 0.8878 | 0.5783 | 0.3579 | 0.197 | 0.0892 | 0.0286 | 0.9852 |
| 550 | 0.0441 | 0.3267 | 0.0446 | 0.6275 | 0.1085 | 0.1848 | 0.8884 | 0.58 | 0.3593 | 0.1965 | 0.0891 | 0.0288 | 0.9928 |
| 555 | 0.0432 | 0.3082 | 0.0458 | 0.6464 | 0.1094 | 0.1623 | 0.8908 | 0.5794 | 0.3565 | 0.1973 | 0.0895 | 0.0287 | 0.9816 |
| 560 | 0.0424 | 0.2876 | 0.0473 | 0.658 | 0.1086 | 0.143 | 0.8863 | 0.5794 | 0.3578 | 0.1982 | 0.0897 | 0.0285 | 0.9704 |
| 565 | 0.0415 | 0.266 | 0.0496 | 0.6681 | 0.1088 | 0.126 | 0.8861 | 0.58 | 0.3583 | 0.1982 | 0.0897 | 0.0286 | 0.9594 |
| 570 | 0.0414 | 0.2449 | 0.053 | 0.6808 | 0.1128 | 0.113 | 0.8892 | 0.584 | 0.3609 | 0.1985 | 0.0902 | 0.0286 | 0.9484 |
| 575 | 0.041 | 0.2238 | 0.0574 | 0.6882 | 0.1211 | 0.1035 | 0.8892 | 0.5835 | 0.36 | 0.2003 | 0.0902 | 0.0287 | 0.9542 |
| 580 | 0.0407 | 0.2052 | 0.0658 | 0.6992 | 0.1366 | 0.0951 | 0.8863 | 0.5816 | 0.3602 | 0.201 | 0.0906 | 0.0285 | 0.9599 |
| 585 | 0.0407 | 0.1855 | 0.079 | 0.7076 | 0.1593 | 0.0897 | 0.8923 | 0.5818 | 0.3593 | 0.2007 | 0.0908 | 0.0289 | 0.9337 |
| 590 | 0.0406 | 0.1666 | 0.0995 | 0.7145 | 0.1879 | 0.0849 | 0.8925 | 0.5837 | 0.3617 | 0.2005 | 0.091 | 0.0287 | 0.9074 |
| 595 | 0.0403 | 0.1492 | 0.1312 | 0.7226 | 0.2229 | 0.0811 | 0.8902 | 0.584 | 0.3601 | 0.2013 | 0.091 | 0.0287 | 0.9277 |
| 600 | 0.0406 | 0.1323 | 0.1747 | 0.7251 | 0.2627 | 0.0774 | 0.8872 | 0.5834 | 0.3593 | 0.2014 | 0.0904 | 0.0286 | 0.9481 |
| 605 | 0.0407 | 0.1173 | 0.2315 | 0.7331 | 0.3107 | 0.0747 | 0.8891 | 0.5846 | 0.36 | 0.2004 | 0.0902 | 0.0285 | 0.9558 |
| 610 | 0.0408 | 0.1049 | 0.3002 | 0.7417 | 0.3658 | 0.0723 | 0.8921 | 0.5805 | 0.3589 | 0.2008 | 0.0904 | 0.0285 | 0.9635 |
| 615 | 0.041 | 0.0965 | 0.3739 | 0.7498 | 0.4294 | 0.0705 | 0.8958 | 0.5828 | 0.3588 | 0.2007 | 0.0903 | 0.0288 | 0.9624 |
| 620 | 0.041 | 0.0902 | 0.4494 | 0.7589 | 0.4914 | 0.0705 | 0.8941 | 0.581 | 0.3576 | 0.2002 | 0.0904 | 0.0288 | 0.9613 |
| 625 | 0.0411 | 0.0863 | 0.5116 | 0.7631 | 0.5491 | 0.07 | 0.8949 | 0.582 | 0.3574 | 0.2003 | 0.0897 | 0.0289 | 0.9452 |
| 630 | 0.0413 | 0.083 | 0.5647 | 0.7663 | 0.6042 | 0.0693 | 0.8941 | 0.5786 | 0.3556 | 0.1991 | 0.0891 | 0.0289 | 0.9291 |
| 635 | 0.0416 | 0.081 | 0.6068 | 0.7744 | 0.6491 | 0.0693 | 0.8938 | 0.5783 | 0.3543 | 0.1973 | 0.0889 | 0.0288 | 0.9444 |
| 640 | 0.0421 | 0.0791 | 0.6336 | 0.7762 | 0.6861 | 0.0695 | 0.8941 | 0.577 | 0.3525 | 0.1971 | 0.0885 | 0.029 | 0.9596 |
| 645 | 0.0427 | 0.0769 | 0.6514 | 0.7814 | 0.7199 | 0.0699 | 0.8978 | 0.5764 | 0.3533 | 0.1972 | 0.088 | 0.0291 | 0.9442 |
| 650 | 0.0428 | 0.0752 | 0.6674 | 0.7881 | 0.7417 | 0.0705 | 0.8974 | 0.5768 | 0.3516 | 0.1965 | 0.0883 | 0.0294 | 0.9287 |
| 655 | 0.0432 | 0.0745 | 0.6793 | 0.7944 | 0.7624 | 0.0713 | 0.8991 | 0.5769 | 0.352 | 0.1955 | 0.0885 | 0.0298 | 0.941 |
| 660 | 0.044 | 0.0741 | 0.6836 | 0.8006 | 0.782 | 0.0728 | 0.9024 | 0.5762 | 0.3509 | 0.1961 | 0.0885 | 0.0302 | 0.9532 |
| 665 | 0.0444 | 0.0743 | 0.6895 | 0.8008 | 0.7943 | 0.0742 | 0.9034 | 0.5788 | 0.3498 | 0.1956 | 0.0886 | 0.0304 | 0.9766 |
| 670 | 0.0442 | 0.075 | 0.695 | 0.8035 | 0.7984 | 0.075 | 0.9036 | 0.5733 | 0.3499 | 0.1938 | 0.0879 | 0.0304 | 1.0000 |
| 675 | 0.0442 | 0.075 | 0.6991 | 0.807 | 0.8019 | 0.0744 | 0.9026 | 0.5744 | 0.3478 | 0.194 | 0.0876 | 0.0309 | 0.9812 |
| 680 | 0.0447 | 0.0767 | 0.7031 | 0.808 | 0.8057 | 0.074 | 0.9049 | 0.5715 | 0.3479 | 0.1933 | 0.0877 | 0.0306 | 0.9625 |
| 685 | 0.0448 | 0.0783 | 0.7011 | 0.813 | 0.8054 | 0.0731 | 0.898 | 0.5703 | 0.3456 | 0.1933 | 0.087 | 0.0312 | 0.9054 |
| 690 | 0.0451 | 0.0798 | 0.7044 | 0.8132 | 0.8113 | 0.0724 | 0.8995 | 0.5712 | 0.3463 | 0.1923 | 0.0871 | 0.031 | 0.8483 |
| 695 | 0.0456 | 0.0823 | 0.7079 | 0.8177 | 0.8113 | 0.0716 | 0.902 | 0.5702 | 0.3452 | 0.1919 | 0.087 | 0.032 | 0.8688 |
| 700 | 0.0463 | 0.0847 | 0.7119 | 0.8166 | 0.8155 | 0.0708 | 0.9028 | 0.5681 | 0.3443 | 0.1904 | 0.0869 | 0.0317 | 0.8894 |
| 705 | 0.0474 | 0.0869 | 0.7106 | 0.8186 | 0.823 | 0.0696 | 0.9024 | 0.5687 | 0.3432 | 0.1918 | 0.0871 | 0.0324 | 0.8956 |
| 710 | 0.0489 | 0.0889 | 0.7129 | 0.8173 | 0.8234 | 0.0697 | 0.9016 | 0.5642 | 0.3429 | 0.192 | 0.0869 | 0.032 | 0.9018 |
| 715 | 0.0494 | 0.0892 | 0.7143 | 0.8224 | 0.8271 | 0.0693 | 0.9041 | 0.5647 | 0.3409 | 0.1906 | 0.0859 | 0.0323 | 0.824 |
| 720 | 0.0506 | 0.0891 | 0.7165 | 0.8238 | 0.8306 | 0.0703 | 0.9066 | 0.566 | 0.3407 | 0.1898 | 0.0863 | 0.0324 | 0.7461 |

TABLE 1-continued

| 725 | 0.0536 | 0.0889 | 0.7168 | 0.8274 | 0.8371 | 0.0735 | 0.9068 | 0.5665 | 0.341  | 0.1896 | 0.0861 | 0.0325 | 0.793  |
| 730 | 0.056  | 0.0871 | 0.7201 | 0.8249 | 0.8414 | 0.0767 | 0.8987 | 0.5631 | 0.3406 | 0.1905 | 0.0855 | 0.0328 | 0.8399 |
| 735 | 0.0582 | 0.0877 | 0.7185 | 0.8268 | 0.8402 | 0.0819 | 0.9005 | 0.5631 | 0.3389 | 0.1893 | 0.0854 | 0.0333 | 0.8693 |
| 740 | 0.0622 | 0.0893 | 0.7188 | 0.8325 | 0.8457 | 0.0889 | 0.9016 | 0.5618 | 0.3365 | 0.1892 | 0.0855 | 0.0331 | 0.8988 |
| 745 | 0.0704 | 0.092  | 0.7206 | 0.8397 | 0.8551 | 0.1006 | 0.907  | 0.5638 | 0.337  | 0.1887 | 0.0858 | 0.0335 | 0.8291 |
| 750 | 0.0802 | 0.0957 | 0.7264 | 0.8356 | 0.8614 | 0.1169 | 0.9066 | 0.5631 | 0.3374 | 0.1881 | 0.0857 | 0.0335 | 0.7595 |

TABLE 2

CIE 1976 CIELAB values and a, b chroma and hue angle, referring to CIE Standard Illuminant D50, of the patches of the Macbeth Color Checker Chart used in testing.

|  | L* | a* | b* | C*$_{ab}$ | h$_{ab}$ |
|---|---|---|---|---|---|
| dark skin | 37.297 | 14.5179 | 15.3613 | 21.1362 | 46.6168 |
| light skin | 66.4792 | 16.6964 | 17.2205 | 23.9858 | 45.8853 |
| blue sky | 50.4873 | −5.1851 | −22.1537 | 22.7524 | 256.827 |
| foliage | 42.8725 | −13.5891 | 22.0558 | 25.906 | 121.6381 |
| blue flower | 56.3265 | 8.469 | −25.4254 | 26.7988 | 288.4225 |
| blueish green | 71.3796 | −32.581 | 0.8015 | 32.5909 | 178.5909 |
| orange | 61.9097 | 35.54 | 59.3904 | 69.2121 | 59.1031 |
| purplish blue | 39.9229 | 9.3015 | −43.7725 | 44.7498 | 281.9967 |
| moderate red | 51.932 | 47.0787 | 15.474 | 49.5566 | 18.1948 |
| purple | 30.2374 | 22.2276 | −22.5683 | 31.6764 | 314.5642 |
| yellow green | 72.7068 | −22.4735 | 57.1065 | 61.3695 | 111.4814 |
| orange yellow | 72.3728 | 20.5452 | 67.7536 | 70.8002 | 73.1309 |
| Blue | 29.2171 | 16.1802 | −51.1352 | 53.634 | 287.5584 |
| Green | 55.3537 | −38.2105 | 33.9122 | 51.0889 | 138.4107 |
| Red | 41.3822 | 54.8705 | 26.3132 | 60.8536 | 25.6201 |
| Yellow | 82.0074 | 4.8501 | 79.388 | 79.536 | 86.504 |
| Magenta | 51.7415 | 48.0079 | −14.8653 | 50.2567 | 342.7952 |
| Cyan | 50.3764 | −29.4406 | −27.2852 | 40.1401 | 222.824 |
| white | 95.5258 | −0.4069 | 2.0886 | 2.1279 | 101.0248 |
| neutral 8 | 80.796 | 0.0544 | −0.112 | 0.1245 | 295.8809 |
| neutral 6.5 | 66.3999 | −0.1351 | 0.0419 | 0.1415 | 162.7723 |
| neutral 5 | 51.6319 | 0.3456 | 0.317 | 0.4689 | 42.5292 |
| neutral 3.5 | 35.8927 | 0.0934 | 0.4881 | 0.497 | 79.1645 |
| black | 19.5112 | 0.1518 | −0.0084 | 0.1521 | 356.8186 |

To determine whether a transforming process meets the color enhancement metric of the present invention, one performs the following comparison between target and reproduced CIELAB values to find out if one or more of the following statements apply:
  a) colors within a region of color space including the foliage patch of the Macbeth Color Checker are consistently and smoothly shifted towards higher hue angles, limited to a maximum hue angle rotation of 15 degrees, whereby, expressed in terms of CIELAB for CIE Standard Illuminant D50, the region is bounded by hue lines of 10–40 degrees below and above the hue angle, h$_{ab}$, of the foliage patch and includes colors that differ by at least 10 CIE 1976 a,b chroma and lightness units from the foliage patch;
  b) colors within the region given in step a) above are consistently and smoothly moved towards a hue center between CIE 1976 a*,b* hue angles of 115 and 135;
  c) colors within a region of color space including the blue sky patch of the Macbeth Color Checker are consistently and smoothly shifted towards higher hue angles, limited to a maximum hue angle rotation of 15 degrees, whereby, expressed in terms of CIELAB for CIE Standard Illuminant D50, the region is bounded by hue lines of 10–40 degrees below and above the hue angle of the blue sky patch and includes colors that differ by at least 10 CIE 1976 a*,b* chroma and lightness units from the blue sky patch;
  d) colors with hues in the range given in step c) above consistently and smoothly moved towards a hue center between CIE 1976 a*,b* hue angles of 250 and 267;
  e) colors within a region of color space including the yellow patch of the Macbeth Color Checker are consistently and smoothly shifted towards lower hue angles, limited to a maximum hue angle rotation of 10 degrees, whereby, expressed in terms of CIELAB for CIE Standard Illuminant D50, the region is bounded by hue lines of 10–20 degrees below and above the hue angle of the yellow patch and includes colors that differ by at least 10 CIE 1976 a*,b* chroma and lightness units from the yellow patch;
  f) colors within a region of color space including the two skin tone patches of the Macbeth Color Checker are consistently and smoothly moved towards a hue angle, h$_{ab}$, between 40 and 50 degrees, whereby, expressed in terms of CIELAB for CIE Standard Illuminant D50, the region is bounded by hue lines of 10–30 degrees below and above the hue angles of the two skin tone patches and includes colors that differ by 10–30 CIE 1976 a*,b* chroma units and at least 10 lightness units from the two skin tone patches;
  g) any local hue manipulations are performed where hues are consistently and smoothly moved towards a hue line or a whole section of color space is consistently and smoothly shifted in one direction, whereby, expressed in terms of CIELAB for CIE Standard Illuminant D50, the region affected covers a hue angle range of 10–60 degrees and includes colors that differ by at least 15 CIE 1976 a*,b* chroma and lightness values.

In addition, the following five statements must apply:
  a) The image was captured on an image capture medium and/or device capable of capturing the scene parameters such that the CIE 1976 color differences, $\Delta E^*_{ab}$, between the original scene color and the digital representation of the scene color is on average below 5 with a maximum of 12 for the colors on the Macbeth Color Checker, and a maximum of 5 for the two skin tone patches.
  b) The chroma values of the digital representation of the scene are scaled such that the CIE 1976 a,b chroma ratios of the reproduced image and the original scene for the two skin tones patches of the Macbeth Color Checker is less or equal than for the foliage and sky patches.
  c) The scaling factor for the chroma of the patches of the Macbeth Color Checker excluding the neutral, skin, sky and foliage patches, is selected such that the ratio of the CIE 1976 a,b chroma of the reproduced patch and the original of at least one of these patches is at least as high as the higher of the chroma ratios of the foliage and sky patches, and that the chroma ratio of at least two of these patches at least as high as the maximum of the chroma ratios of the two skin tone patches.
  d) The standard deviation of the CIE 1976 a,b chroma ratios of the reproduction and original of all color patches of the Macbeth Color Checker patches is below 0.4, excluding the neutral patches.

e) A tone scale transformation is applied, i.e. the reproduced CIE 1976 lightness, L*, of the patches is a smooth, monotonic function of the scene lightness values.

In addition, the following statement may apply:

The lightness of any region of color space was smoothly and consistently altered with a maximum CIE 1976 lightness difference of 3–10 compared with the result that would be obtained from the global tone scale transformation, whereby, expressed in terms of CIELAB for CIE Standard Illuminant D50, the region is bounded by hue lines of 10–40 degrees below and above the CIE 1976 a*,b* hue angle of any of the 11 high chroma patches of the Macbeth Color Checker and include colors that differ by at least 10 CIE 1976 a*,b* chroma and lightness units from the one of these patches.

Any of the regional statements about hue, lightness and chroma manipulations can be tested by placing a set of color correction filters (10R, 20R, 30R, 5G, 10G, 20G, 30G, 10B, 20B, 30B, 10C, 20C, 30C, 10M, 20M, 30M, 10Y, 20Y, 30Y) in front of the capture device. In this case the same transformation between the captured scene code values and the digital representation of the scene colors must be used as for the Macbeth Color Checker Chart captured without the filters. The calculation of XYZ aim values, including the filter spectrum, and reproduced XYZ values is carried out as described before. In this case, the color balance of the print must be same as for the reproduction of target without filter. This way, a ring-around of colors around the original colors of the chart can be created, in order to test the remaining claims of the invention.

Thus, as described in detail above, the method of the present invention includes the steps of: deducing digital luminance and digital chrominance values for pixels of the digital color image; using the pixels of the digital color image to calculate an image dependent transform; using the image dependent transform to modify the digital luminance values for pixels of the digital color image to form modified luminance values; calculating a color transform that alters the original digital chrominance values in a manner that consistently and smoothly moves the values toward or away from predetermined digital chrominance values; and using the color transform to modify the original chrominance values for pixels of the digital color image to produce modified chrominance values.

Figure 24:
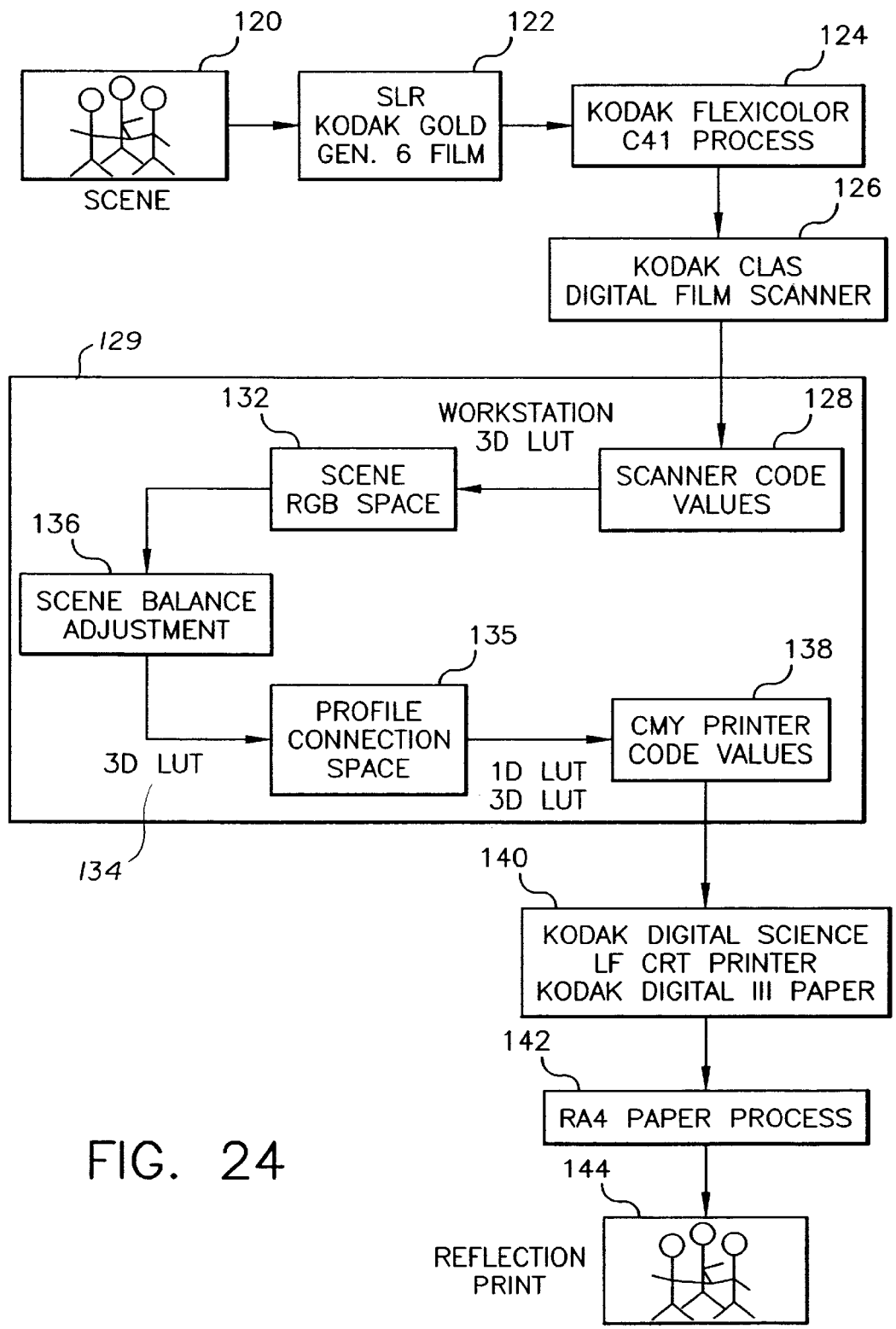
FIG. 24 is block diagram showing an example of image processing according to the present invention.

Referring to FIG. 24, an example of how reflection prints with preferred color reproduction can be produced from a color negative film according to the present invention will be described. A scene 120 is captured 122 on Kodacolor Gold 400—Generation 6 film with a single lens reflex (SLR) camera (not shown). The film is exposed under average daylight illumination at average luminance levels in the order of 1600 cd/m$^2$. The film is developed 124 in the Kodak Flexicolor C41 process. The images are scanned 126 using a Kodak CLAS Digital Film Scanner and the scanner RGB code values 128 are stored on the hard drive of a workstation 129, for example a Pentium III computer. The processing sequence consists of a concatenation of several one- and three-dimensional lookup tables and a scalar shift as follows.

1. The scanner RGB code values 128 are mapped to large gamut scene RGB color space 132, that encompasses all colors that can be recorded on the color negative film. The data metric, XE, of this space can be calculated from CIE XYZ values under CIE Standard Illuminant D50, X, Y, Z, the mathematics of equations (1) and (2) described above. A 3D LUT 134 can be constructed from a large set of test exposures of known spectral distribution and exposure, that was developed in the Kodak Flexicolor C41 process and scanned on the same Kodak CLAS Digital Film Scanner likewise.

2. A scene balance algorithm 136 is applied to the image. The scene balance algorithm should ensure that the 20% gray of scene is mapped to the equivalent output code value of 1713. If this criterion is met, the scene is perfectly balanced for color and lightness. Unfortunately, automatic scene balance algorithms never obtain a perfectly neutral balance of the scene according to the above requirement. The accuracy with the framework of this invention is sufficient if 95% of the scenes (daylight and electronic flash exposure) are balanced within a CIE 1976 a*,b* chroma difference of 5 from the aim and within a CIE 1976 L* difference of 5 from the aim. Next a scene-dependent tone scale function is applied to the image data as per the description above pertaining to the tone scale module 322. Additionally, the image content is sharpened as per the description above pertaining to the spatial sharpening module 324 and converted back into a red-green-blue representation as per the description of RGB conversion module 326 (see FIG. 6). At this point we have a digital representation of the scene colors. Assuming CIE Standard D50 Illuminant and perfect neutral balance according to the above criterion, the average CIE 1976 color difference between the CIELAB values that are measured in the scene according to the procedure outlined in the Testing section and the digital representation of these colors is $\Delta E^*_{ab}=3$.

3. A three-dimensional lookup table maps the scene exposures obtained from steps 1 and 2 to the preferred visual reproduction encoded in Profile Connection Space (PCS) 135. This transformation produces the following relation between the encoded scene exposures and the colorimetry of the reproduction, a reflective print on photographic paper intended for viewing in an average indoor environment with average luminance levels in the order of 100 cd/m$^2$ with viewing flare of 0.5%. The transformation is expressed as the relation between scene CIELAB values and CIELAB values of the reproduction referring to CIE Standard to D50 Illuminant:

(a) The foliage patch of the Macbeth Color Checker chart was moved to a CIE 1976 a*,b* hue angle of 125 degrees. Scene colors within a CIE 1976 a,b chroma distance of 20 and a L* difference of 20 are consistently and smoothly moved to a CIE 1976 a*,b* hue angle of 127 degrees.

(b) Scene colors within a CIE 1976 a,b chroma distance of 20 and a L* difference of 20 from the color from the sky patch of the Macbeth Color Checker chart are consistently and smoothly moved to a CIE 1976 a*,b* hue angle of 256 degrees.

(c) Scene colors within a CIE 1976 a*,b* chroma distance of 20 and an L* difference of 30 from the color from the light skin tone patch of the Macbeth Color Checker chart are consistently and smoothly moved to a CIE 1976 a,b hue angle of 47 degrees.

(d) Scene colors within a CIE 1976 a*,b* hue angle difference of 10 degrees and a L* difference of 30 from the color yellow patch of the Macbeth Color Checker chart are consistently and smoothly shifted to a lower CIELAB hue angle with a maximum shift of 5 degrees.

(e) The CIE 1976 a*,b* chroma values of colors within a CIE 1976 chroma distance of the 10 from the neutral point (a*=b*=0) are scaled by a factor of 1.2.

(f) The CIE 1976 chroma a,b values of scene colors within a CIE 1976 a*,b* chroma distance of the 15 and L* distance of 30 from the light and dark skin tone patches of the Macbeth Color Checker chart are scaled by a factor of 1.25.

(g) Other scene colors with CIE 1976 a*,b* chroma values above 20 are scaled by a factor of 1.4. The hue and chroma mappings are shown in FIG. 19.

(h) The lightness of scene colors within a CIE 1976 a*,b* chroma distance of 25 and a lightness distance of 30 from the red patch of the Macbeth Color Checker Chart were consistently and smoothly decreased by a maximum of 4 CIE 1976 L* units.

(i) A global tone scale function was applied. This tone scale function modifies the lightness of the neutral patches of the Macbeth Color Checker chart as shown in FIG. 20. A 100% white diffuser under the given illuminant in the scene or the reproduction would correspond to L*=100.

Figure 25:
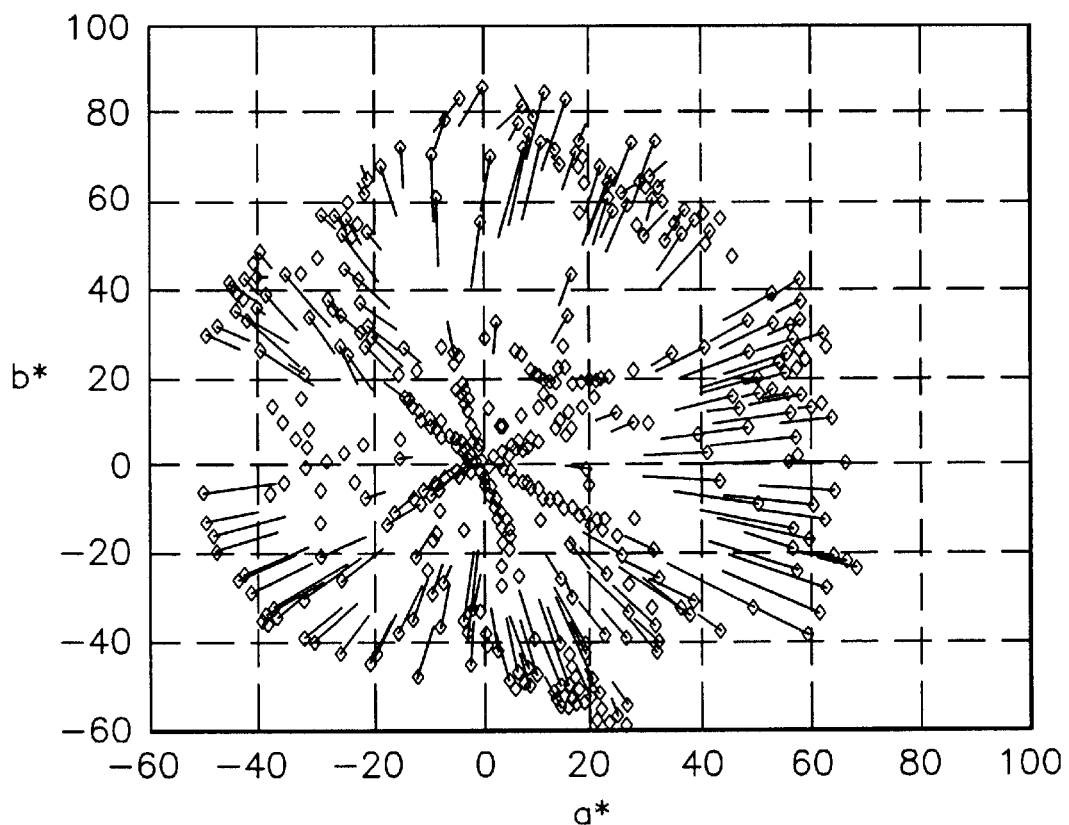
FIG. 25 is a plot showing hue and chroma mapping for the example in FIG. 24.
Figure 26:
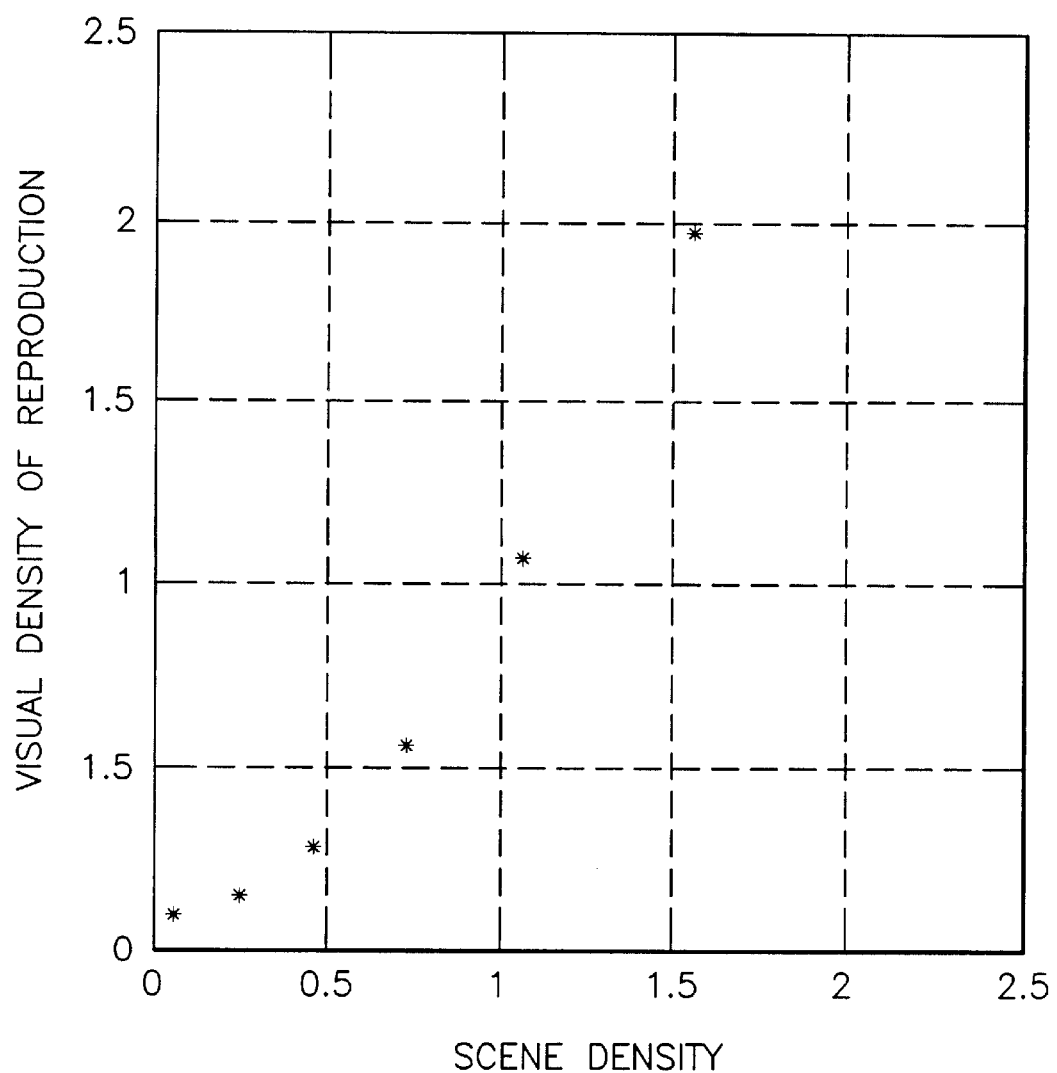
FIG. 26 is a plot showing reproduced lightness vs. scene lightness for the example in FIG. 25.

The hue and chroma mappings from scene colors to reproduced colors listed in items (a)–(g) are shown in FIG. 25 in form of a CIELAB plot. The heads of the arrows (symbols) correspond to the reproduced color. FIG. 26 shows how the scene densities of neutral patches of the Macbeth Color Checker chart are mapped to visual densities of the reproduction according to the global tone scale function mentioned in item (i).

1. The PCS data are transformed to printer code values 138 that produce the desired visual reproduction as specified in PCS. This is accomplished by a combination of a one-dimensional and three-dimensional LUT. This transformation also performs gamut mapping, using a method that maintains the CIELAB D50 hue angle. The device code values drive a Kodak Digital Science LF CRT printer loaded with Kodak Digital III silver halide paper 142. The paper is processed in the RA4 process 140 to produce a visual reproduction of the scene 144 as specified in the invention. Eighty percent of the images generated as described in the example were preferred over the images generated by a current silver halide color film/paper system in a paired comparison.

Figure 27:
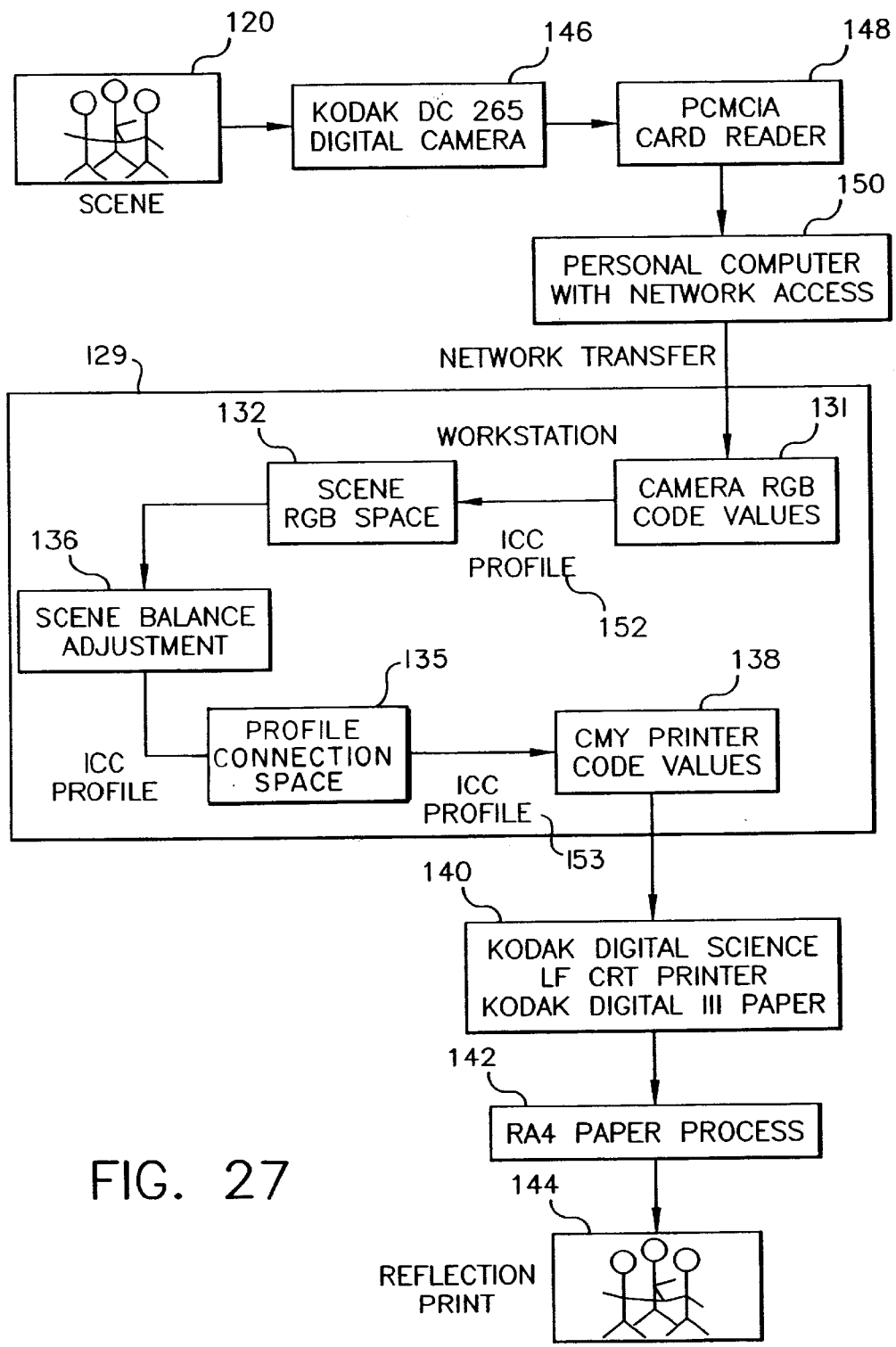
FIG. 27 is block diagram showing an example of image processing according to the present invention.

Referring to FIG. 27, an example of how reflection prints with preferred color reproduction can be produced from a digital camera according to the present invention will be described. A scene 120 is captured using the Kodak DC 265 digital camera 146. The camera is equipped with a PCMCIA card for image storage. The image is uploaded to a personal computer 150 using a PCMCIA card reader 148. The computer has access to a network, e.g. the Worldwide Web, so that the images can be transmitted to workstation 129 for further processing. The Kodak Photonet Online service can be used for this transaction. The image RGB values 131 are converted to scene color RGB values 132, as defined in Equations 1 and 2 of Example 1. This transformation is implemented as an ICC profile 152. Preferred color manipulations and output to operations were performed as in example 1 except that the conversion from balanced scene color RGB to PCS 135 and from PCS to CMY printer code values 138 was implemented in the form of ICC profiles 153.

The present invention is preferably practiced in an image processing system including a source of digital images, such as a scanner, a computer programmed to process digital images, and an output device such as a thermal or inkjet printer. The method of the present invention may be sold as a computer program product including a computer readable storage medium bearing computer code for implementing the steps of the invention. Computer readable storage medium may include, for example; magnetic storage media such as a magnetic disc (e.g. a floppy disc) or magnetic tape; optical storage media such as optical disc or optical tape; bar code; solid state electronic storage devices such as random access memory (RAM) or read only memory (ROM); or any other physical device or medium employed to store a computer program.

The invention has been described in detail with particular reference to certain preferred embodiments thereof, but it will be understood that variations and modifications can be effected within the spirit and scope of the invention. For example, the hue and lightness transformations and chroma scaling can be implemented using one or more of the following to effect the transformation from one color space to another: matrices, polynomials, analytical functions, shift and scale factors, and/or N-dimensional lookup tables. These mathematical operations can also be performed by a series of ICC profiles. In addition, hue and lightness transformations and chroma scaling can be performed in any order, and several of the desired manipulations can be performed in one step, e.g. lightness transformation and chroma scaling could be combined in the application of a tone scale function.

PARTS LIST 42 skin tone patches
44 hue and hue angle
46 hue line
48 region of color space
50 centroid color
52 chroma difference
53 hue angles
54 hue line
56 foliage
58 blue sky
60 skin tones
62 yellow hues
66, 68, 70 tone scale functions
100 test target
102 test target
103 lighting system
104 imaging system
106 scene capture apparatus
108 transformation step
110 image reproduction apparatus
112 target
114 target
116 telespectroradiometer
120 scene
122 capture step
124 develop film step
126 scan step
128 scanner RGB code values
129 workstation
131 image RGB values
132 large gamut scene RGB color space
134 3D LUT
135 profile connection space (PCS)
136 scene balance algorithm
138 printer code values
140 RA4 process
142 silver halide paper
144 visual reproduction
146 digital camera
148 PCMCIA card
150 personal computer 152 ICC profile
153 ICC profile
154 light source
156 test target
158 capture and processing step
160 trichromatic scanner
161 scene balance algorithm
162 data set of scanner code values
164 one dimensional lookup table
166 printer code values
168 digital printer
170 print
172 spectrophotometer
174 reproduction
176 telespectroradiometer
178 illuminated target
180 reproduced test colors
182 chosen printer code values
184 printing step
186 reproduction
188 spectrophotometer
190 reproduction
192 transformation
194 printer code values
196 inverse transformation
198 scanner code values
200 preferred color transformation
201 source digital image
202 scene state digital image
203 balanced digital image
204 tone scale adjusted digital image
204' tone scale adjusted RGB digital image
205 visual digital image
206 rendered digital image
230 image capture device
220 digital image processor
230 image output device
240 general control processor
250 monitor device
260 input control device
270 offline memory device
310 capture normalization module
312 color metric conversion module
314 scene balance module
320 enhancement and manipulation module
322 tone scale module
324 spatial sharpening module
325 luminance-chrominance module
326 RGB conversion module
327 tone scale function generator
328 tone scale function applicator
330 rendering module
332 visual transform module
334 color manipulation module
336 device mapping module

What is claimed is:

1. A method for enhancing the color and lightness characteristics of a digital color image, the digital color image having pixel values from which digital luminance and color difference values can be deduced, comprising the steps of:
   a) deducing digital luminance and digital color difference values for pixels of the digital color image;
   b) using the pixels of the digital color image to calculate an image dependent transform;
   c) using the image dependent transform to modify the digital luminance values for pixels of the digital color image to form modified luminance values;
   d) calculating a preferred color transform that modifies the original digital color difference values in a manner that consistently and smoothly moves the values toward or away from predetermined digital color difference values; and
   e) using the color transform to modify the original color difference values for pixels of the digital color image to produce modified color difference values.

2. The method claimed in claim 1, wherein the digital color difference values are deduced hue values derived from the digital color image.

3. The method claimed in claim 1, wherein the digital color difference values are derived from CIE 1976 a/b chroma values derived from the digital color image.

4. The method claimed in claim 1, wherein the digital color difference values are derived from CIE 1976 a/b hue values derived from the digital color image.

5. The method claimed in claim 1, wherein the digital color difference values are derived from CIE 1976 a/b hue and chroma derived from the digital color image.

6. The method of claim 1, further comprising the step of adjusting the luminance values with an exposure compensation transform prior to the application of the image dependent transform.

7. The method of claim 1, further comprising the step of adjusting the color difference values with an exposure compensation transform prior to the application of the image dependent transform.

8. The method of claim 1, further comprising the step of adjusting the luminance values with an exposure compensation transform after the application of the color transform.

9. The method of claim 1, further comprising the step of adjusting the color difference values with an exposure compensation transform after the application of the color transform.

10. The method of claim 1 wherein the image dependent transform is an image dependent tone scale function applied to the luminance values to enhance the lightness characteristics of the digital color image.

11. The method of claim 10 wherein a histogram of the luminance values is used to calculate the tone scale function.

12. The method of claim 11 wherein the tone scale function is in the form of a LUT.

13. The method of claim 11 wherein a spatial filter is used to apply the tone scale function to the luminance values.

14. The method of claim 1 wherein the image dependent transform is a spatial filter applied to the luminance values to enhance the sharpness characteristics of the digital color image.

15. The method of claim 14 wherein the spatial filter includes calculating a statistical measure of local spatial activity and using the statistical measure of local spatial activity to vary the level of sharpness enhancement.

16. The method claimed in claim 1, wherein the step of calculating the preferred color transform includes the steps of:
   a) specifying one or more regions of color space in which digital color difference values will be transformed;
   b) selecting one or more test colors within each specified region of color space for which preferred digital color difference values are to be defined;
   c) deducing original digital color difference values for the test colors,
   d) determining preferred digital color difference values for the test colors; and
   e) forming a preferred color transform that modifies the original digital color difference values in a manner that consistently and smoothly moves said values toward or away from the preferred digital color difference values.

17. The method of claim 16 wherein the test colors are derived by exposing a photographic film to an original scene; developing and scanning the exposed photographic film to produce a digital image; and transforming the digital image to a colorimetric digital scene representation.

18. The method of claim 16 wherein the test colors are derived by capturing an image of the original scene with an electronic camera to produce a digital image and transforming the digital image to a calorimetric digital scene representation.

19. Apparatus for enhancing the color and lightness characteristics of a digital color image, the digital color image having pixel values from which digital luminance and color difference values can be deduced, comprising:
   a) means for deducing digital luminance and digital color difference values for pixels of the digital color image;
   b) means for using the pixels of the digital color image to calculate an image dependent transform;
   c) means for using the image dependent transform to modify the digital luminance values for pixels of the digital color image to form modified luminance values;
   d) means for calculating a preferred color transform that modifies the original digital color difference values in a manner that consistently and smoothly moves the values toward or away from predetermined digital color difference values; and
   e) means for using the preferred color transform to modify the original color difference values for pixels of the digital color image to produce modified color difference values.

20. The apparatus claimed in claim 19, wherein the digital color difference values are deduced hue values derived from the digital color image.

21. The apparatus claimed in claim 19, wherein the digital color difference values are derived from CIE 1976 a/b chroma values derived from the digital color image.

22. The apparatus claimed in claim 19, wherein the digital color difference values are derived from CIE 1976 a/b hue values derived from the digital color image.

23. The apparatus claimed in claim 19, wherein the digital color difference values are derived from CIE 1976 a/b hue and chroma derived from the digital color image.

24. The apparatus of claim 19, further comprising means for adjusting the luminance values with an exposure compensation transform prior to the application of the image dependent transform.

25. The apparatus of claim 19, further comprising means for adjusting the color difference values with an exposure compensation transform prior to the application of the image dependent transform.

26. The apparatus of claim 19, further comprising means for adjusting the luminance values with an exposure compensation transform after the application of the color transform.

27. The apparatus of claim 19, further comprising means for adjusting the color difference values with an exposure compensation transform after the application of the color transform.

28. The apparatus of claim 19 wherein the image dependent transform is an image dependent tone scale function applied to the luminance values to enhance the lightness characteristics of the digital color image.

29. The apparatus of claim 28 wherein a histogram of the luminance values is used to calculate the tone scale function.

30. The apparatus of claim 29 wherein the tone scale function is in the form of a LUT.

31. The apparatus of claim 29 wherein a spatial filter is used to apply the tone scale function to the luminance values.

32. The apparatus of claim 19 wherein the image dependent transform is a spatial filter applied to the luminance values to enhance the sharpness characteristics of the digital color image.

33. The apparatus of claim 32 wherein the spatial filter includes calculating a statistical measure of local spatial activity and using the statistical measure of local spatial activity to vary the level of sharpness enhancement.

34. The apparatus claimed in claim 19, wherein means for calculating a preferred color transform includes means for:
   a) means for specifying one or more regions of color space in which digital color difference values will be transformed;
   b) means for selecting one or more test colors within each specified region of color space for which preferred digital color difference values are to be defined;
   c) means for deducing original digital color difference values for the test colors,
   d) means for determining preferred digital color difference values for the test colors; and
   e) means for forming the preferred color transform that modifies the original digital color difference values in a manner that consistently and smoothly moves said values toward or away from the preferred digital color difference values.

35. The apparatus of claim 34 wherein the means for selecting one or more test colors includes means for exposing a photographic film to an original scene; means for developing and scanning the exposed photographic film to produce a digital image; and means for transforming the digital image to a calorimetric digital scene representation.

36. The apparatus of claim 35 wherein the means for selecting one or more test colors includes means for capturing an image of the original scene with an electronic camera to produce a digital image and means for transforming the digital image to a calorimetric digital scene representation.

37. A computer program product for performing the method of claim 1.

38. A computer program product for performing the method of claim 2.

39. A computer program product for performing the method of claim 3.

40. A computer program product for performing the method of claim 4.

41. A computer program product for performing the method of claim 5.

42. A computer program product for performing the method of claim 6.

43. A computer program product for performing the method of claim 7.

44. A computer program product for performing the method of claim 8.

45. A computer program product for performing the method of claim 9.

46. A computer program product for performing the method of claim 10.

47. A computer program product for performing the method of claim 11.

48. A computer program product for performing the method of claim 12.

49. A computer program product for performing the method of claim 13.

50. A computer program product for performing the method of claim 14.

51. A computer program product for performing the method of claim 15.

52. A computer program product for performing the method of claim 16.

53. A computer program product for performing the method of claim 17.

54. A computer program product for performing the method of claim 18.

* * * * *